Dec. 29, 1959 F. E. HAMILTON ET AL 2,919,429

DATA TRANSFER MECHANISM

Filed Oct. 25, 1954 32 Sheets-Sheet 1

INVENTORS
FRANCIS E. HAMILTON
ERNEST S. HUGHES, JR.
CHARLES B. SMITH
ARCHIE L. FURR
BY Geoffrey Knight
ATTORNEY

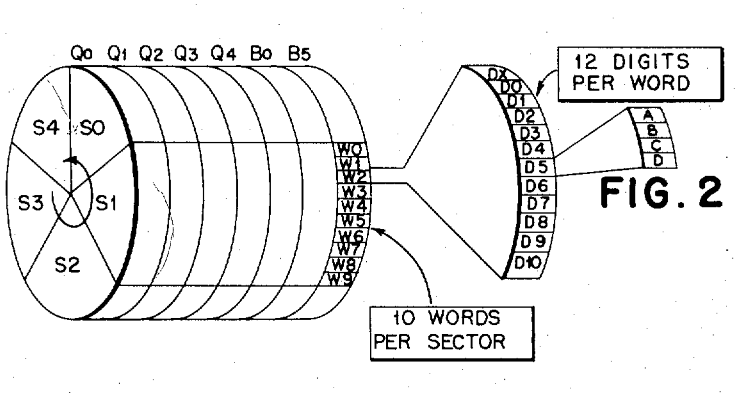
FIG. 2
BIQUINARY CODE
| DIGIT | Qo | Q1 | Q2 | Q3 | Q4 | Bo | B5 |
|---|---|---|---|---|---|---|---|
| 0 | X | | | | | X | |
| 1 | | X | | | | X | |
| 2 | | | X | | | X | |
| 3 | | | | X | | X | |
| 4 | | | | | X | X | |
| 5 | X | | | | | | X |
| 6 | | X | | | | | X |
| 7 | | | X | | | | X |
| 8 | | | | X | | | X |
| 9 | | | | | X | | X |
FIG. 3
2/5 CODE
| DIGIT | 0 | 1 | 2 | 3 | 6 |
|---|---|---|---|---|---|
| 0 | | X | X | | |
| 1 | X | X | | | |
| 2 | X | | X | | |
| 3 | X | | | X | |
| 4 | | X | | X | |
| 5 | | | X | X | |
| 6 | X | | | | X |
| 7 | | X | | | X |
| 8 | | | X | | X |
| 9 | | | | X | X |
FIG. 4
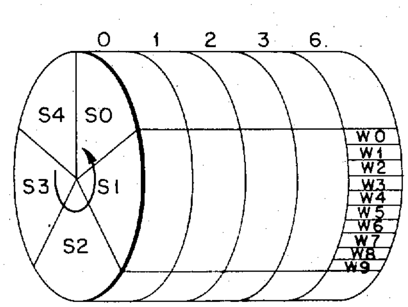
FIG. 5

Dec. 29, 1959 F. E. HAMILTON ET AL 2,919,429

DATA TRANSFER MECHANISM

Filed Oct. 25, 1954 32 Sheets-Sheet 5

Dec. 29, 1959 F. E. HAMILTON ET AL 2,919,429

DATA TRANSFER MECHANISM

Filed Oct. 25, 1954 32 Sheets-Sheet 7

Dec. 29, 1959 F. E. HAMILTON ET AL 2,919,429

DATA TRANSFER MECHANISM

Filed Oct. 25, 1954 32 Sheets-Sheet 8

Dec. 29, 1959 F. E. HAMILTON ET AL 2,919,429

DATA TRANSFER MECHANISM

Filed Oct. 25, 1954 32 Sheets-Sheet 9

Dec. 29, 1959 F. E. HAMILTON ET AL 2,919,429

DATA TRANSFER MECHANISM

Filed Oct. 25, 1954 32 Sheets-Sheet 10

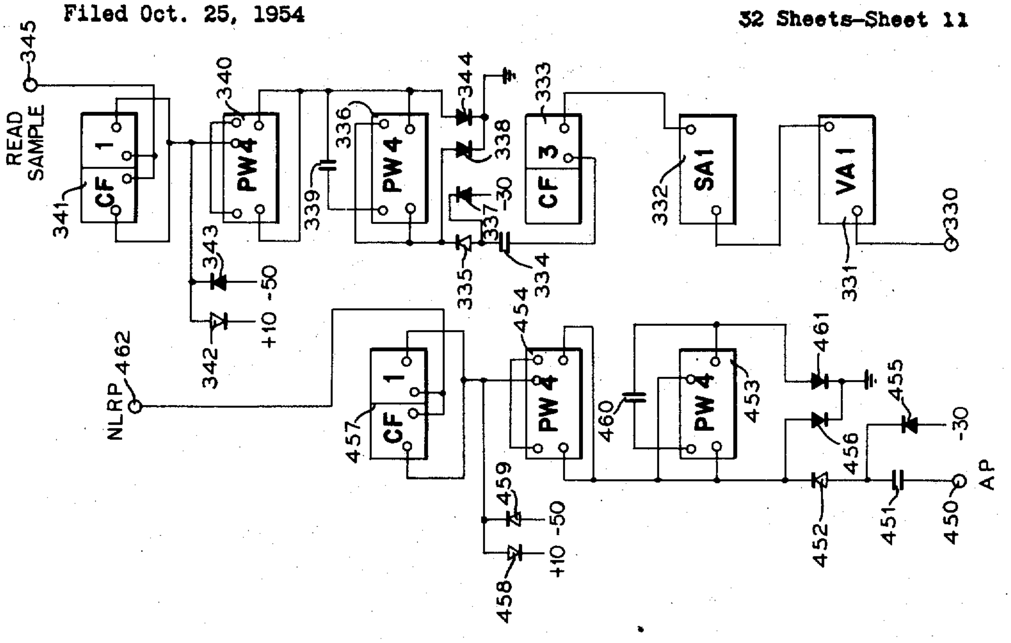
FIG. 8g
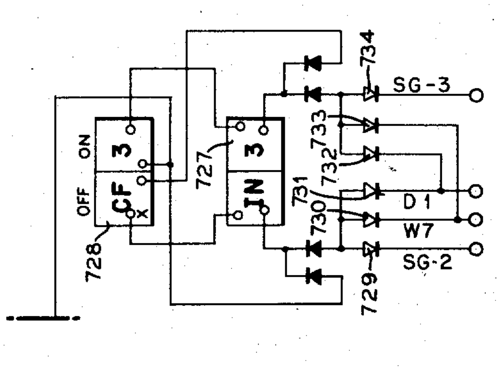

Dec. 29, 1959 F. E. HAMILTON ET AL 2,919,429

DATA TRANSFER MECHANISM

Filed Oct. 25, 1954 32 Sheets-Sheet 12

Dec. 29, 1959 F. E. HAMILTON ET AL 2,919,429

DATA TRANSFER MECHANISM

Filed Oct. 25, 1954 32 Sheets-Sheet 14

Dec. 29, 1959 F. E. HAMILTON ET AL 2,919,429

DATA TRANSFER MECHANISM

Filed Oct. 25, 1954 32 Sheets-Sheet 15

Dec. 29, 1959 F. E. HAMILTON ET AL 2,919,429

DATA TRANSFER MECHANISM

Filed Oct. 25, 1954 32 Sheets-Sheet 16

Dec. 29, 1959 F. E. HAMILTON ET AL 2,919,429

DATA TRANSFER MECHANISM

Filed Oct. 25, 1954 32 Sheets-Sheet 17

Dec. 29, 1959 F. E. HAMILTON ET AL 2,919,429

DATA TRANSFER MECHANISM

Filed Oct. 25, 1954 32 Sheets-Sheet 27

Dec. 29, 1959 F. E. HAMILTON ET AL 2,919,429

DATA TRANSFER MECHANISM

Filed Oct. 25, 1954 32 Sheets-Sheet 28

Dec. 29, 1959 F. E. HAMILTON ET AL 2,919,429

DATA TRANSFER MECHANISM

Filed Oct. 25, 1954 32 Sheets-Sheet 32

United States Patent Office 2,919,429
Patented Dec. 29, 1959

2,919,429

DATA TRANSFER MECHANISM

Francis E. Hamilton, Binghamton, and Ernest S. Hughes, Jr., and Charles B. Smith, Vestal, and Archie L. Furr, Endicott, N.Y., assignors to International Business Machines Corporation, New York, N.Y., a corporation of New York

Application October 25, 1954, Serial No. 464,516

12 Claims. (Cl. 340—174)

This invention relates to high speed digital storage and processing machines and particularly to data transfer mechanism therefor. This is a continuation-in-part of our application Serial No. 399,556, filed December 21, 1953.

Punched cards are frequently a convenient means for storing large quantities of data. Presently available mechanism for punching data into cards and for reading punched data from cards is limited in its speed of operation. High speed data processing machines are capable of transferring and processing data at rates greatly in excess of the rate at which data may be read from, or punched into a card. It is therefore desirable that data transfer and processing within a data processing machine continue while data is being entered into the machine from a punched card reader or other slow operating source data entry means and while data from the machine is being punched into cards or stored in other storage media.

It is a prime object of this invention to provide improved data transfer mechanism for such a machine.

Another object is to provide improved mechanism for transferring data from a slow access data source into a high speed data processing machine.

Another object is to provide improved mechanism for transferring data from a high speed data processing machine to storage media of slow entry time.

Still another object is to provide improved data transfer mechanism for transferring data to and from a high speed data processing machine without the interruption of a data processing operation within the machine.

According to the embodiment of the invention disclosed herein, a data processing machine is provided with a revolvable magnetic drum for storing data as magnetic spots on its surface. The surface of the drum is longitudinally divided into a plurality of bands. One of the bands functions as a buffer storage unit and the remaining bands function as a general storage unit. A section of the buffer storage band is adapted to receive data from a relatively slow operating data source for later transfer to the general storage unit. The transfer of data from buffer storage to general storage occurs within a fraction of a revolution of the drum storage device.

Processed data which is stored in the general storage unit may be transferred to a second section of the buffer storage band within a fraction of a revolution of the drum storage device. The second section of the buffer storage band is adapted to store data for read-out to a relatively slow operating card punch or the like for recording the data in another storage medium. The data transfer system disclosed herein enables data processing functions to continue in the data processing machine while the above-mentioned transfers of data into and out of the processing machine are taking place.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2 is a schematic representation of the buffer storage band showing the arrangement of the storage tracks, the word positions and digital positions.

Fig. 3 is a chart showing the representations of digital data in accordance with a biquinary code.

Fig. 4 is a chart showing representation of digital data in accordance with a two-out-of-five code.

Fig. 5 is a fragmentary schematic representation of the general storage unit showing the arrangement of the storage tracks and the word positions within a single band.

Figure 8A:
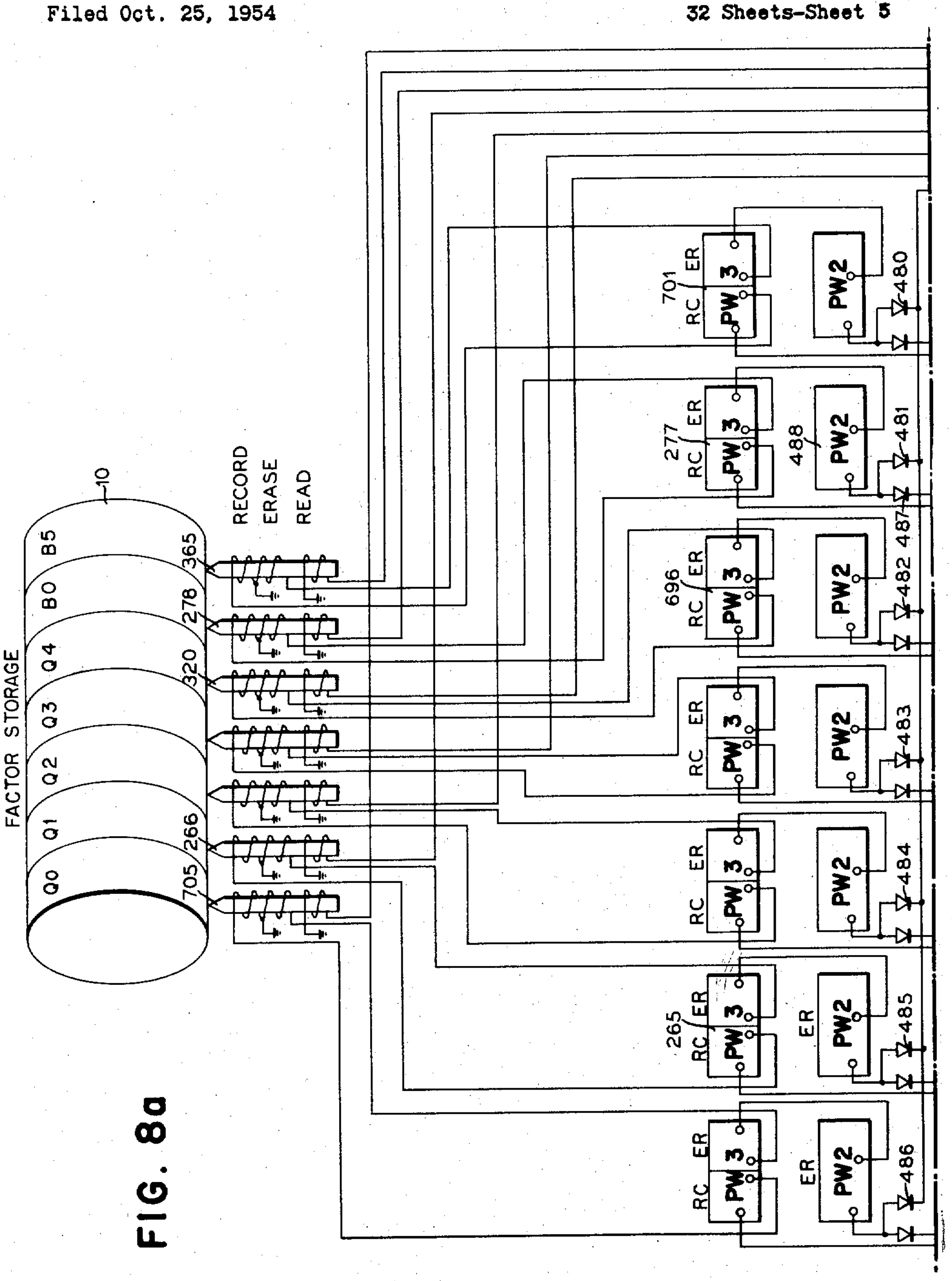

Figs. 8*a* through 8*o* constitute a block diagram of the circuits for the data transfer system.

Figures 8H, 9:
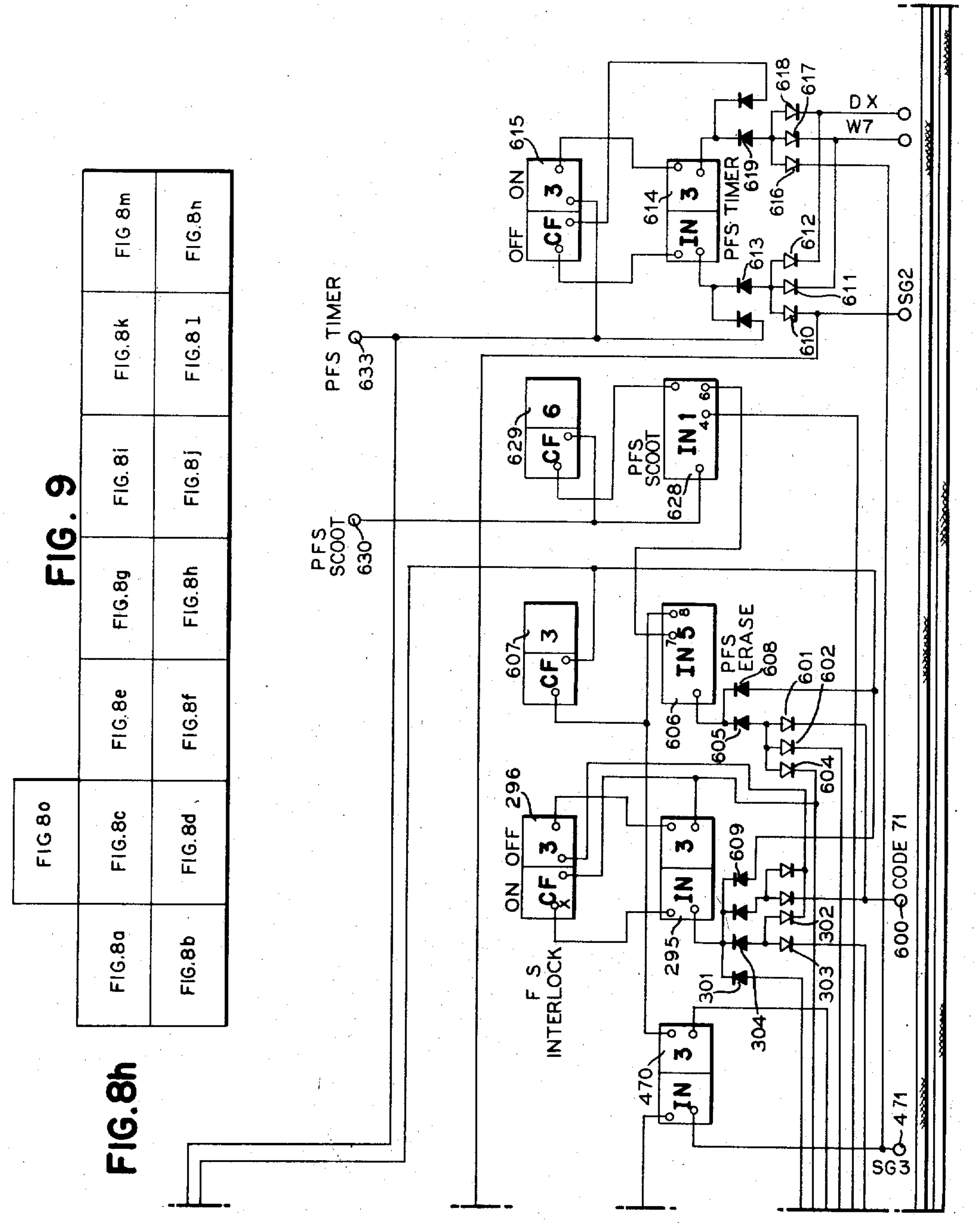

Fig. 9 is a diagram showing the manner in which Figs. 8*a* through 8*o* should be joined together.

Figs. 10 through 56 are schematic representations of circuit elements which are shown in block diagrams of the circuits.

Figures 54, 55, 56, 57:
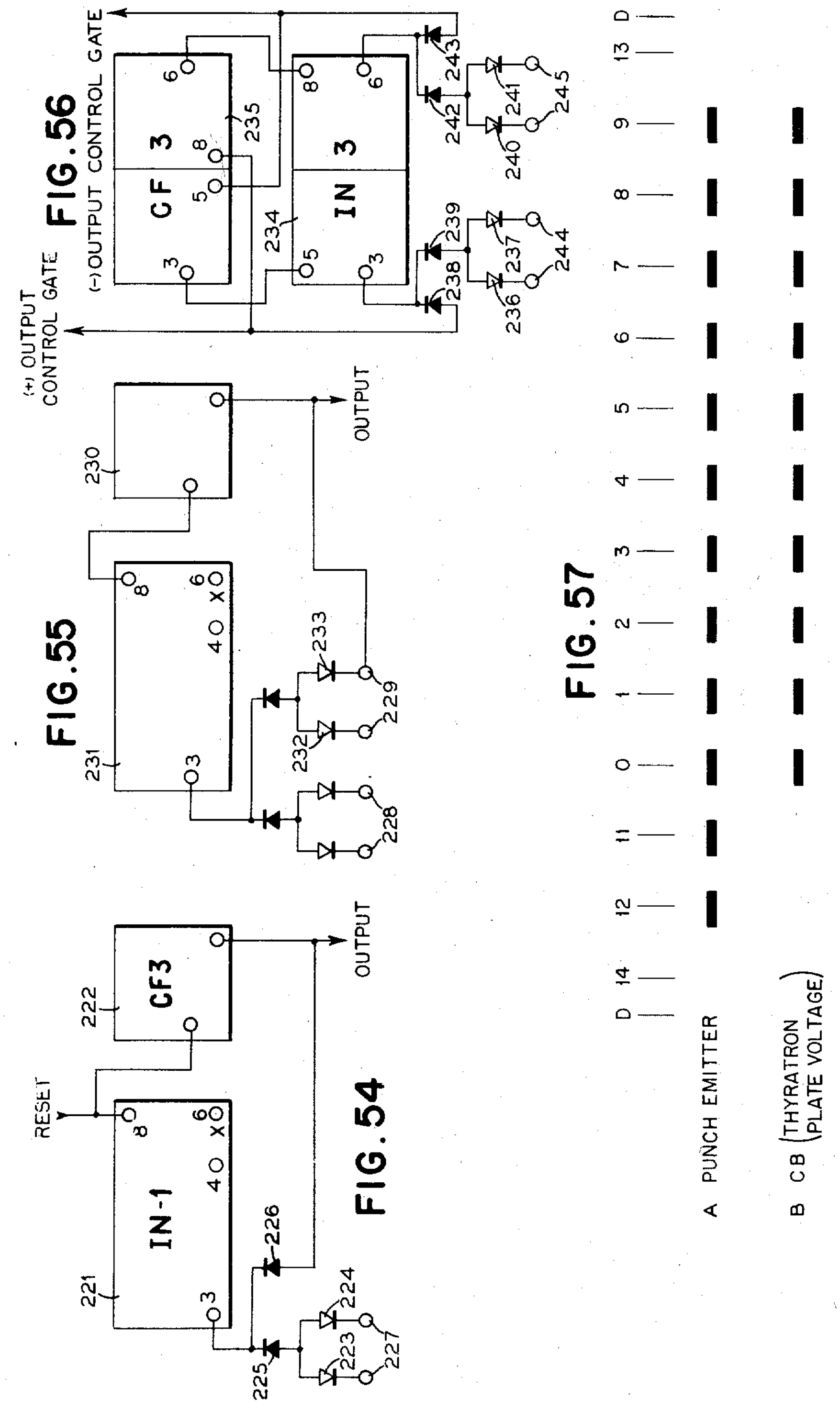

Fig. 57 is a timing chart for the card punch controlled contacts.

Figure 58:
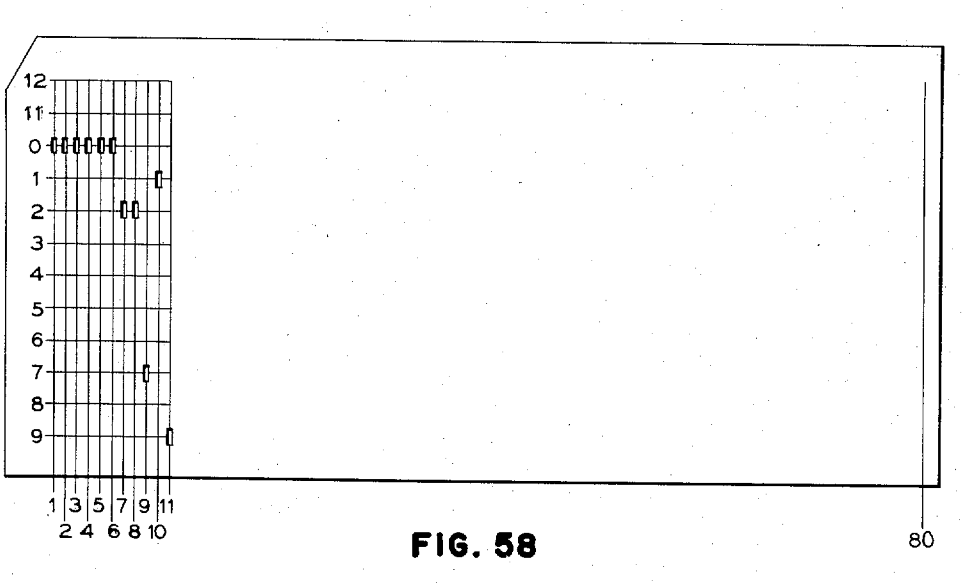

Fig. 58 shows a diagrammatic arrangement of the well-known IBM record card.

Figure 59:
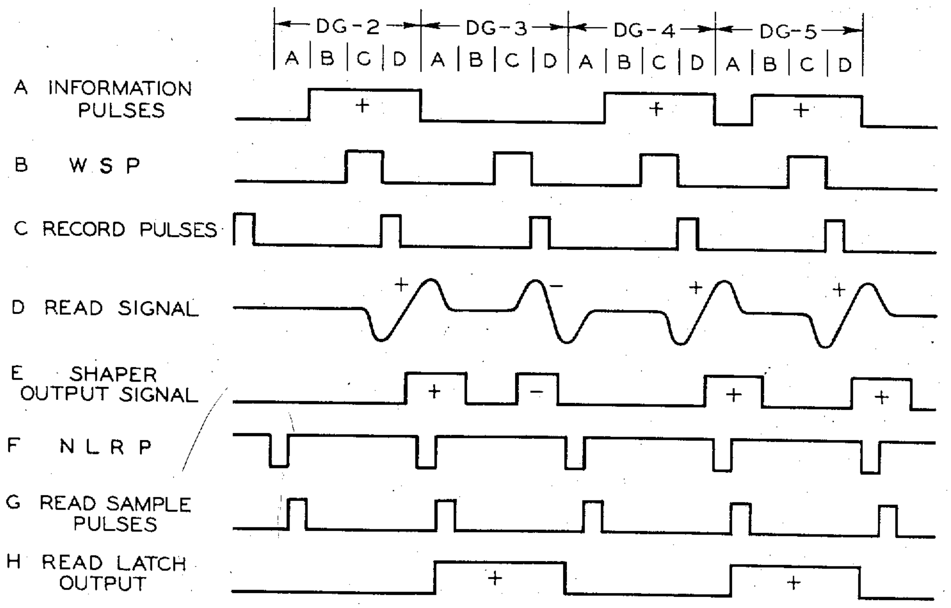

Fig. 59 is a timing diagram showing various wave forms produced during data transfer operations.

Figure 60:
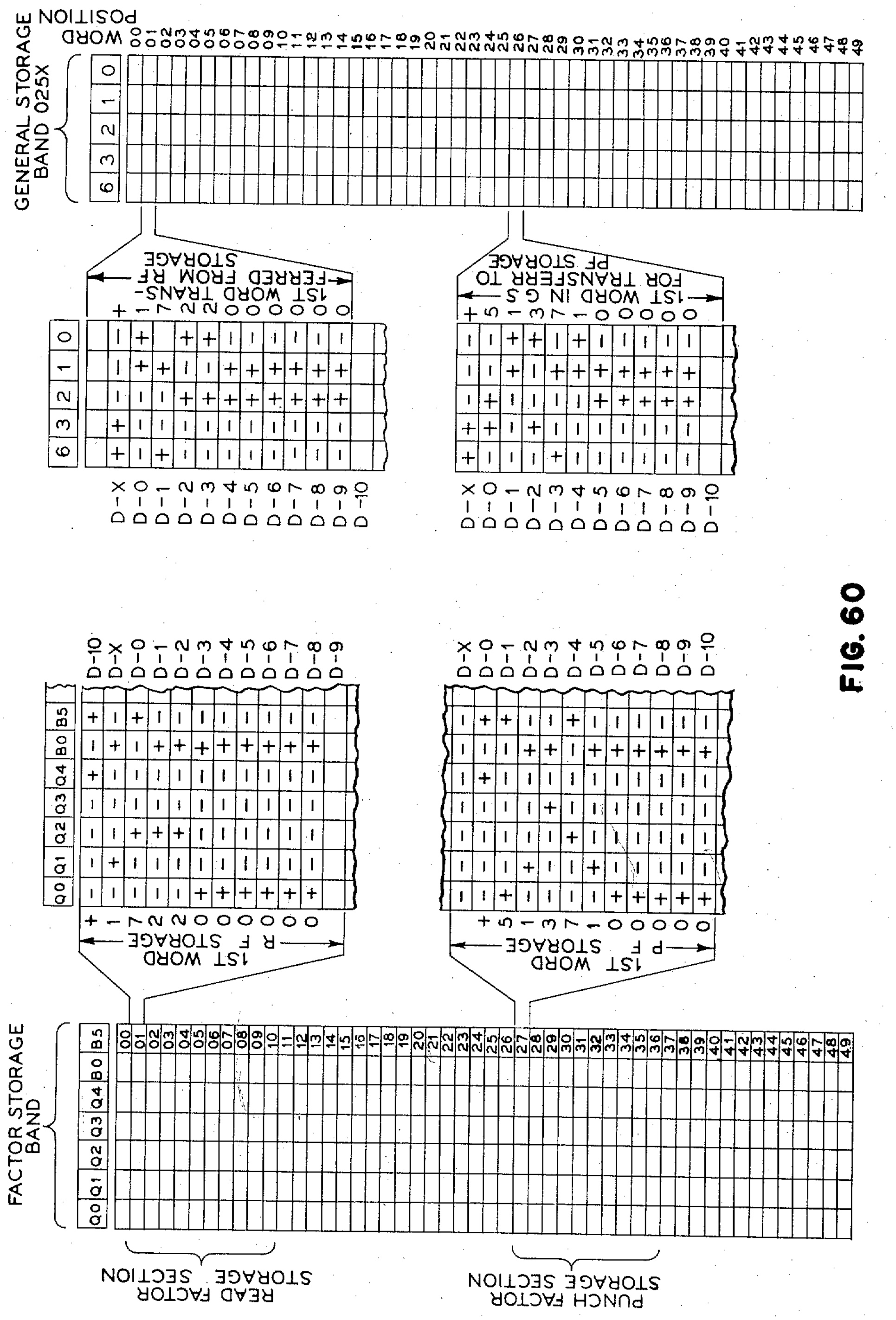

Fig. 60 is a schematic representation of the factor storage band and a general storage band showing the arrangement of word positions and including fragmentary showings of the digital positioning within the word positions.

Figure 61A:
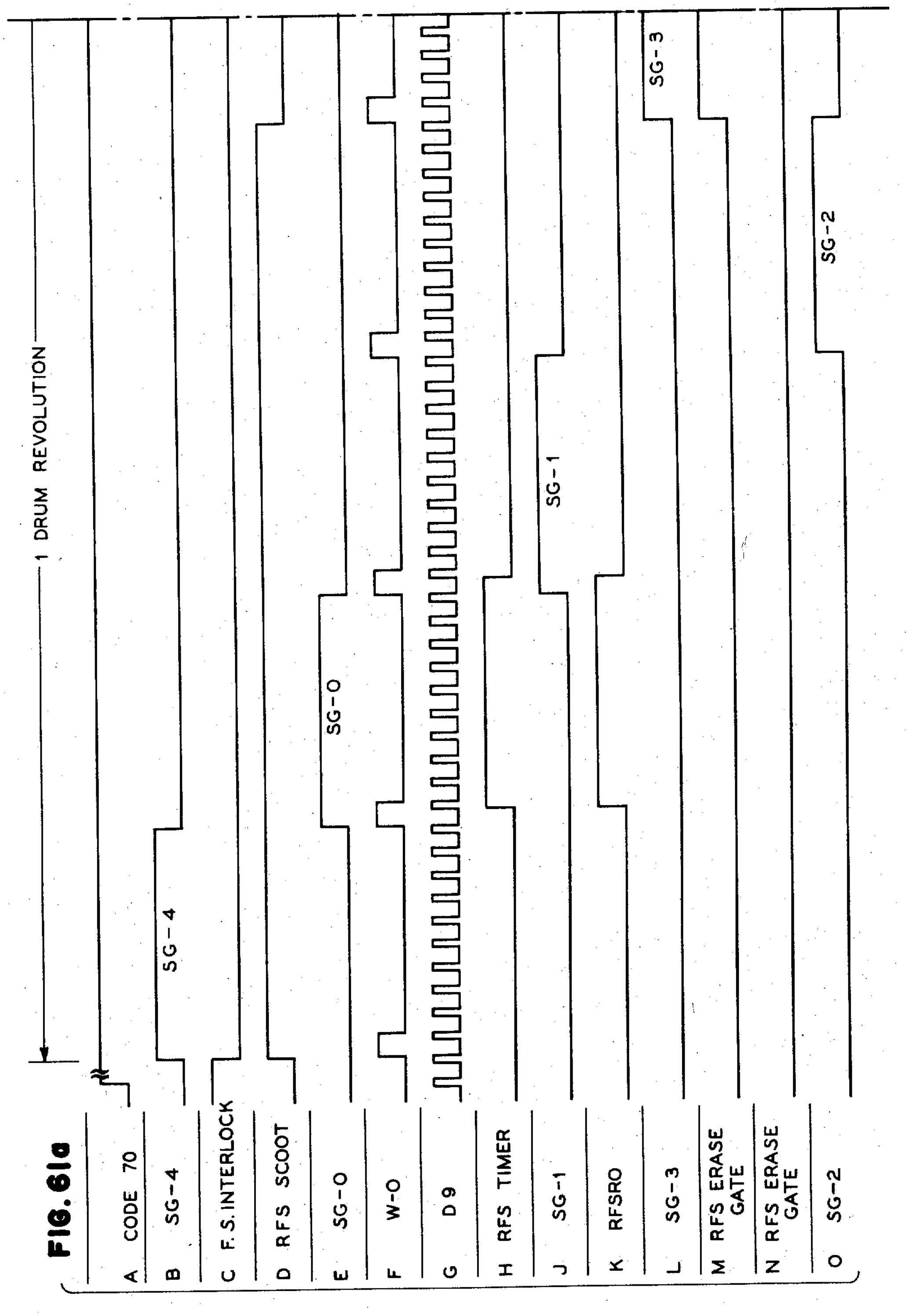
Figure 61B:
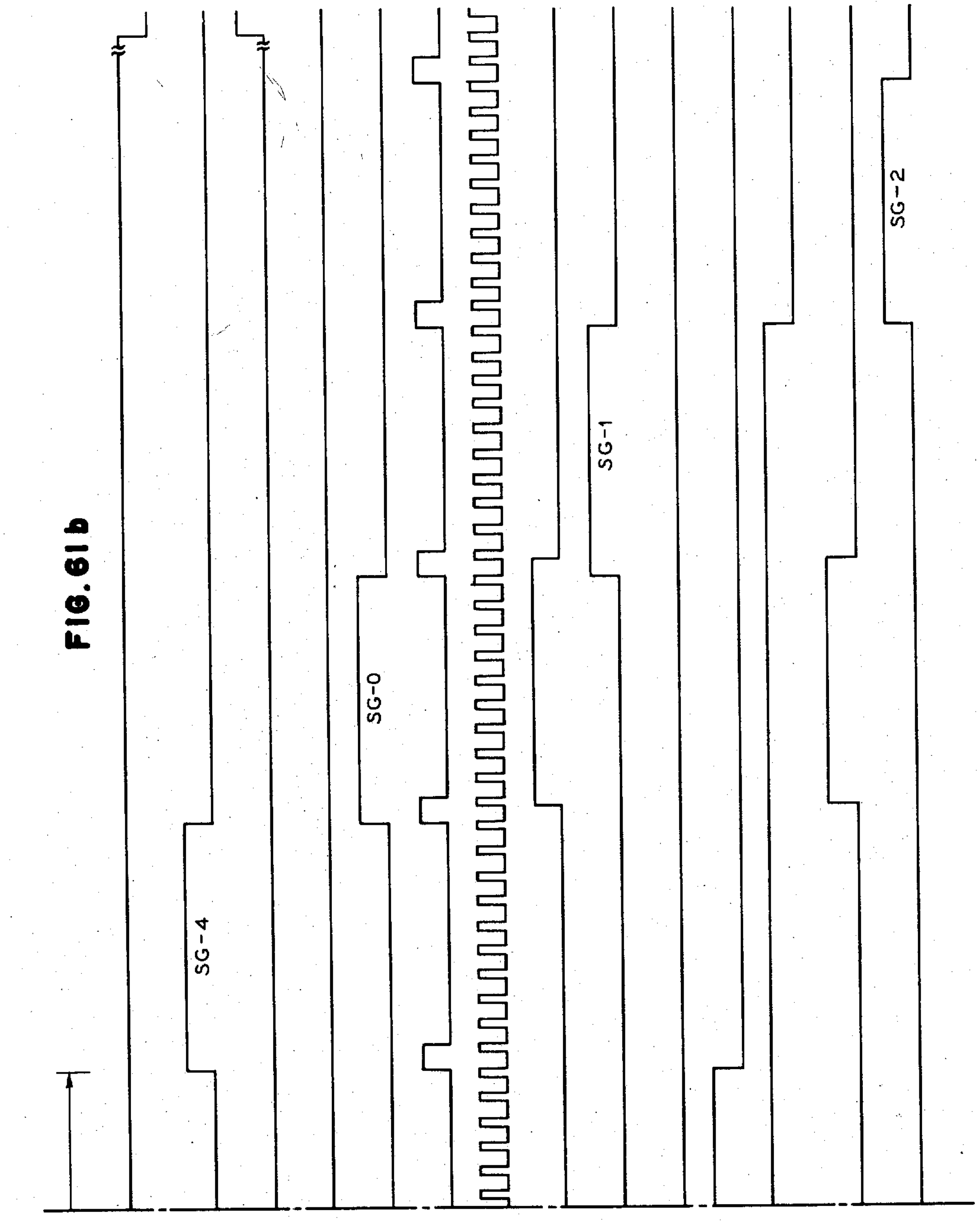

Figs. 61*a* and 61*b*, when placed side by side, form a timing diagram showing various control pulses used during data transfer from read factor storage to general storage and read-in operations.

Figure 62A:
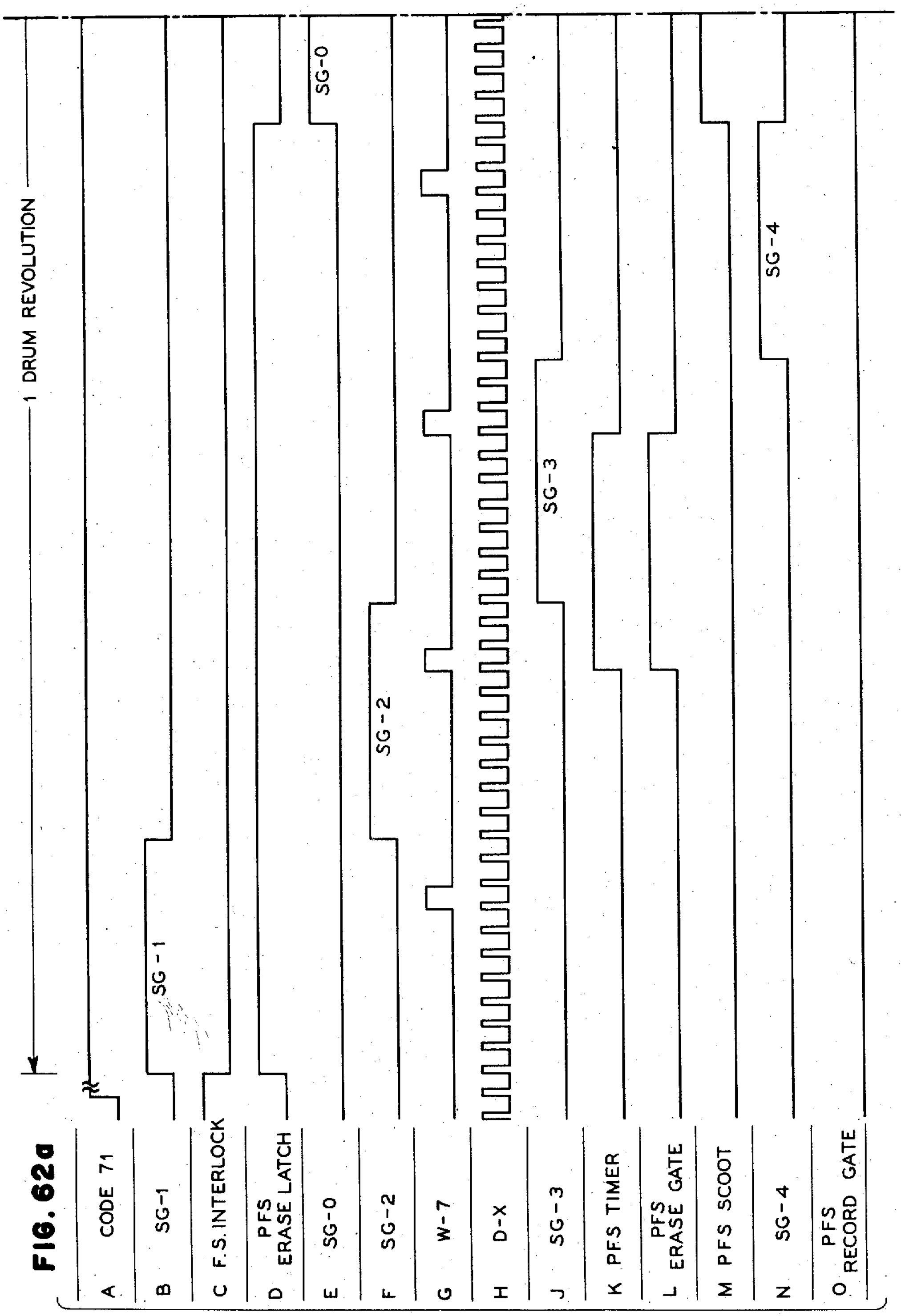
Figure 62B:
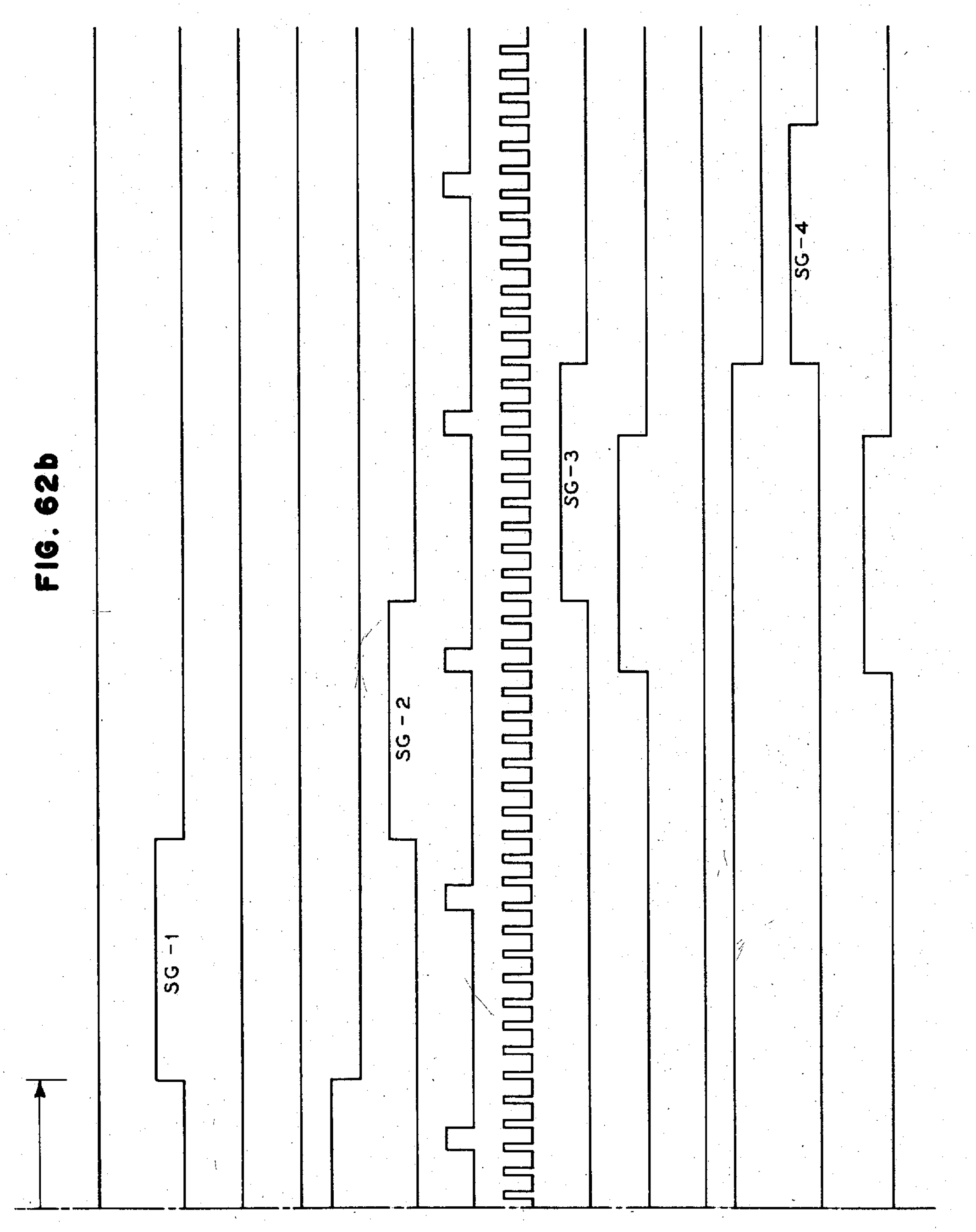

Figs. 62*a* and 62*b*, when placed side by side, form a timing diagram showing various control pulses used during data transfer from general storage to punch factor storage and read-out operations.

GENERAL DESCRIPTION

Figure 1:
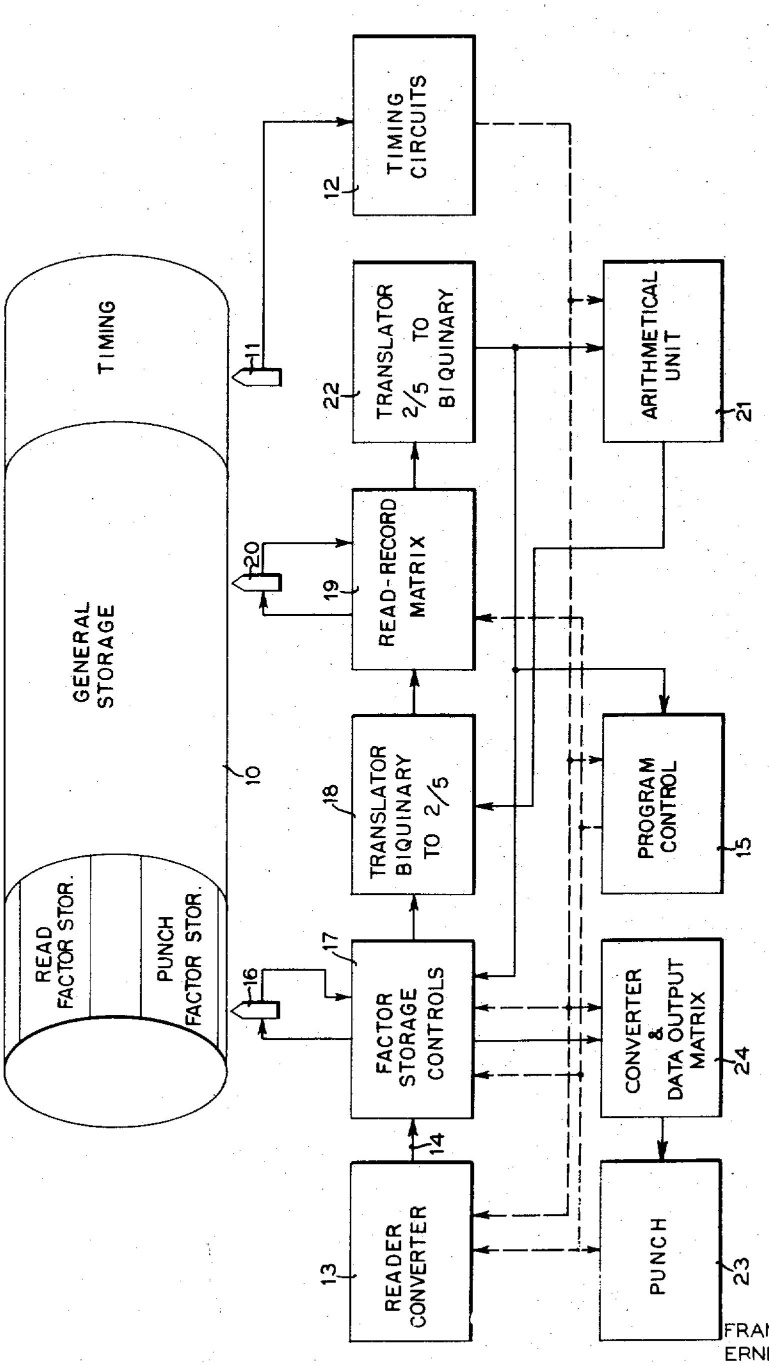
Fig. 1 is a general flow diagram of a data transfer system which employs a magnetic drum storage unit in accordance with the principles of the invention.

In Fig. 1 there is shown schematically a data transfer mechanism adapted for use in a high speed digital storage and data processing machine of the type that utilizes a rotating magnetic drum 10 for data storage purposes. The drum 10 is longitudinally divided into sections respectively designated as factor storage, general storage and timing. The factor storage section, having two portions designated as read factor storage and punch factor storage, is assigned the function of a buffer storage unit. The general storage section has the function of a general storage unit. The general storage and factor storage sections of the drum each comprise a plurality of tracks defined on the surface of the drum 10 and extending circumferentially about the drum. A recording and reading device is associated with each of the tracks and may be a single magnetic head having both a recording and reading coil wound thereon.

The timing section of the drum 10 constitutes several tracks defined on the surface of the drum each having permanently recorded spots. Each track in the timing section has an associated read head device 11 which supplies signals to the timing circuits represented by the block 12. This section will be described more fully hereinafter.

A reader-converter 13 is adapted to supply representations of data in the form of electrical signals appearing on line 14. The reader-converter 13 may be a device including a punched card reading mechanism of a type well known to the art and its associated circuitry, for delivering to line 14 electrical signals representing the data contained in a storage medium such as a punched card.

Preparatory to the transfer of data from the reader-converter 13 to the read factor storage portion of the factor storage section of drum 10, a signal produced by the program control device 15 causes data previously stored in the read factor storage portion to be transferred to one of numerous locations in the general storage section of drum 10, also under control of the program control device 15. Data from the read factor storage portion is transferred through the recording and reading device 16, the factor storage control 17, the translator device 18, the read-record matrix 19 and the recording and reading device 20 and magnetically recorded in the location in general storage section selected by the program control device 15.

After the completion of the transfer of data from read factor storage to general storage, the data signals from the reader-converter 13 appearing on line 14 pass through the factor storage controls 17 to the recording and reading device 16 and are recorded in the read factor storage portion of the factor storage section of drum 10. Preparatory to the entry of additional data from the reader-converter 13, the data stored in the read factor storage portion is transferred to general storage in the same manner as explained above.

The data stored in the general storage section of drum 10 may be utilized in various ways. For example, the data may be introduced into the program control device 15 to control the programmed operation of the data processing machine or it may be utilized in processing operations within the arithmetical device 21. Generally after the processing operations the new data produced in the arithmetical device 21 is introduced into the general storage section of drum 10.

Processed data stored in the general storage section of drum 10 may be transferred to another storage medium such as a punched card. Herein the data is transferred from general storage to the punch factor storage portion of the factor storage section of drum 10 prior to being punched into cards. The data signals are passed from the recording and reading device 20 through the read-record matrix 19, the translator 22, the factor storage controls 17 to the recording and reading device 16 and are recorded in the punch factor storage portion of the factor storage section of drum 10. The data signals from the punch factor storage portion are sequentially presented to the punch device 23 through the recording and reading device 16, the factor storage controls 17 and the converter and data output matrix 24. The punch 23 of a type well known in the art includes mechanism for punching representations of data into cards of the well known IBM type to thereby store the data from the data processing machine.

Data may thus be transferred to and from the data processing machine without one transfer interfering with the other and without either interfering with the continuation of a data processing operation being carried on by the data processing machine.

Inasmuch as the invention claimed herein pertains mainly to the transfer of data from buffer storage to a relatively long term storage and conversely, the other portions of the system to which reference has just been made are disclosed only to the extent necessary for an understanding of the claimed invention.

MAGNETIC DRUM STORAGE DEVICE

In the particular embodiment, the drum 10 is a cylindrical member with a plated surface and having excellent magnetic qualities. The drum is approximately four inches in diameter and approximately sixteen inches long. The drum is mounted on bearings about a shaft and adapted to be driven at a speed of approximately 12,500 r.p.m. The driving means may comprise any driving motor capable of driving the drum at the selected speed.

The drum is longitudinally divided into areas designated as tracks which extend circumferentially about the surface of the drum. In the present system we have chosen to store the digital data in the factor storage section of the drum 10 (Fig. 1) in accordance with a 7-bit biquinary code. The magnetic recording and reading of digital information is according to a parallel-by-bit and serial-by-digit system, i.e., the bits representing a digit are simultaneously recorded on or read from the drum and the digits are serially recorded or read from the drum. Seven tracks forming a band are used to accommodate the 7-bit biquinary code, as shown by Fig. 2. The tracks are respectively designated as the "Q–0," "Q–1," "Q–2," "Q–3," "Q–4," "B–0" and "B–5" tracks. Circumferentially the drum is divided into five sectors designated as "S–0," "S–1," "S–2," "S–3" and "S–4." Each sector is divided into ten word positions designated as "W–0," "W–1," "W–2" through "W–9." Each word position is divided into twelve digit positions designated as "D–X," "D–0," "D–1," "D–2," "D–3" through "D–10." Consequently the factor storage band is arranged to store up to a maximum of fifty words of digital data.

Each digit position of each of the seven tracks is capable of being magnetized selectively. The first five tracks respectively pertain to the storage of quinary bits designated as "Q–0," "Q–1," "Q–2," "Q–3" and "Q–4." The next two tracks respectively pertain to the storage of binary bits designated as "B–0" and "B–5." Any digit can be represented by selectively magnetizing one track in the quinary level and one track in the binary level. The chart of Fig. 3 shows the digital representation in accordance with the biquinary code system. For example, the digit "3" is represented in any digital position by simultaneously magnetizing the digital position in the "Q–3" and "B–0" tracks. The digit "7" is represented by magnetizing the "Q–2" and "B–5" tracks. In this manner each digit can be represented by two active spot magnetizations, one in each level.

Each word of digital storage is composed of ten digits plus an algebraic sign, i.e., plus or minus, represented in digital form. The system disclosed herein employs the convention of representing a negative sign by a digit "8" recorded in the "D–0" position, while a positive sign is represented by a digit "9" recorded in the "D–0" position.

While it has been described above how the factor storage section of the drum 10 is arranged to provide storage for a maximum of fifty words of digital information, in the preferred embodiment only two ten word portions are actually utilized. One ten word portion is designated as the read factor storage, which serves as a buffer storage for digital information being transferred into the data processing machine from a data source such as a record card. The second ten word portion is designated as the punch factor storage, which serves as a buffer storage for digital information being transferred from the data processing machine for storage in another medium such as a punched record card.

In the preferred embodiment, the general storage section of the drum 10 (Fig. 1) is adapted to provide for storage of 2000 words of digital information. The magnetic recording and reading of digital information is according to a parallel-by-bit and serial-by-digit system. The general storage section is unlike the factor storage section of the drum described above in that the digital data is stored in the general storage section in accordance with a "2 out of 5" code. The chart of Fig. 4 shows the digital representation in accordance with the "2 out of 5" code.

The general storage section of the drum is longitudinally divided into bands. As schematically shown by Fig. 5, each band consists of five tracks respectively designated as the "0," "1," "2,", "3" and "6" tracks. In the same manner as described above for the factor storage section, the drum is circumferentially divided into five sectors designated as "S–0," "S–1," "S–2," "S–3" and "S–4." Each sector is divided into ten word positions designated as "W–0" through "W–9." Each word position is divided into twelve digit positions designated as "D–X," "D–0," "D–1" through "D–10." Consequently each band is arranged to provide storage for fifty words of digital data.

Each digit position of each of the five tracks is capable of being magnetized selectively. Any digit can be represented by selectively magnetizing a spot in two of the five tracks. For example, a digit "2" is represented in any digital position by simultaneously magnetizing the "0" and "2" tracks.

In the preferred embodiment, the general storage section of the drum is provided with forty storage bands, each capable of storing fifty words of digital data. Thus, the general storage section will store up to 2000 words of digital information. Each of the 2000 possible storage locations is assigned a numerical address, the address running from 0000 through 1999. For example, the first band is addressed 0000 through 0049, the second band is addressed 0050 through 0099, and so on. Consequently, each word location is capable of being selectively addressed for recording therein or reading therefrom.

TIMING

Figure 6:
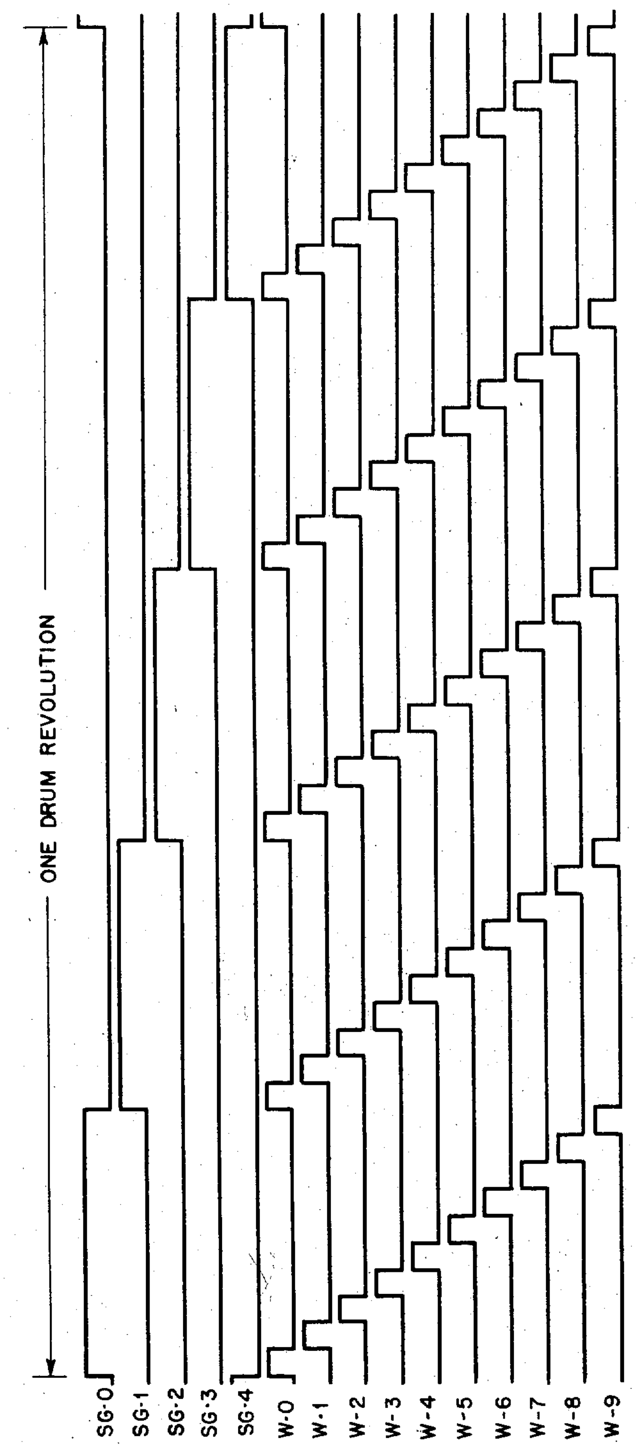
Figs. 6 and 7 are timing diagrams showing various timing pulses used in the data transfer system.
Figure 7:
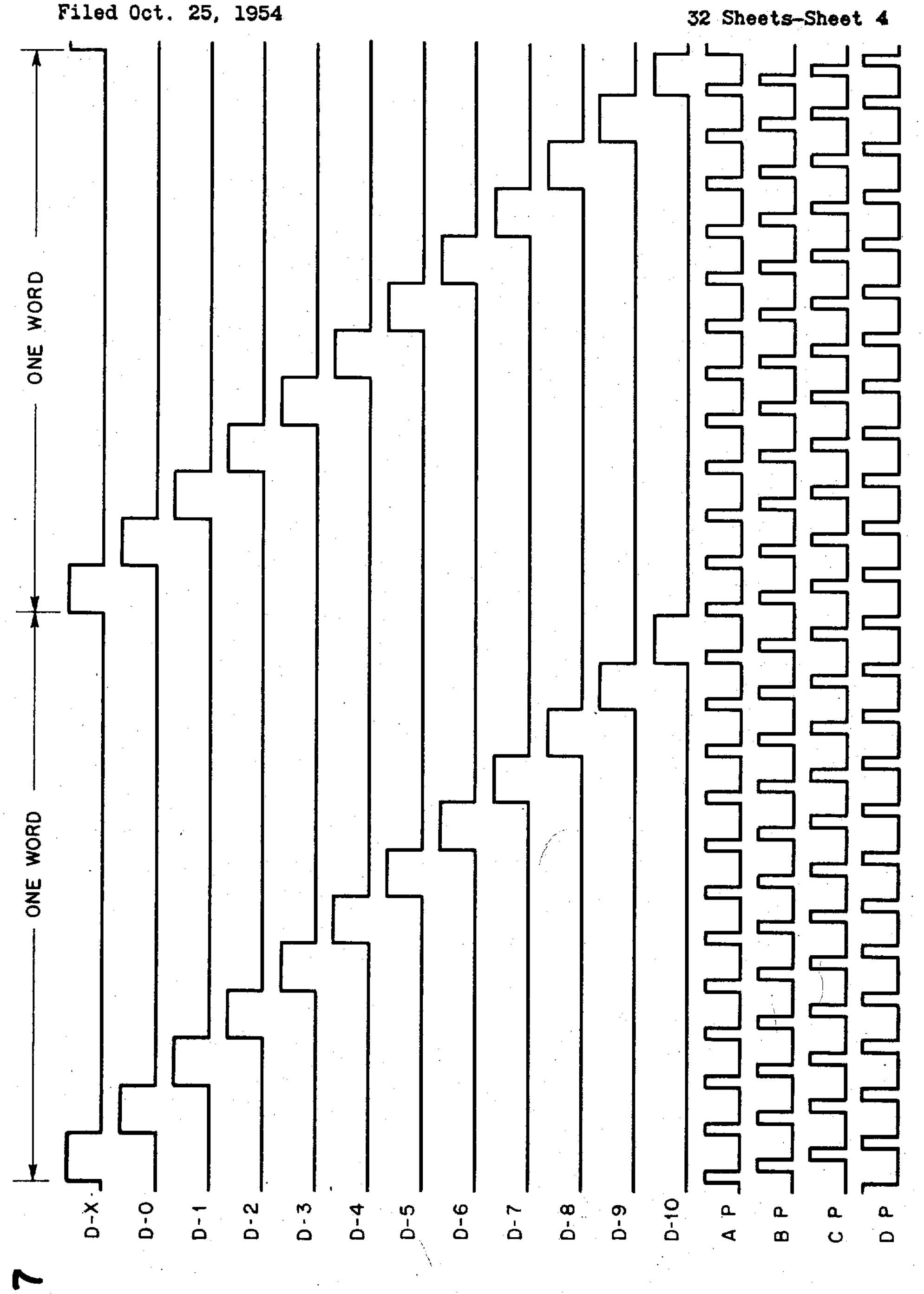

The timing section of the magnetic drum 10 is schematically indicated by Fig. 1. This section constitutes several tracks having permanently recorded spots. Each track has an associated read head 11. A signal is generated in the read heads as each magnetically recorded spot passes in close proximity to the read heads. These signals are used to control a plurality of timing circuits represented by the block 12. The timing circuits produce various timing pulses, as shown by Figs. 6 and 7, in accordance with techniques that are well known in the art. These figures are according to different time bases in order that pulses of shorter duration may be clearly distinguished from one another. These timing pulses are cyclically supplied to the data transfer circuits for controlling various timing and switching functions, as will be described more fully hereinafter.

As schematically shown in Fig. 2, each digital position is divided into four cell positions respectively designated as "A," "B," "C" and "D." Timing pulses are generated by the timing circuits in accordance with these cell positions, as shown by Fig. 7. For example, "A" pulses (AP) are short timing pulses which are initiated at the beginning of the A cell position and have a duration for the entire A cell position. Due to the rate of rotation of the magnetic drum in the preferred embodiment, these pulses have a duration of two microseconds. "B" pulses (BP) are two microsecond pulses which last for the entire B cell position, and so on.

Digit pulses, identified as D–X, D–0, and so on, through D–10, are timing pulses which are generated in accordance with the respective digital positions and have a duration for the entire digital position (Fig. 7).

Word pulses, identified as W–0, W–1, and so on, through W–9, are pulses which are generated in accordance with the respective word positions and have a duration for the entire word position (Fig. 6). Sector gate pulses, identified as SG–0, SG–1, SG–2, SG–3 and SG–4, are gating pulses generated in accordance with the respective sector positions of the drum, and have a duration for the entire sector division (Fig. 6).

MACHINE CIRCUITS—MASTER DIAGRAM

The principal circuits of the data transfer mechanism are illustrated in block diagram form in Figs. 8*a* through 8*o*. Fig. 9, shown on the sheet for Fig. 8*h*, indicates the manner in which these various views should be assembled.

TUBE AND DIODE CIRCUITS

Figure 10:
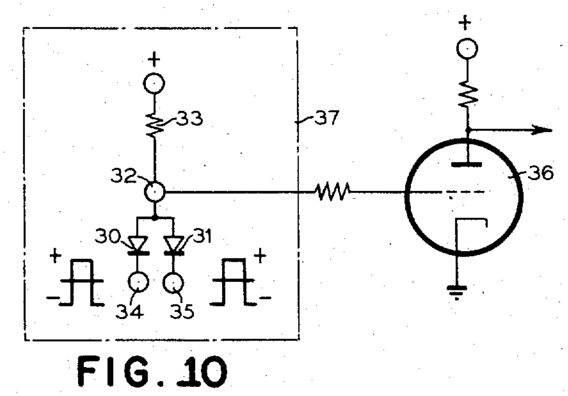
Figure 11:
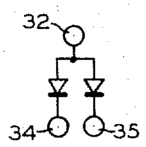

Attention will be given now to various typical forms of tubes and diode circuits which are shown diagrammatically in Figs. 8*a* through 8*o*. In Fig. 10, for example, there is shown a typical coincidence switch, otherwise known as a logical "and" circuit comprising the germanium crystal diodes 30 and 31. The common terminal 32 of the diodes 30 and 31 is connected through a voltage-dropping resistance 33 to a source of positive voltage. The individual input terminals 34 and 35 of the diodes 30 and 31 are normally biased negatively so that the common terminal 32 is normally at a negative potential with respect to ground. If coincident positive pulses are applied to the terminals 34 and 35, the potential of the terminal 32 is raised. However, if only one of the terminals 34 and 35 is pulsed positively, the potential of the terminal 32 is not raised appreciably. A voltage responsive device, such as an electron tube amplifier 36, is controlled by the potential of the terminal 32 to furnish a usable output voltage pulse whenever a coincidence of positive input pulses is detected. For simplicity, the portion of the coincidence switch shown in the broken line rectangle 37, Fig. 10, is generally represented as shown in Fig. 11, omitting the dropping resistor 33 and the connection to the positive voltage source. There are frequently more than two input terminals such as 34 and 35, and it is to be understood that each of the input terminals is to have a diode connected thereto in the same manner as diode 31 is connected to terminal 35 in Fig. 10.

Figures 12, 13, 14:
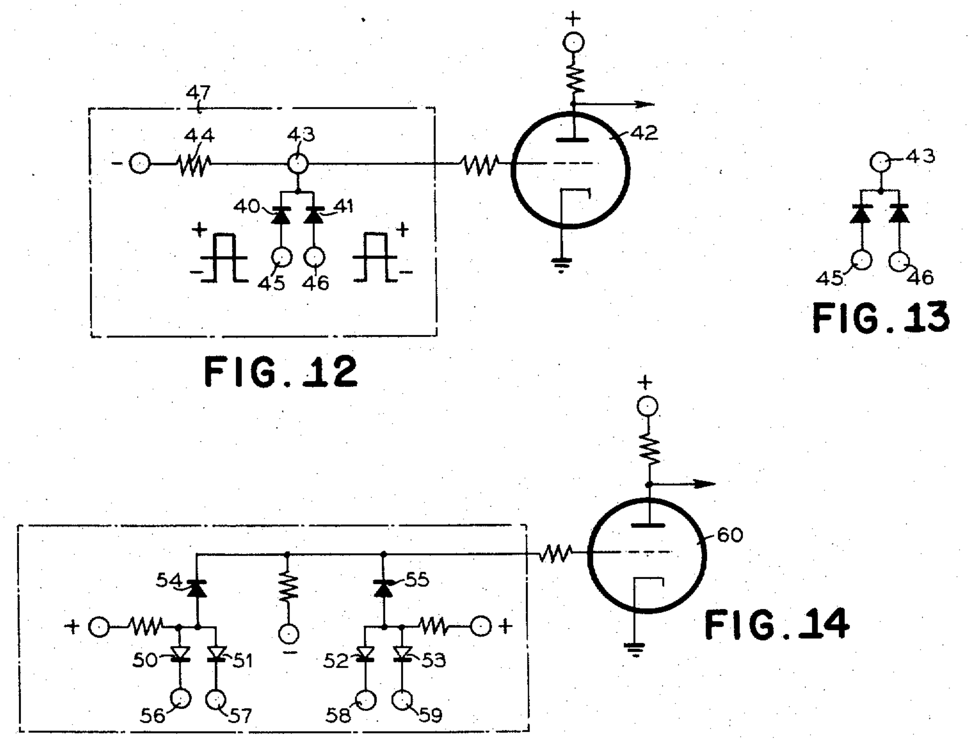

In Fig. 12 there is shown a typical mixer, otherwise known as a logical "or" circuit, comprising the diodes 40 and 41. Diodes which are employed as mixers are shaded in the present drawings to distinguish them from the diodes which are employed in switches. A voltage responsive device, represented by the electron tube amplifier 42, is controlled by the potential of the common output terminal 43 of the diodes 40 and 41, which terminal is connected by a resistor 44 to a source of negative voltage. The diode input terminals 45 and 46 are normally biased negatively. If either one or both of the diode input terminals 45 and 46 is pulsed positively, the potential of the terminal 43 is raised. For convenience, the portion of the mixer circuit shown in the broken line rectangle 47, Fig. 12, is generally represented as shown in Fig. 13, omitting the resistor 44 and the connection to the negative voltage source. It should be understood that more than the two shown input terminals may be used and that each additional input terminal will be provided with an additional diode, such as the diodes 40 and 41 of Fig. 12, and that each of these additional diodes will be connected to the terminal 43.

Figure 15:
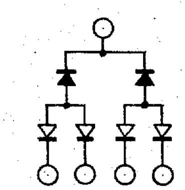

In Fig. 14 there is shown a circuit wherein separate switches, respectively comprising the diode pairs 50—51 and 52—53, feed through the respective mixer diodes 54 and 55 to the voltage responsive device represented by the electronic amplifier 60. A coincidence of positive voltage pulses at the input terminals 56 and 57, or at the input terminals 58 and 59, causes the grid voltage of the tube 60 to rise. Fig. 15 illustrates the simplified showing of the diode network.

Various types of tube circuits are indicated by blocks in the master diagram, Figs. 8*a* to 8*o*. These circuits will be described now in greater detail. Fig. 17, for example, represents in block form a double inverter unit identified as a type "IN–1." This unit is shown schematically in Fig. 16, where it is seen to comprise a twin triode amplifier 65 in which the plate 66 of the first triode is coupled through a parallel connected resistor 67 and capacitor 68 in series with a resistor 69 to the grid 70 of the second triode. The grid 71 of the first triode is connected through resistor 72 to an input terminal "3." The cathodes 73 and 74 have a common ground connection as shown. The grid 70 is connected through a resistor 69 and 75 to a grid input terminal "4" and is also coupled through resistor 69 and capacitor 76 to a grid input terminal "6." The plates 66 and 77 of the first and second triodes, respectively, are connected to plate output terminals "5" and "8." The plate circuit of the second triode also has a tap connected to the plate tap terminal "7."

Figure 16:
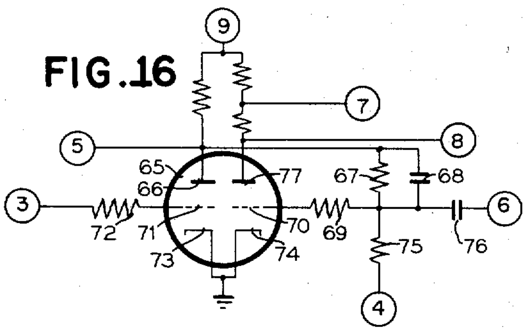
Figure 17:
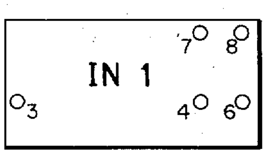

The operation of the double inverter amplifier unit shown in Figs. 16 and 17 is such that when a positive pulse is applied to the grid input terminal "3," the resulting drop of voltage at the plate 66 is communicated to the grid 70, causing a rise in voltage at the plate 77. Hence, a positive output voltage pulse is available at the plate output terminals "7" and "8," and a negative output pulse is available at the plate output terminal "5." The duration of the output pulses is substantially equal to the duration of the input pulses. A double inverter unit shown in Figs. 16 and 17 is adapted to be used in conjunction with a cathode follower type of circuit to provide a so-called "latch" unit. When used in this fashion, the unit is turned "on" by a positive pulse applied to the grid input terminal "3," and may be turned "off" or reset by the application of a positive pulse to the grid input terminal "4" or "6" or by the application of a negative pulse to the plate terminal "8." This will be explained more fully later in the description.

Figure 18:
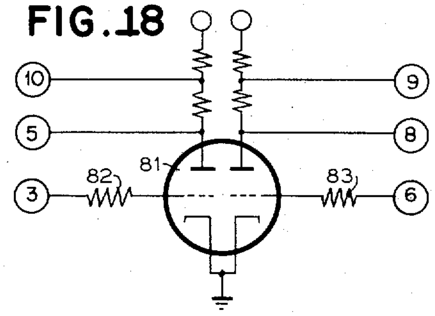
Figure 19:
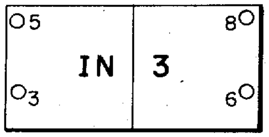

Figs. 18 and 19 illustrate another form of double inverter unit identified as a type "IN–3" comprising a twin triode 81 in which the two triode sections operate independently of each other. One triode section has a grid input terminal "3" coupled to the grid through resistor 82, a plate output terminal "5" and a plate tap terminal "10." The other triode section has a grid input terminal "6" coupled to the grid through resistor 83, a plate output terminal "8" and a plate tap terminal "9." This type of inverter unit also can be employed in a latch unit, as will be explained later. Since the unit shown in Fig. 18 is actually two separate inverters, it is represented by the divided symbol shown in Fig. 19.

Figures 20, 22:
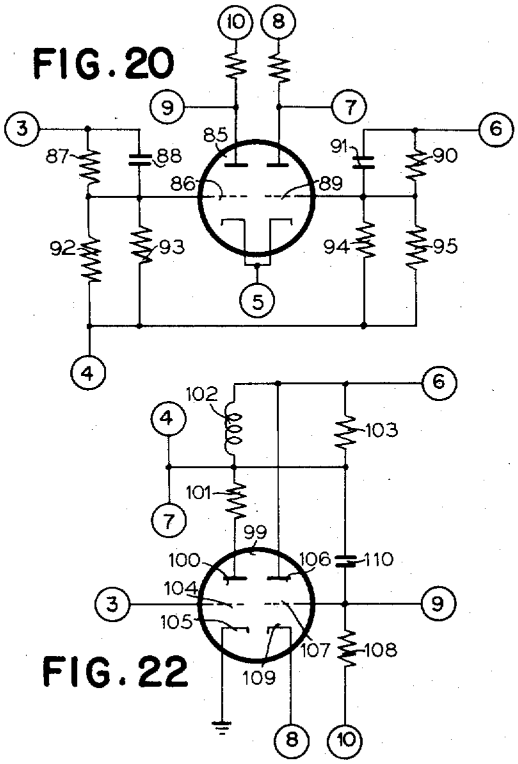
Figure 21:
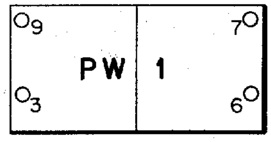
Figure 23:
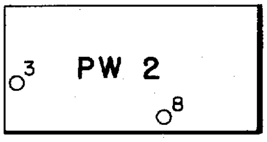

Fig. 20 schematically shows a double amplifier unit identified as type "PW–1" comprising a twin triode 85 in which the two triode sections operate independently of each other. One triode section has a grid input terminal "3" coupled to the grid 86 through a parallel connected resistor 87 and capacitor 88. This section has a plate output terminal "9." The other triode section has a grid input terminal "6" coupled to the grid 89 through a parallel connected resistor 90 and capacitor 91. This section has a plate output terminal "7." Grid 86 is biased from the bias supply terminal "4" through the parallel connected resistors 92 and 93. Grid 89 is biased from the bias supply terminal "4" through the parallel connected resistors 94 and 95. Depending upon the manner in which the grids 86 and 89 are biased, a positive pulse applied to the grid input terminal "3" will cause an amplified negative pulse output at the plate output terminal "9," or conversely, a negative pulse applied to the grid input terminal "3" will cause an amplified pulse output at the plate output terminal "9." The same results would be independently produced in the right section of the tube 85. Since the unit shown in Fig. 20 is actually two separate amplifiers, it is represented by the divided symbol shown in Fig. 21.

Fig. 22 schematically shows a twin triode tube 99 connected as a combinational amplifier and cathode follower unit, which is identified as a type "PW–2." The amplifier section comprises a plate 100 connected to the plate voltage supply terminal "6" through a resistor 101 in series with the parallel connected inductor 102 and resistor 103, a grid 104 connected to the grid input terminal "3" and a cathode 105 connected to ground. The plate 100 is connected through resistor 101 to the plate voltage output terminals "4" and "7." The cathode follower section comprises a plate 106 directly connected to the plate voltage supply terminal "6," a grid 107 connected to a grid input terminal "9" and also to the grid bias supply terminal "10" through the resistor 108, and a cathode 109 connected to the cathode output terminal "8." The plate output from the amplifier section is capacitively coupled to the grid 107 of the cathode follower section through the capacitor 110.

This tube is used in the recording circuitry as will become more apparent later in the description. The left half of the "PW–2" tube 99 is normally non-conductive. The grid input terminal "3" is generally controlled by positive pulses having a pulse-width of two microseconds. The application of a positive pulse to the grid input terminal "3" causes the left half of tube 99 to be made conductive. Plate current will flow through the inductor 102 for a two microsecond interval, which is sufficient for the current to build up to about seventy per cent of its maximum value, as determined by the grid drive, plate voltage, current limiting resistors, and plate resistance. The plate current stores energy in the inductor 102 so that when the sharp trailing edge of the pulse applied to the grid input terminal "3" renders the left half of tube 99 non-conductive, the energy stored in inductor 102 will cause an inductive spike of voltage to occur at the plate terminals "4" and "7." This spike is capacitively coupled to the grid of the right half of the tube 99, which serves as a cathode follower. Due to the biasing of the cathode follower, only the positive portions of the inductively produced signal will be effective in causing an output signal to occur at the cathode output terminal "8." The "PW–2" unit is represented in block form by the symbol shown in Fig. 23.

Figure 24:
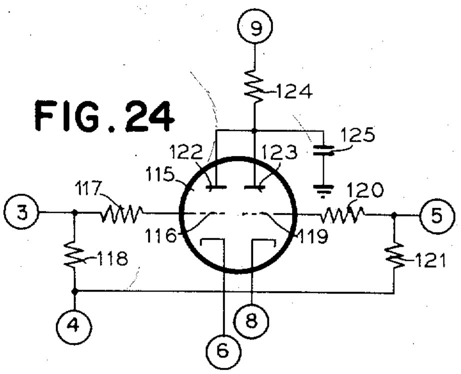
Figure 25:
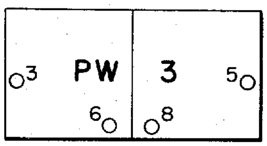

Fig. 24 illustrates another form of power amplifier unit identified as a type "PW–3" comprising a twin triode 115 in which each of the sections is connected in a cathode follower type of arrangement. The two triode sections operate independently of each other. One triode section has a grid input terminal "3" coupled to the grid 116 through resistor 117, and a cathode output terminal "6." Grid 116 is biased from the bias supply terminal "4" through resistor 118. The other triode section has a grid input terminal "5" coupled to the grid 119 through resistor 120, and a cathode output terminal "8." Grid 119 is biased from the bias supply terminal "4" through resistor 121. The plates 122 and 123 of the first and second triode sections, respectively, are commonly connected to the plate supply terminal "9" through resistor 124. The plates 122 and 123 are capacitively coupled to ground through capacitor 125, which serves as a filtering means for the plate supply voltage. The unit shown in Fig. 24 is represented by the symbol shown in Fig. 25.

The "PW–3" unit is primarily utilized in the data transfer circuitry as an impedance matching device. The biasing of the grids 116 and 119 is such that only positive pulses applied to the grid input terminals "3" and/or "5" and in excess of a predetermined minimum voltage amplitude will render either or both sections of the "PW–3" conductive.

Figure 26:
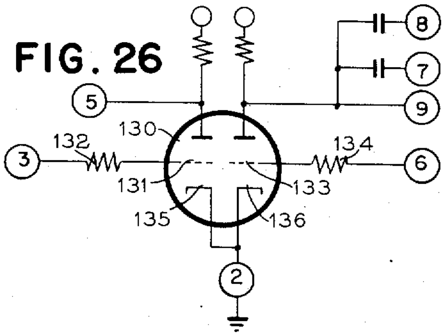
Figure 27:
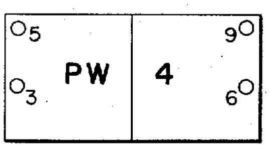

Figs. 26 and 27 illustrate another form of power amplifier unit identified as a type "PW–4" comprising a twin triode 130. One triode section has a grid input terminal "3," coupled to the grid 131 through resistor 132, and a plate output terminal "5." The other triode section has a grid input terminal "6," coupled to the grid 133 through resistor 134, and a plate output terminal "9." The plate output is also capacitively coupled to each of the plate output terminals "7" and "8." The cathodes 135 and 136 are commonly connected to the ground terminal "2." The unit shown in Fig. 26 is represented by the symbol shown in Fig. 27.

The "PW–4" unit is adapted for use as an amplifier inverter wherein the two triode sections operate independently of each other. For example, the operation is such that when a positive pulse is applied to the grid input terminal "3" there will be a negative pulse output available at the plate output terminal "5." The same operation occurs independently for the other section of the twin triode. On the other hand, the "PW–4" is also adapted to be used in a one-shot multivibrator circuit. This will be explained more fully in the description relating to the master circuit diagram for the data transfer mechanism.

Figure 28:
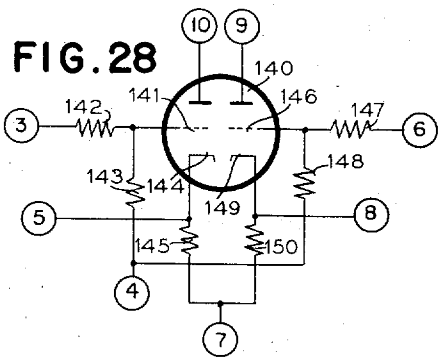
Figure 29:
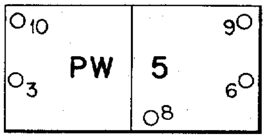

Fig. 28 illustrates a form of power amplifier unit identified as a type "PW–5" comprising a twin triode 140. One triode section has a grid 141 coupled to the grid input terminal "3" through resistor 142. The grid 141 is also coupled to the grid bias supply terminal "4" through resistor 143. The cathode 144 is connected with the cathode output terminal "5" and through resistor 145 to the terminal "7." In a similar manner, the other triode section has a grid 146 coupled to the grid input terminal "6" through resistor 147. The grid 146 is also coupled to the grid bias supply terminal "4" through resistor 148. The cathode 149 is connected with the cathode output terminal "8" and through resistor 150 to the terminal "7." Herein each triode section is connected in a cathode follower type of arrangement. Both sections operate independently of each other. The unit shown in Fig. 28 is represented by the symbol shown in Fig. 29.

Figure 30:
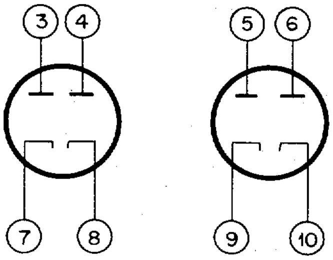
Figure 31:
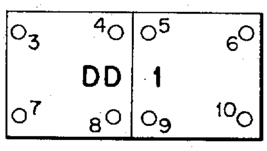

Fig. 30 shows an arrangement referred to herein as a double diode unit identified as a type "DD–1," comprising two twin diode tubes. Each twin diode comprises two plates and two cathodes. This unit is represented by the symbol shown in Fig. 31. These units are used as isolation means and to provide back-circuit elimination.

Figure 32:
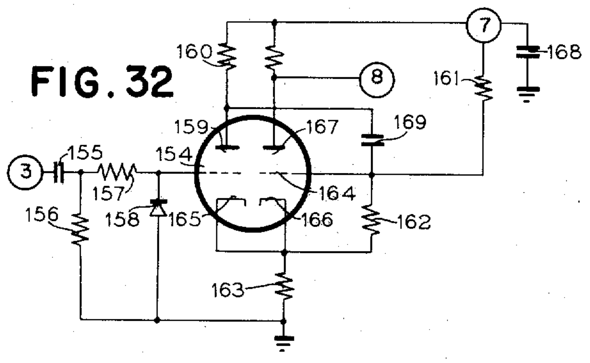
Figure 33:
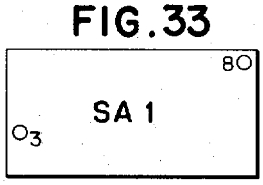

Fig. 32 shows a shaping amplifier unit identified as an "SA–1" comprising a twin triode 154, which serves as a two-stage shaping amplifier. The combination of capacitor 155, resistors 156 and 157, and diode 158 serves as a signal clamping and limiting means for signals applied to the grid input terminal "3." The plate 159 is connected to the plate supply terminal "7" through the resistor 160. The resistors 161, 162 and 163 connected between the plate supply terminal "7" and ground serve as a voltage divider network for biasing the grid 164 for the right half of tube 154 and the commonly connected cathodes 165 and 166. The plate 167 is connected to the plate output terminal "8." Capacitor 168 serves as a filtering means for the plate supply potential applied to the plate supply terminal "7." In this particular circuit arrangement the plate output from plate 159 is R-C coupled to the grid 164 through condenser 169. The circuit also utilizes the principles of cathode regeneration. The function of this unit is to shape an inductively produced type of input signal applied to the grid input terminal "3" into an amplified square wave output which occurs at the plate output terminal "8." This unit is represented by the symbol shown in Fig. 33.

Figure 34:
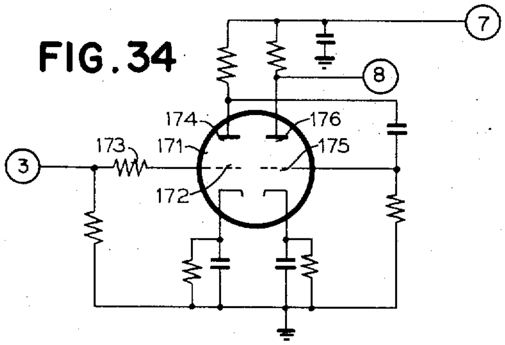
Figure 35:
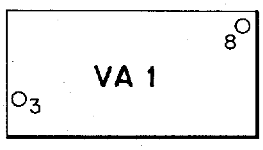

Fig. 34 shows a voltage amplifier unit identified as a "VA–1." This unit is a two-stage class A voltage amplifier using R-C coupling and cathode bias. The unit is seen to comprise a twin triode 171 having a grid input terminal "3" coupled to the grid 172 through resistor 173. The plate 174 is R-C coupled to the grid 175 of the second triode section. Plate 176 is connected to the plate output terminal "8." Herein a signal applied to the grid input terminal "3" will be amplified through the two stages and appear at the plate output terminal "8" in an amplified form. This unit is represented by the symbol shown in Fig. 35.

Figures 36, 38:
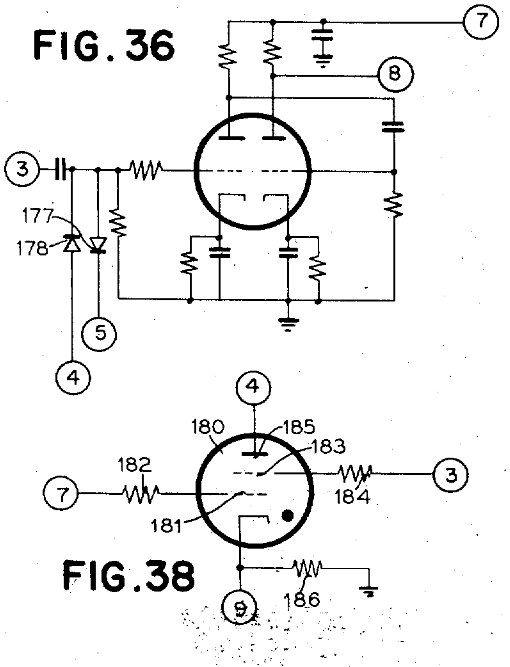
Figure 37:
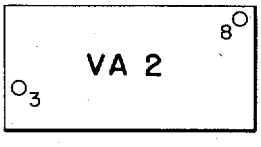
Figure 39:
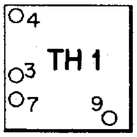

Fig. 36 illustrates another form of voltage amplifier unit identified as a "VA–2." This unit differs from the "VA–1" in that it has diode clamping in the input grid circuit provided by the diodes 177 and 178. Herein the diode clamps are used to limit any voltage surges on the input grid and serve to reduce the recovery time of the amplifier. This unit is represented by the symbol shown in Fig. 37.

Fig. 38 shows a heated cathode gas tube otherwise known as a Thyratron and identified as a "TH–1." This unit comprises a gas-filled tetrode tube 180 having one grid 181 connected to the grid input terminal "7" through resistor 182 and a second grid 183 connected to the grid input terminal "3" through resistor 184. The plate 185 is connected to the plate voltage supply terminal "4." The cathode is connected to the cathode output terminal "9" and to ground through resistor 186. Tube 180 is normally non-conductive and is rendered conductive by the coincident application of positive pulses to the grid input terminals "7" and "3." Once the Thyratron is fired, the grids lose control and do not affect the current flow. A positive signal occurs at the cathode output terminal "9" and lasts until such time that the plate voltage supply to terminal "4" is interrupted. This causes tube 180 to be deionized. This unit is represented by the symbol shown in Fig. 39.

Figure 40:
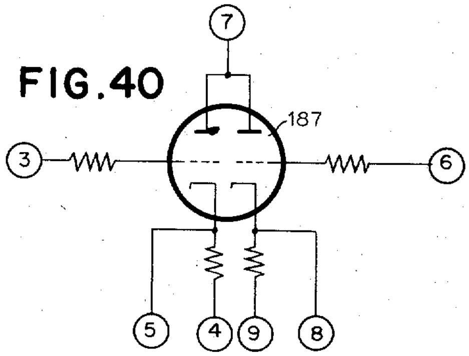
Figure 41:
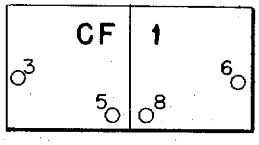

Numerous cathode followers are employed in the data transfer circuits, and in most instances it is found economical to utilize double units of this type. Fig. 40, for example, illustrates a double cathode follower unit identified as a "CF–1" and utilizing a twin triode 187 having grid input terminals "3" and "6" and cathode output terminals "5" and "8." The two cathode followers of this unit operate independently of each other. This unit is represented by the symbol shown in Fig. 41.

Figure 42:
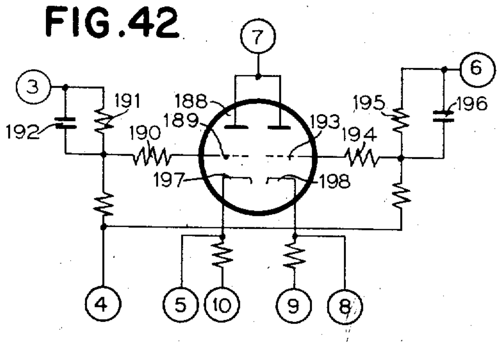
Figure 43:
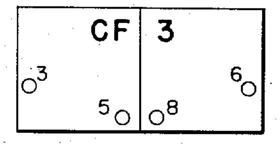

In Fig. 42 there is shown a double cathode follower unit identified as a "CF–3." This unit is seen to comprise a twin triode 188 in which the grid 189 is connected with the grid input terminal "3" through a resistor 190 in series with a parallel connected resistor 191 and capacitor 192. The grid 193 is connected with the grid input terminal "6" through a resistor 194 in series with a parallel connected resistor 195 and capacitor 196. The grids 189 and 193 are biased from the bias voltage supply terminal "4." The cathodes 197 and 198 are respectively connected to the cathode output terminals "5" and "8." Fig. 43 illustrates the simplified showing of the diode network.

Figure 44:
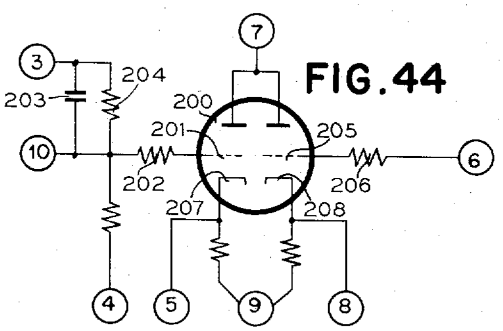
Figure 45:
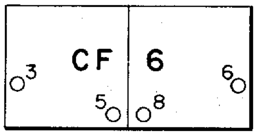

Fig. 44 shows a double cathode follower unit identified as a "CF–6." This unit comprises a twin triode 200 in which the grid 201 is connected through resistor 202 to the grid input terminal "10" and through resistor 202 in series with the parallel connected capacitor 203 and resistor 204 to the grid input terminal "3." Grid 205 is connected through resistor 206 to grid input terminal "6." The cathodes 207 and 208 are respectively connected to the cathode output terminals "5" and "8." The two cathode followers of this unit operate independently of each other. The unit is represented by the symbol shown in Fig. 45.

Figure 46:
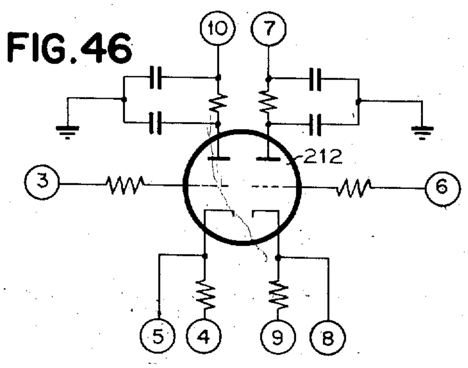
Figure 47:
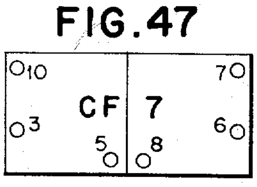

Fig. 46 illustrates another double cathode follower unit identified as a "CF–7" and utilizing a twin triode 212 having grid input terminals "3" and "6" and cathode output terminals "5" and "8." In this unit the plate circuitry includes filtering means. The two cathode followers of this unit operate independently of each other. This unit is represented by the symbol shown in Fig. 47.

Figure 48:
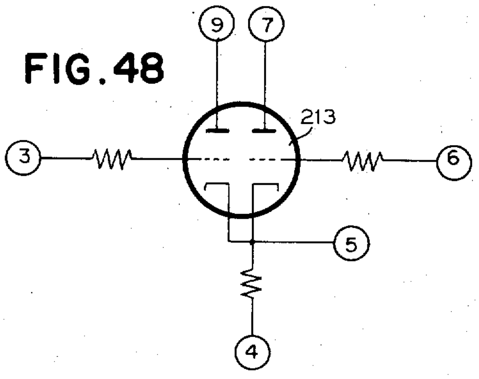
Figure 49:
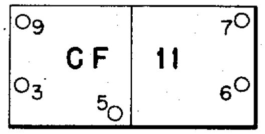

In Fig. 48 there is shown a double cathode follower unit identified as a "CF–11" and utilizing a twin triode 213 having grid input terminals "3" and "6" and a cathode follower output terminal "5." In this unit the cathodes of both sections are commonly connected. Either or both of the grid input terminals may be used for the application of input signals. Fig. 49 illustrates the simplified showing of this unit.

Figure 50:
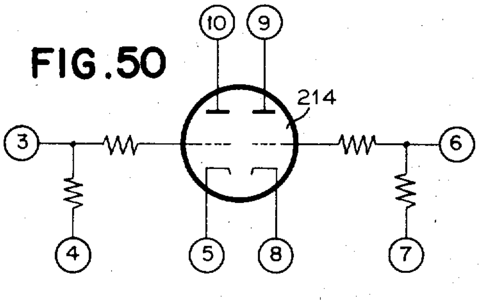
Figure 51:
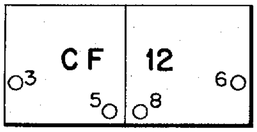

In Fig. 50 there is shown a double cathode follower unit identified as a "CF–12." This unit comprises a twin triode 214 having grid input terminals "3" and "6" and cathode output terminals "5" and "8." Herein each cathode follower is provided with an individual grid biasing means. The two cathode followers operate independently of each other. This unit is symbolically shown in Fig. 51.

Figure 52:
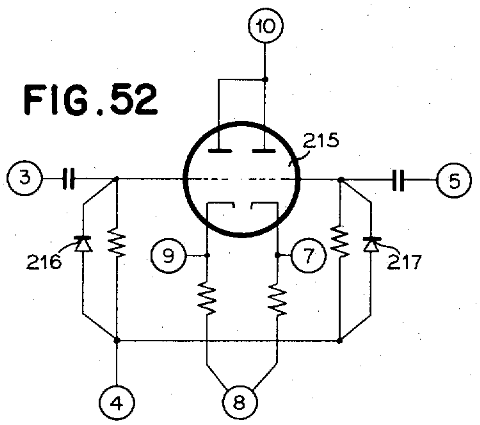
Figure 53:
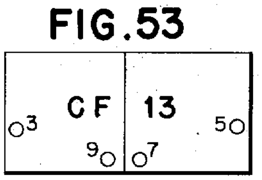

Fig. 52 shows a double cathode follower unit identified as a "CF–13." This unit comprises a twin triode 215 in which the grid input terminals "3" and "5" are each capacitively coupled to a grid. In this unit the grid circuits are provided with clamping means by use of the diodes 216 and 217. Diode clamping is utilized to establish a reference potential axis for the input signals. This unit is provided with cathode output terminals "9" and "7." The cathode followers operate independently of each other. This unit is represented by the symbol shown in Fig. 53.

Figs. 54, 55 and 56 show various forms of latch units that are employed in the data transfer circuits. Certain of these latch units are disclosed and claimed in the U.S. patent to Ernest S. Hughes, Jr., No. 2,628,309, issued February 10, 1953. The latch unit which is illustrated in Fig. 54 uses a double inverter 221 of the type "IN–1" shown in Figs. 16 and 17 above, a cathode follower unit 222 of the type "CF–3" shown in Figs. 42 and 43 above, and a combination of diodes 223 through 226 for input and feed-back purposes. In the normal "off" condition of the latch unit, the left-hand section of the double inverter 221 is cut off and the right-hand section thereof is conducting, as indicated by the "X." The application of coincident positive pulses to the switch input terminals 227 causes a positive pulse to be applied to the grid input terminal "3" of the double inverter 221, thereby turning the unit "on." The positive output voltage at the plate output terminal "8" is fed back through the cathode follower 222 and the mixer diode 226 to the grid input terminal "3" of the double inverter 221, thereby maintaining the latch unit "on." The output of the latch unit is taken from the output side of the cathode follower 222 as shown by Fig. 54.

There are several methods by which the latch unit may be reset. For example, a positive pulse may be applied to either of the grid input terminals "4" or "6" of the double inverter 221 either of which will cause the right-hand section of the inverter to be made conductive. The resultant drop in voltage at the plate output terminal "8" is fed back through the cathode follower 222 and the mixer diode 226 to the grid input terminal "3" of the inverter 221, thereby causing the left-hand section to be rendered non-conductive. Another method of resetting the latch unit is by the application of a negative pulse to the plate output terminal "8" of the inverter 221, and in the same manner, the drop in voltage at terminal "8" is fed back through the cathode follower 222 and the mixer diode 226 to the grid input terminal "3" of the inverter 221, which renders the left-hand section of the inverter 221 non-conductive.

Fig. 55 illustrates a type of latch unit which is similar to that shown in Fig. 54. The latch unit 231 is turned "on" by coincident positive pulses applied to the terminals 228. The latching action depends upon the coincidence of positive voltages at input terminals 229. One of these coincident voltages, of course, is the positive output furnished by the cathode follower 230 when the double inverter 231 is "on." The other coincidence voltage to terminals 229 is supplied by a normally positive potential source which controls the latching action. So long as the switch diodes 232 and 233 are energized by these coincident positive voltages, the double inverter 231 is latched in its "on" condition, but when the coincidence is destroyed, the unit is immediately turned "off." It is not necessary to supply a separate reset pulse for this purpose.

Another form of latch unit is shown by Fig. 56. This unit utilizes a double inverter 234 of the "IN–3" type shown in Figs. 18 and 19, a cathode follower unit 235 of the "CF–3" type shown in Figs. 42 and 43, and a combination of diodes 236 through 243 for input and feedback purposes. In the normal "off" condition of the latch unit, the left-hand section of the double inverter unit 234 is non-conductive. The application of coincident positive pulses to the switch input terminals 244 causes a positive pulse to be applied to the grid input terminal "3" of the double inverter 234, thereby turning the latch unit "on" and causing the left-hand section to become conductive. This causes a drop in voltage at the plate output terminal "5" which is coupled to the grid input terminal "3" of the cathode follower unit 235. In turn there is a voltage drop at the cathode output terminal "5" which is coupled through the mixer diode 243 to the grid input terminal "6" of the double inverter 234. This causes the right-hand section of the double inverter 234 to be made non-conductive. The resultant rise in voltage at the plate output terminal "8" is coupled to the grid input terminal "6" of the cathode follower 235 causing a positive potential output from the cathode output terminal "8." The positive potential output from cathode output terminal "8" is coupled through the mixer diode 238 to the grid input terminal "3" of the double inverter 234, thereby maintaining the latch unit "on." The positive output of the latch unit is taken from the cathode output terminal "8" of the cathode follower 235 as shown by Fig. 56. A negative output control gate is available from the cathode output terminal "5" of the cathode follower tube 235.

The latch unit is turned "off" by the application of coincident positive pulses to the switch input terminals 245 which causes a positive pulse to be applied to the grid input terminal "6" of the double inverter 234, thereby rendering the right-hand section conductive. This causes a drop in voltage at the plate output terminal "8" which is coupled to the grid input terminal "6" of the cathode follower unit 235. In turn there is a voltage drop at the cathode output terminal "8" which is coupled through the mixer diode 238 to the grid input terminal "3" of the double inverter 234. This causes the left-hand section of the double inverter 234 to be made non-conductive. The resultant rise in voltage at the plate output terminal "5" is coupled to the grid input terminal "3" of the cathode follower 235 causing a positive potential output from the cathode output terminal "5." The positive potential output from cathode output terminal "5" is coupled through the mixer diode 243 to the grid input terminal "6" of the double inverter 234, thereby maintaining the latch unit "off."

The details of the component circuits having been fully covered, the operation of the data transfer apparatus will now be described. Reference will be made to the composite diagram of Figs. 8*a* through 8*o*, inclusive, wherein the tube stages are shown schematically by block symbols. Generally these tube stages comprise twin section tubes. In some instances both sections of the tube coact to produce a single result and in other instances the sections operate individually, as previously pointed out, and thereby serve as a dual function device. For simplicity in the following detailed description relating to the circuitry, a suffix L will be used in conjunction with the tube identifying reference character to denote the left-hand section of the tube and a suffix R will be used in conjunction with the tube identifying reference character to denote the right-hand section of the tube. For example, a reference such as "tube 273–L" will signify the left-hand section of the tube identified on the wiring diagram by the reference character 273, and a reference such as "tube 273–R" will signify the right-hand section of the tube identified by the reference character 273.

DATA READ-IN

Figure 8B:
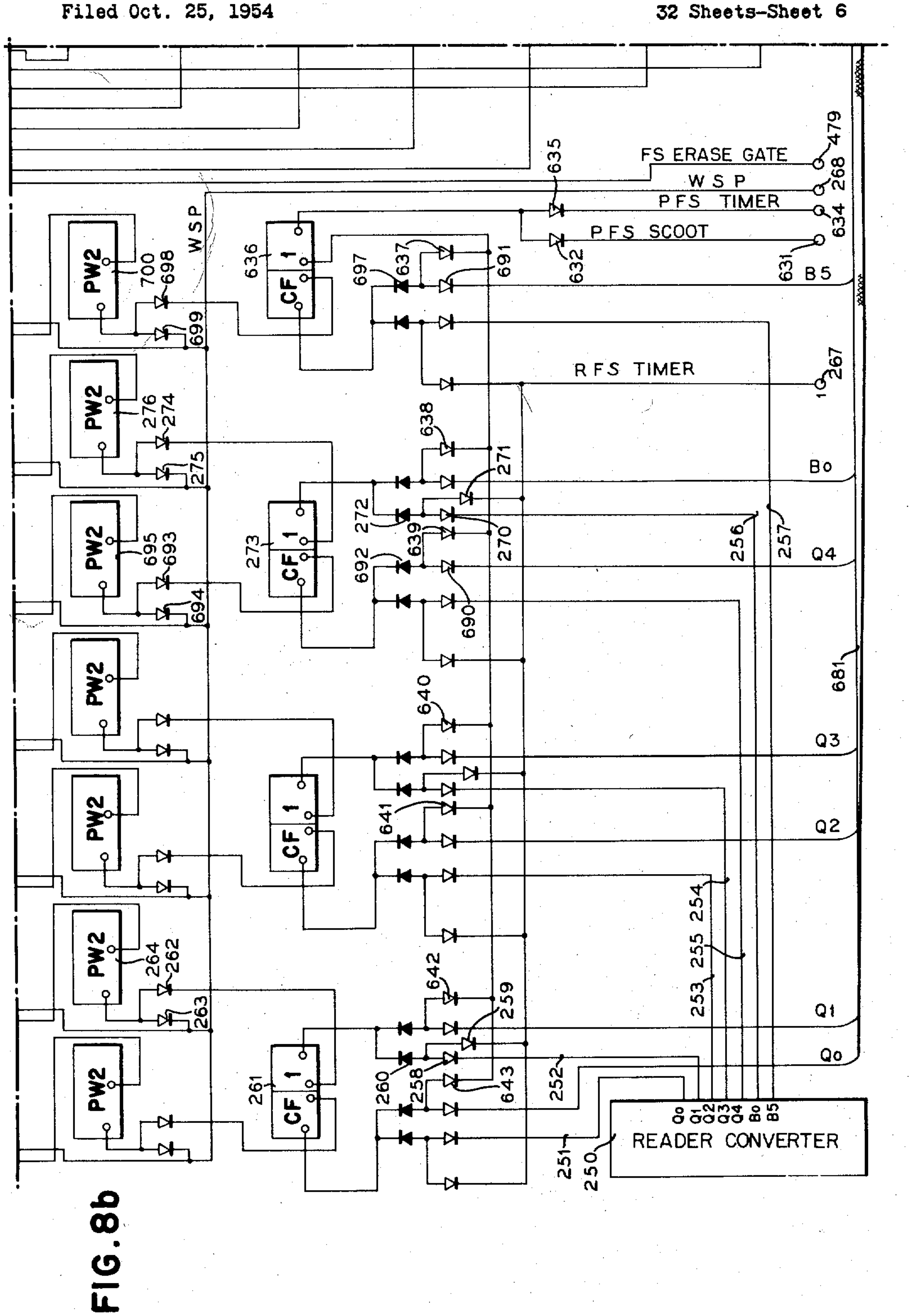

Referring now to Fig. 8*b*, the reader-converter unit, represented by the block 250, does not form a part of the present invention. However, it is schematically shown as a part of the system being disclosed herein since it constitutes the means of introducing digital information into the data processing machine. The details of a reader-converter unit are shown and described in the application for a Data Transfer System, Serial No. 399,496, filed December 21, 1953. The principles of the data transfer process described in the above-mentioned application for method 2, which concerns the parallel-by-bit, serial-by-digit method of introducing digital information to a revolving magnetic drum storage device, are used in the present system.

Briefly, the reader-converter has the function of sensing perforated record cards of the IBM type, to initiate electrical pulses corresponding to the data sensed in decimal form, to sequence the transfer of the data representing pulses, and to convert the electrical signals corresponding to the data in decimal form into electrical signals representing the digital information in accordance with the biquinary code.

The record cards of the type shown in Fig. 58 are subdivided into vertical columns and horizontal rows, or index point positions. The vertical columns may be grouped into fields and within each field the different columns pertain to different denominational orders. Ten of the index point positions pertain respectively to the ten digits "0" through "9" as indicated at the left side of the card, while two index point positions, used for control purposes, are designated as the "12" and "11" index point positions. Data is recorded in the cards by punching holes in various index point positions in the different columns. A single perforation in a column in one of the "0" to "9" index positions indicates a digital value corresponding to the position; e.g., a perforation in the "2" position represents the digit "2."

The card reader comprises a constant source of potential and a row of conductive sensing brushes, one for each column of the card. As the record card is passing the sensing brushes, each sensing brush is adapted to sense a single card column and to engage through a perforation in the column with the potential source to complete an electrical circuit. This produces digital representing signals which are further processed in the converter unit to provide output signals from the reader-converter unit 250 (Fig. 8*b*), which are representative of the digital data in accordance with the biquinary code.

The data is recorded in the factor storage section of the drum as it is read from the record card. Due to the difference in speed of operation between the card reader and the magnetic drum, an individual revolution of the drum storage device is assigned for the storage of each different kind of character. During the sensing of a particular index point on the record card, all of the characters of that index point are read out; e.g., on sensing the zero index position, all zeroes in the card are read out in sequence from right to left within each word value. The transfer of data in this manner during successive revolutions of the drum storage device involves the interspersion of magnetic recordings in order to provide a sequential arrangement of the data on the drum storage device.

In the preferred embodiment during data read-in to the data processing machine from the data source, the reader-converter 250 will produce information pulses of the type shown in line A of Fig. 59 which have a duration from B cell time until A cell time. For each digit representation a pulse of this type will occur on one of the quinary output lines 251 through 255 (Fig. 8*b*) and simultaneously a signal of this type will occur on one of the binary output lines 256 or 257 depending upon the digit value. For example, if a "2" value is being transferred from the record card to drum storage, signals will simultaneously occur on the Q–2 line 253 and on the B–0 line 256. If a "6" value is being transferred, signals will simultaneously occur on the Q–1 line 252 and the B–5 line 257.

It would be well to emphasize at this time that output signals from the reader-converter 250 (Fig. 8*b*) will occur only during a read feed cycle or the interval that a record card is being moved past the sensing brushes. The read feed operation is initiated by the program control portion of the data processing machine whenever it is desired to introduce new data into the data processing machine.

The manner in which the digit representing output signals from the reader-converter control the recording in the read factor storage section of the storage drum will hereinafter be described in detail. As previously stated, a word value is composed of ten digits plus an algebraic sign represented in digital form. As shown by the card of Fig. 58, the punched holes in the first eleven columns of the card indicate a positive word value of 0,000,002,271. The punched hole in the "9" index position of column 11 is the indication for a positive sign. In order to understand the data read-in as a whole, the read-in and recording for a single digit will be first considered. For example, we may assume that the "1" index position of the record card has advanced to a position wherein it is under the sensing brushes and the "1" perforation in column 10 of the record card is the units digit of the first word value. The sensing of the "1" perforation in column 10 will cause positive B to A pulses of the type shown in line A of Fig. 59 to repeatedly and simultaneously occur on the lines 252 and 256.

These pulses will cyclically occur on these lines five times during each revolution of the drum storage device while the "1" perforation remains under the sensing brush in the reader-converter unit 250. There is no mechanical synchronization between the reader-converter unit 250 and the storage drum 10. Synchronization is effected by digit and word pulses, as shown in Figs. 6 and 7, from the timing circuits controlled by the storage drum and supplied to the reader-converter unit 250. The application of the timing pulses in the reader-converter unit is such as to cause the B to A pulse outputs on lines 251 through 257 (Fig. 8*b*) to occur at a time which is two digital positions in advance of the true storage drum timing. This advancing is done to offset time lost in line delay and switching the transfer circuits, which will become evident as the description proceeds.

In accordance with the above, the B to A pulses representative of the "1" digit value in column 10 of the record card will occur on the lines 252 and 256 at each D–X time of every W–1 word group. The B to A pulse outputs on line 252 are coupled to the coincidence switching diode 258. Herein the B to A pulses are switched under control of a "RFS timer" gate pulse applied to the coincidence switching diode 259 from terminal 267. The "RFS timer" gate pulse is a cyclically occurring pulse which is generated once during each revolution of the storage drum and has a duration equal to ⅕ of a drum revolution which in this instance is used to dynamically control the entry of data into the read factor storage section of the storage drum. The manner in which this gate pulse is generated and its full significance will become apparent later.

The resultant B to A pulse output from the coincidence switch composed of diodes 258 and 259 is coupled through the mixing diode 260 and cathode follower tube 261–R and applied to the coincidence switching diode 262. Herein, the B to A pulse is switched with a "C" pulse otherwise referred to in this instance as a write sample pulse WSP (line B Fig. 59,) which is applied to the switching diode 263 from terminal 268. The resultant positive WSP output from the coincidence switch, composed of diodes 262 and 263, is coupled to the grid input terminal for the "PW–2" tube 264–L. The detailed operation of a "PW–2" tube was previously described. This write sample pulse WSP renders tube 264–L conductive. The trailing edge of the write sample pulse WSP changes tube 264–L to its non-conductive state, which causes an inductively produced positive pulse output from the cathode output terminal of tube 264–R beginning at the start of "D" cell time and having a duration of approximately one microsecond, as shown by line C, Fig. 59. The positive pulse output from the cathode output terminal of tube 264–R serves as a recording pulse. This pulse is passed through the "PW–3" tube 265–L, which is connected in a cathode follower type of arrangement, and coupled to the record coil of the combinational read-record head 266. The current flowing through the record coil of head 266 causes a magnetic spot of a definite polarity to be recorded in the Q–1 track of the read factor storage section of the drum 10 in the "D" cell of the D–X position for the first word in the read factor storage section of the magnetic drum as represented by a "+" sign and shown in Fig. 60.

Simultaneously, the B to A pulses occurring on the B–0 line 256 are passed to the coincidence switching diode 270 and switched with the "RFS timer" gate pulse applied to switching diode 271. The resultant B to A pulse output from the coincidence switch composed of diodes 270 and 271 is passed through the mixing diode 272 and the cathode follower tube 273–R and applied to the coincidence switching diode 274. At this point the B to A pulse is switched with a write sample pulse WSP applied to switching diode 275. The resultant write sample pulse WSP output from the coincidence switch is coupled to the input grid of the "PW–2" tube 276–L. The positive record pulse output from the cathode output terminal of tube 276–R is passed through the "PW–3" tube 277–L to the record coil of the combinational read-record head 278. The current flowing through the record coil of head 278 causes a magnetic spot of a definite polarity to be recorded in the B–0 track of the read factor storage section of the drum 10 in the "D" cell of the D–X position for the first word in the read factor storage section of the drum 10, as represented by a "+" sign and shown in Fig. 60.

In the absence of significant bits of information the D cell of the D–X position of the Q–0, Q–2, Q–3, Q–4 and B–5 tracks will remain magnetized as recorded during an erasing operation and represented by a "—" sign in each of the tracks. The description pertaining to an erasing operation will be presented later.

Summarizing the above, there has been described the method for simultaneously recording the bits of a digital "1" value according to a biquinary system of notation as magnetic spots of definite polarity on the surface of a rotating drum and in the read factor storage section. During the record card reading cycle the other digital values are stored in the read factor storage section of the drum in a similar manner. At the completion of the record card reading cycle all digits from the first word as shown in the card of Fig. 58 will have been sequentially recorded in the first word position of the read factor storage section as indicated in Fig. 60. The read factor storage section provides storage for up to ten words of digital information transferred from a single record card. It is apparent that the nine other words of digital data are concurrently read-in in the same manner.

READ FACTOR STORAGE TO GENERAL STORAGE TRANSFER

Before the digital information stored in the read factor storage section of the storage drum can be utilized in data processing operations within the data processing machine or before new digital information can be read into read factor storage, the data stored in read factor storage must first be transferred to a limited group of word positions in one of the forty storage bands in the general storage section of the storage drum. In the preferred embodiment the limited group of word positions consists of the word positions 01 through 10 in each of the forty bands. This is due to the circumferential positioning of the read factor storage section and the fact that the data transfer occurs substantially instantaneously. The transfer of data from read factor storage to general storage and the read-in of new data to read factor storage is done in a manner now to be described.

The transfer of data from read factor storage to general storage and the read-in of new data to read factor storage is directed by a six digit instruction located in the program control 15 of Fig. 1. Two digits of an instruction, referred to as an operation code, direct the operation of the data processing machine. The other four digits selectively address the location in general storage where the information is to be recorded or read out. In the preferred embodiment, the transfer from read factor storage to general storage is effected by an operation code designated as a "code 70." This operation code directs three operations, which are the transfer of data from the read factor storage section to general storage, the erasing of the read factor storage section, and the read-in of new data to the read factor storage section, all of which will hereinafter be described.

The "code 70" causes a signal to be furnished to the reader-converter unit 250 (Fig. 8*b*) and causes the read feed to initiate a card feed cycle. Once started, the card feed cycle proceeds to its logical conclusion wherein all data in the record card will be sensed and transferred to the read factor storage section.

*Data transfer control*

Figure 8C:
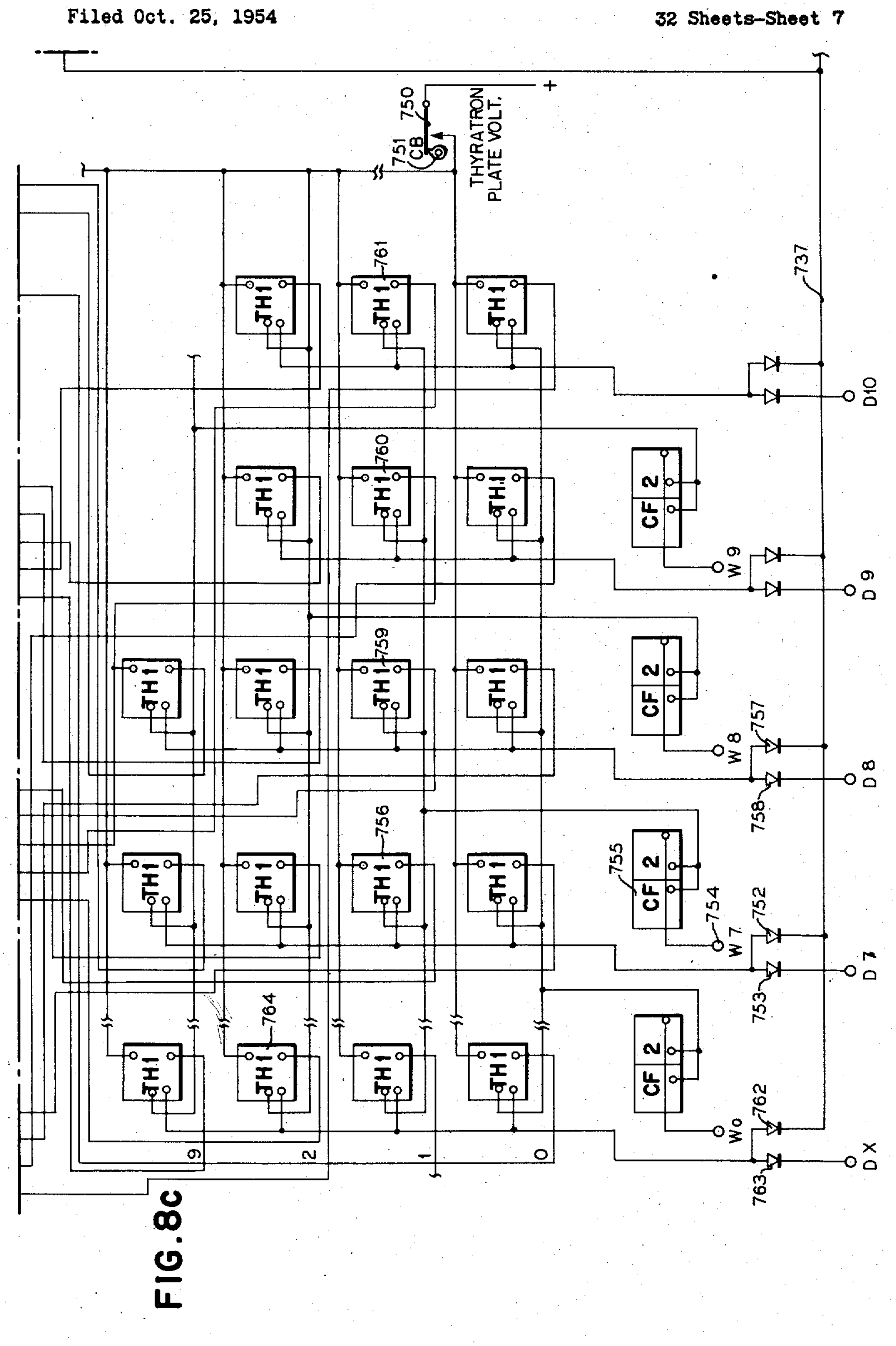
Figure 8D:
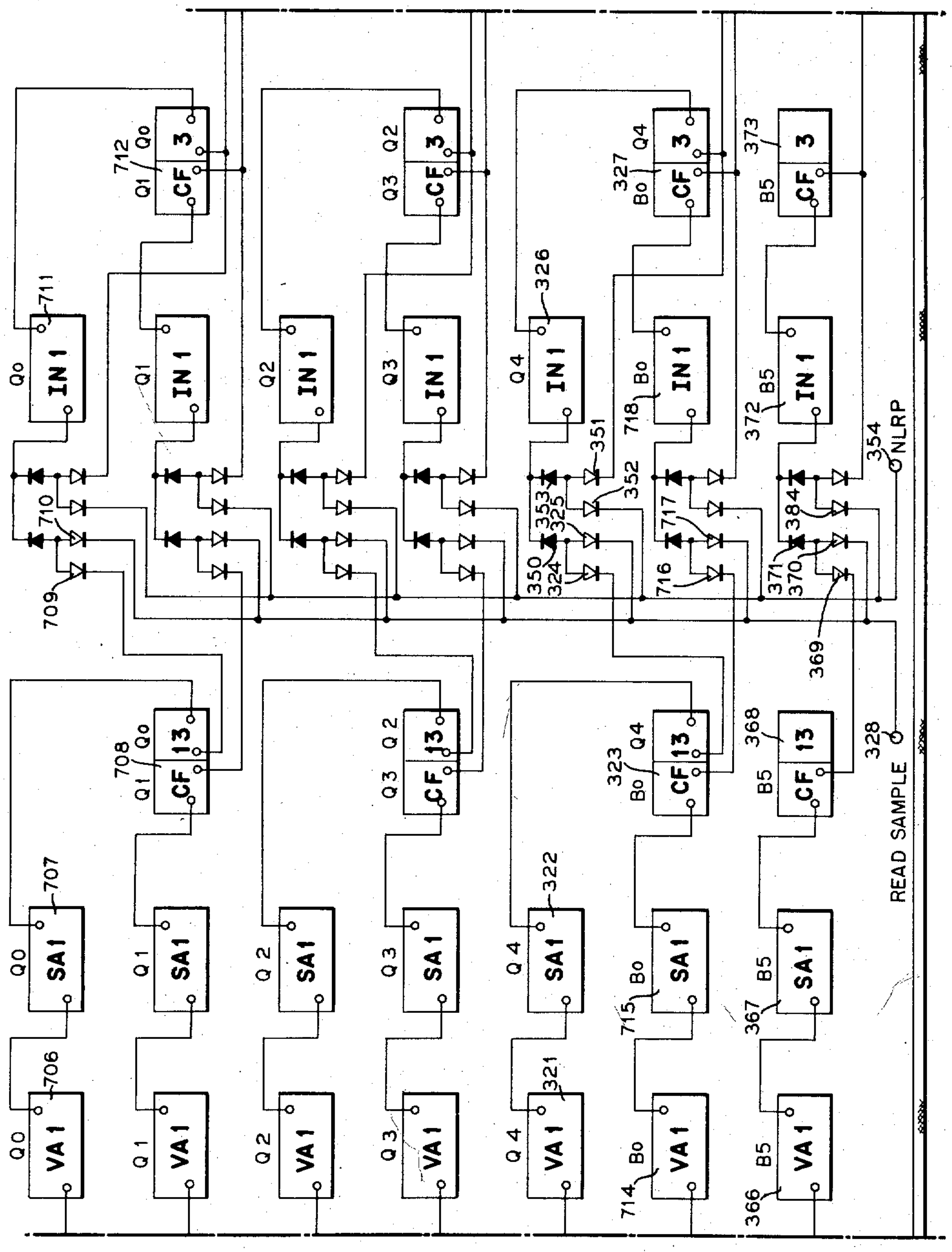
Figure 8E:
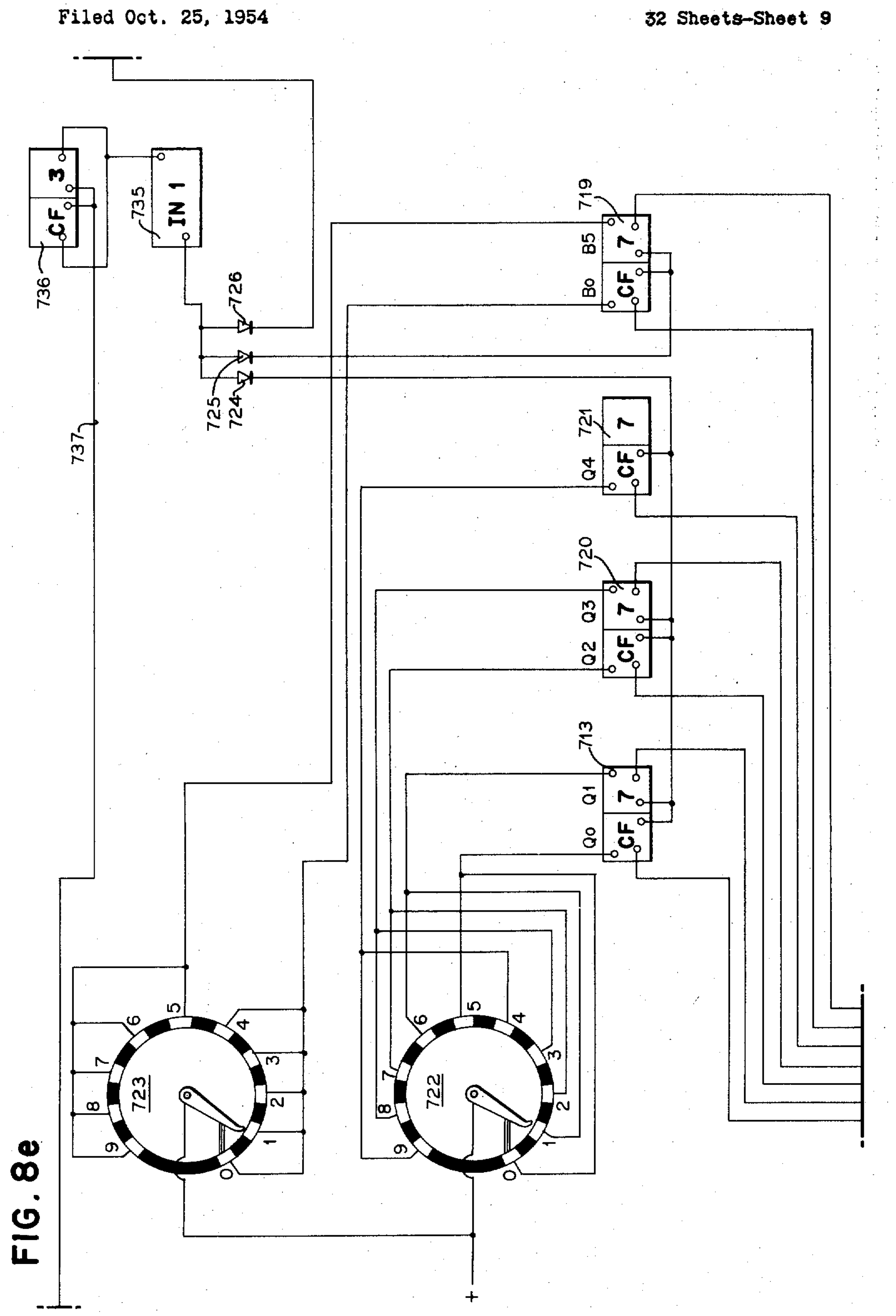
Figure 8F:
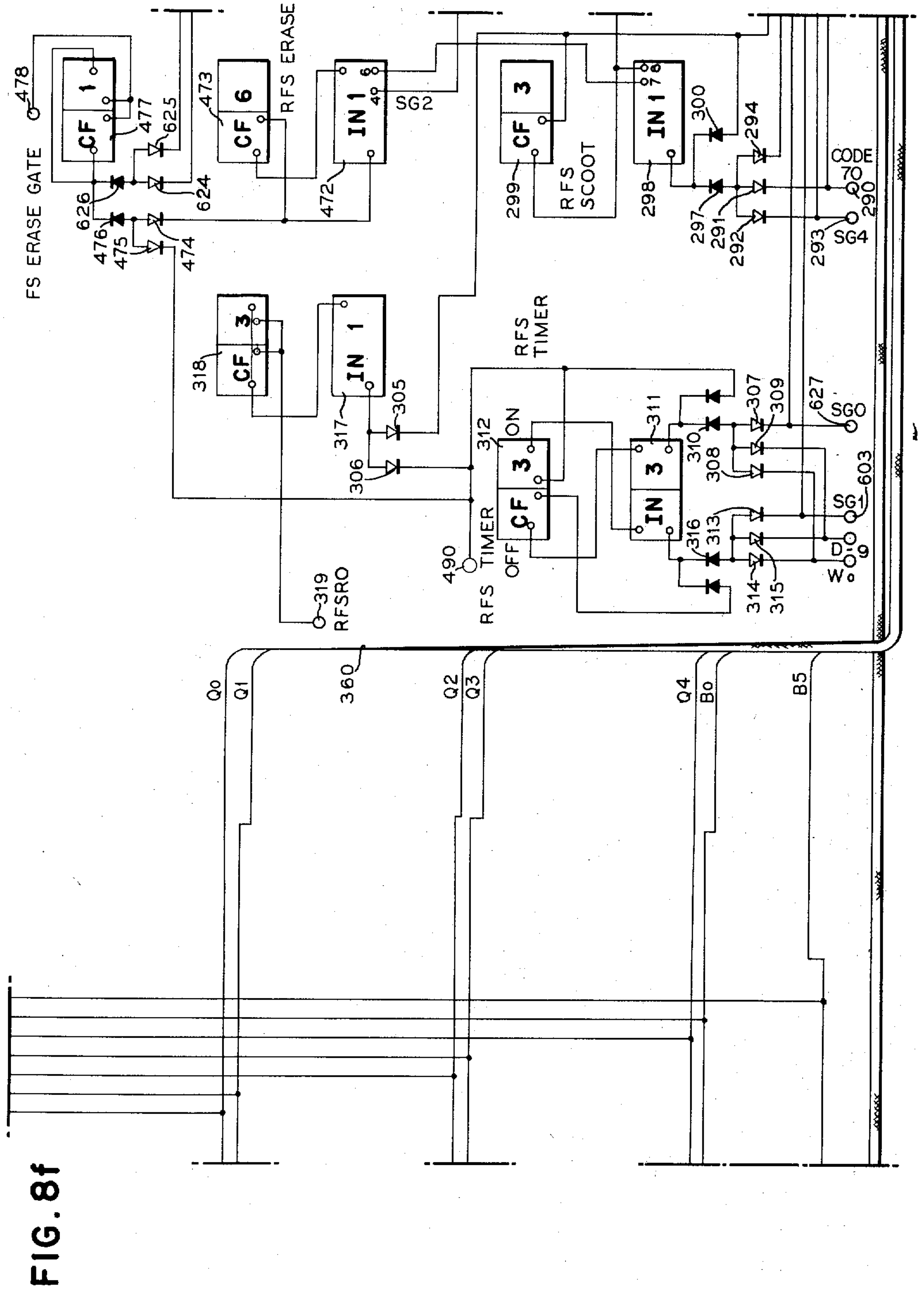

The "code 70" signal is applied to terminal 290, Fig. 8*f*. This is a positive pulse as represented by line A of Figs. 61*a* and 61*b* which may commence at any point with respect to the cycle of drum rotation. The positive pulse at terminal 290 is conducted to the coincidence switching diode 291. Herein the positive pulse is switched with a succeeding positive SG–4 sector gate timing pulse (line B, Figs. 61*a* and 61*b*) applied to the switching diode 292 from terminal 293 and a positive potential applied to the switching diode 294 from the "factor storage interlock" latch comprising tubes 295 and 296 (Fig. 8*h*) in a normally "on" condition. The momentary coincidence of positive pulses at diodes 291, 292 and 294, as indicated by lines A, B and C, respectively, in Figs. 61*a* and 61*b*, produces a positive potential which is passed through the mixing diode 297 and turns "on" the "RFS Scoot" latch comprising tubes 298 and 299–L. The positive pulse output from the plate output terminal "8" of tube 298–R is applied to the grid input terminal of tube 299–L. This causes a resultant positive pulse output from the cathode output terminal of tube 299–L, which is designated as a "RFS Scoot" gate pulse (see line D, Figs. 61*a* and 61*b*). This pulse is coupled through the mixing diode 300 to maintain the "RFS Scoot" latch in the "on" condition.

The "RFS Scoot" gate pulse, is coupled through the mixing diode 301 and serves to turn "off" the "factor storage interlock" latch, comprising tubes 295 and 296. This type of latch is shown in Fig. 56 and the details of operation were presented previously. With the "factor storage interlock" latch in the "off" condition, tube 296–L is non-conductive and tube 296–R is conductive. The positive potential output from the cathode output terminal for tube 296–R is connected to the coincidence switching diode 302. The positive potential applied to switching diode 302 is in coincidence with the positive "code 70" signal applied to the switching diode 303 from terminal 290. The resultant positive potential output from the switching diodes 302 and 303 is passed through the mixing diode 304 and serves to keep the "factor storage interlock" latch in the "off" condition for the duration of the "code 70" signal. With the "factor storage interlock" latch in the "off" condition, the drop in the output potential from the cathode output terminal for tube 296–L is applied to the coincidence switch diode 294, thereby preventing tube 298 from being turned "on" more than once for a single "code 70" signal.

The "RFS Scoot" gate pulse is also applied to the coincidence switch 305 (Fig. 8*f*) wherein it is switched with a "RFS timer" gate pulse applied to the coincidence switch 306. The "RFS timer" gate pulse, as shown by line H of Figs. 61*a* and 61*b*, is a cyclically occurring pulse initiated once during each drum revolution as the result of coincidence switching of a SG–0 sector gate timing pulse, a W–0 word timing pulse and a D–9 digit timing pulse. These timing pulses, as shown in lines E, F and G of Figs. 61*a* and 61*b*, are applied to the switching diodes 307, 308 and 309 (Fig. 8*f*) respectively. The coincidence of these timing pulses causes a resultant pulse output from the coincidence switch that is coupled through the mixing diode 310 and turns "on" the "RFS timer" latch comprising tubes 311 and 312. This type of latch was previously described and shown by Fig. 56. The "RFS timer" latch is turned "off" by the succeeding SG–1 sector gate timing pulse, a W–0 word timing pulse and a D–9 digit timing pulse, as shown by lines J, F and G of Figs. 61*a* and 61*b*, which are applied to the switching diodes 313, 314 and 315, respectively. The coincidence of these timing pulses causes a resultant pulse output that is coupled through the mixing diode 316 and turns the "RFS timer" latch "off." Consequently, the "RFS timer" gate pulse, as shown by line H of Figs. 61*a* and 61*b*, is a cyclically occurring pulse which has a duration equivalent to one sector position or ten word positions of drum rotation.

The coincidence of the positive gate pulses applied to the switch diodes 305 and 306 turns "on" the "read factor storage read-out" stage, comprising tubes 317 and 318. This action causes a positive "RFSRO" gate pulse, as shown by line K of Figs. 61*a* and 61*b*, to occur at the "RFSRO" terminal 319. The duration of the "RFSRO" gate pulse is controlled by the "RFS timer" pulse and exists for ten word positions of drum rotation. The RFSRO gate pulse is generated only once for each "code 70" signal and serves the function of dynamically timing the entry of data from read factor storage into general storage, as will become apparent later in the description.

*Data reading*

The discrete spot system of recording used in the preferred embodiment produces a bi-polar read signal for every recorded spot. On each occasion that a magnetic spot located on a track of the drum passes the reading head associated with the track, a bi-polar signal will be developed in the read coil of the reading head. These bi-polar signals are of the type shown in line D of Fig. 59. A so-called down-up signal is the read signal developed when reading a spot that has been selected to represent a stored "+" signal. A so-called up-down signal is the read signal developed when reading a spot stored during an erase operation as a "−" signal.

Referring now to Fig. 60, the leading edge of the first digital D–10 position in read factor storage will start to pass under the combinational read-record heads shortly after the "RFSRO" gate pulse commences. The digit "9" recorded in the first D–10 position of the Q–4 and B–5 tracks, as indicated by the "+" signs and indicating a digital representation of a plus condition for the first word value, will be read by the combinational heads associated with these two tracks. The magnetic spot in the D–10 position of the Q–4 track will produce a bi-polar down-up signal, of the type shown in line D of Fig. 59, in the read coil of the combinational read-record head 320 (Fig. 8*a*). The signal developed in the read coil of head 320 is coupled to the input grid of the voltage amplifier tube 321–L of the VA–1 type (Fig. 8*d*), for which the details of operation were presented previously. The voltage amplifier is a two-stage class A voltage amplifier employed herein to amplify the low level read signal produced in the read coil.

The output from the plate output terminal of tube 321–R is coupled to the grid input terminal of the two-stage shaping amplifier tube 322–L of the SA–1 type, the operation being particularly described previously. The function of this tube is to develop pulses of approximately three micro-seconds for every magnetic "+" signal sensed, and a slightly narrower pulse for each magnetic "−" signal sensed, as indicated by the pulses shown in line E of Fig. 59. In the case of a magnetic "+" signal the pulse occurs just after the center of the bi-polar read signal or approximately one-half microsecond before the start of "A" cell time, while the "−" signal produces a pulse which starts in the beginning portion of the bi-polar read signal or approximately one-half microsecond before the start of "D" cell time, as indicated by the timing chart of Fig. 59.

For the particular example being described the three microsecond signal output for the "+" signal from the plate terminal of tube 322–R is coupled to the grid input terminal of the cathode follower tube 323–R. This is a condenser coupled cathode follower utilizing diode clamping in the grid circuit for the purpose of restoring the reference axis of the unidirectional output pulse of the shaper amplifier tube 322. The positive signal output from the cathode output terminal of tube 323–R is coupled to the switching diode 324. Herein the pulse is switched with a positive read sample pulse applied to the switching diode 325 from terminal 328 for the purpose of turning "on" the Q–4 read latch, comprising the tube 326 and the cathode follower tube 327–R.

Read sample pulses are positive cyclically occurring pulses starting at the midpoint of "A" cell time and having a duration of substantially one microsecond as indicated by line G of Fig. 59. The read sample pulse is initiated by magnetic spot recordings from an "A" cell timing track on the drum through a record coil of a head physically located at a shifted position removed from the true "A" cell timing position and timed by a one-shot multivibrator. Bipolar pulses of the down-up type from the record coil are applied to terminal 330 (Fig. 8*g*) and passed through a voltage amplifier tube 331, a shaper amplifier tube 332 and cathode follower tube 333 to produce positive three microsecond pulses of the type shown by line E of Fig. 59, and which begin at approximately the midpoint of the true "D" cell time. A positive pulse output from tube 333–R is coupled through a condenser 334 and a mixing diode 335 to the input grid of the PW–4 tube 336–L. Diode 335 is clip-clamped between minus 30 volts and ground by the diodes 337 and 338. This serves to limit the operation of the input grid of tube 336–L to a potential range of from minus 30 volts to ground. The positive pulse at the input grid renders tube 336–L conductive. The resulting negative pulse output from the plate output terminal of tube 336–L is coupled through condenser 339 to the grid input of tube 336–R. The grid input circuit for tube 336–R employs a resistance-capacitance timing arrangement for pulse timing purposes. The tube 336–R is rendered non-conductive. The positive pulse output from the plate output of tube 336–R is connected to the grid input of tube 336–L and serves to keep tube 336–L conductive. The negative pulse output from the plate terminal of tube 336–L coupled through condenser 339 is also applied to the input grids for both sections of the normally conducting PW–4 tube 340. Consequently both sections of tube 340 are rendered non-conductive. The resulting positive potential at the plate output terminal for tube 340–R is coupled to the input grids for both sections of the normally non-conductive cathode follower tube 341 and renders both sections conductive for a duration of one microsecond as controlled by the circuitry associated with tube 336. The input grids for both sections of tube 341 are clip-clamped to operate in a potential range from plus 10 volts to a minus 50 volts by means of the diodes 342 and 343.

As condenser 339 charges the input grid for tube 336–R will be raised above the cut off potential in one microsecond, which causes tube 336–R to be made conductive. The resultant drop in potential at the plate output terminal for tube 336–R is effective in making tube 336–L non-conductive. The positive potential excursion occurring at the plate output terminal of tube 336–L is coupled through condenser 339 to the grid input terminal of tube 336–R causing tube 336–R to conduct more heavily. The input grid of tube 336–R is prevented from being driven above ground potential by the connection through diode 344 with ground. The positive potential excursion at the plate output terminal of tube 336–L coupled through condenser 339 is also applied to the grid input terminals for both sections of tube 340 making tube 340 conductive. This action causes both sections of tube 341 to be made non-conductive. The resultant output from the parallel connected cathode follower tubes 341–L and 341–R and occurring at terminal 345 is a positive pulse commencing at the midpoint of "A" cell time and having a duration of one microsecond. The above-described sequence occurs cyclically during the "A" cell time of every digital position throughout each cycle of drum rotation. The pulses are designated read sample pulses and are represented by line G of Fig. 59. Terminal 345 is directly connected to terminal 328 (Fig. 8*d*).

Referring now to Fig. 8*d*) wherein the positive pulse output from tube 323–R is applied to switching diode 324 and switched with a "read sample pulse" applied to the switching diode 325, the coincidence of these positive pulses provides a resultant pulse which is passed through the mixing diode 350 and serves to turn "on" the Q–4 read latch, comprising the tubes 326 and 327–R. The Q–4 read latch output from the cathode output terminal of tube 327–R is coupled to the switching diode 351 wherein it is switched with a normally positive potential applied to the switching diode 352 and passed through the mixing diode 353 to maintain the Q–4 read latch in an "on" condition. The Q–4 read latch output is a positive pulse having a duration of seven microseconds beginning at the midpoint of an "A" cell position and lasting until the beginning of the succeeding "A" cell position as indicated in line H of Fig. 59. The Q–4 read latch is reset at the start of the succeeding "A" cell position by a negative latch reset pulse NLRP, shown by line F of Fig. 59 and applied through terminal 354 to the switching diode 352. The description relating to the manner in which negative latch reset pulses NLRP are produced will be deferred until later.

The Q–4 read latch output pulse from tube 327–R is applied via cable 360 to a switching diode 355 (Fig. 8*j*) wherein it is in coincidence with the "RFSRO" gate pulse, previously described, applied to the switching diode 356 from terminal 361. It may be well to point out that Q–4 read latch output signals will be applied to the switching diode 355 on every occasion that a bit recording in the Q–4 track of the factor storage band passes the associated read-record head. However only the pulses which are concident with a "RFSRO" gate will be successful in passing through the coincidence switch. When a coincident condition exists, the Q–4 read latch output pulse is passed through the coincidence switching arrangement, mixing diode 357 and the cathode follower tube 358–L to the translator unit 359 (Fig. 8*i*) for translating from biquinary to "two out of five" code as will be described subsequently.

Simultaneous with the read-out of the Q–4 bit for the "9" value recorded in the first D–10 position in the read factor storage section of the drum 10 (Fig. 8*a*) as described above, the read-out of the B–5 bit will likewise occur. The magnetic spot in the first D–10 position of the B–5 track will produce a bi-polar down-up signal in the read coil of the combinational head 365. The signal developed in the read coil of head 365 is coupled to the input grid of the voltage amplifier tube 366–L (Fig. 8*d*) wherein the signal is amplified. The output from the plate output terminal of tube 366–R is coupled to the grid input terminal of the two-stage shaping amplifier tube 367–L. The resultant positive three microsecond signal output from the plate output terminal of tube 367–R is coupled to the grid input terminal of the cathode follower tube 368–L. The positive signal output from the cathode output terminal of tube 368–L is coupled to the switching diode 369. Herein the pulse is switched with a positive "read sample" pulse applied to the switching diode 370. The coincident output from the switching diodes 369 and 370 is passed through the mixing diode 371 and turns "on" the B–5 read latch comprising tubes 372 and 373–L.

Figure 8I:
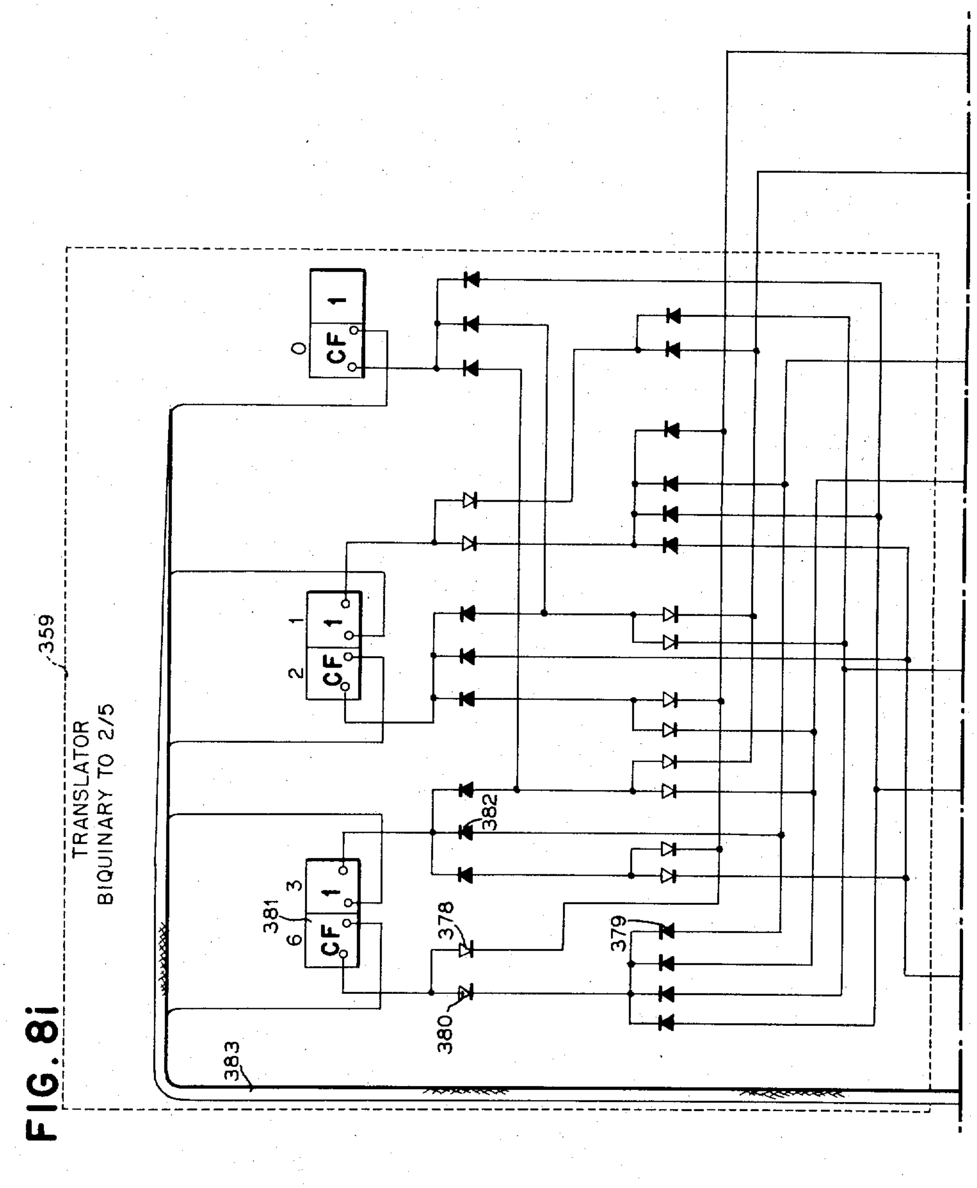
Figure 8J:
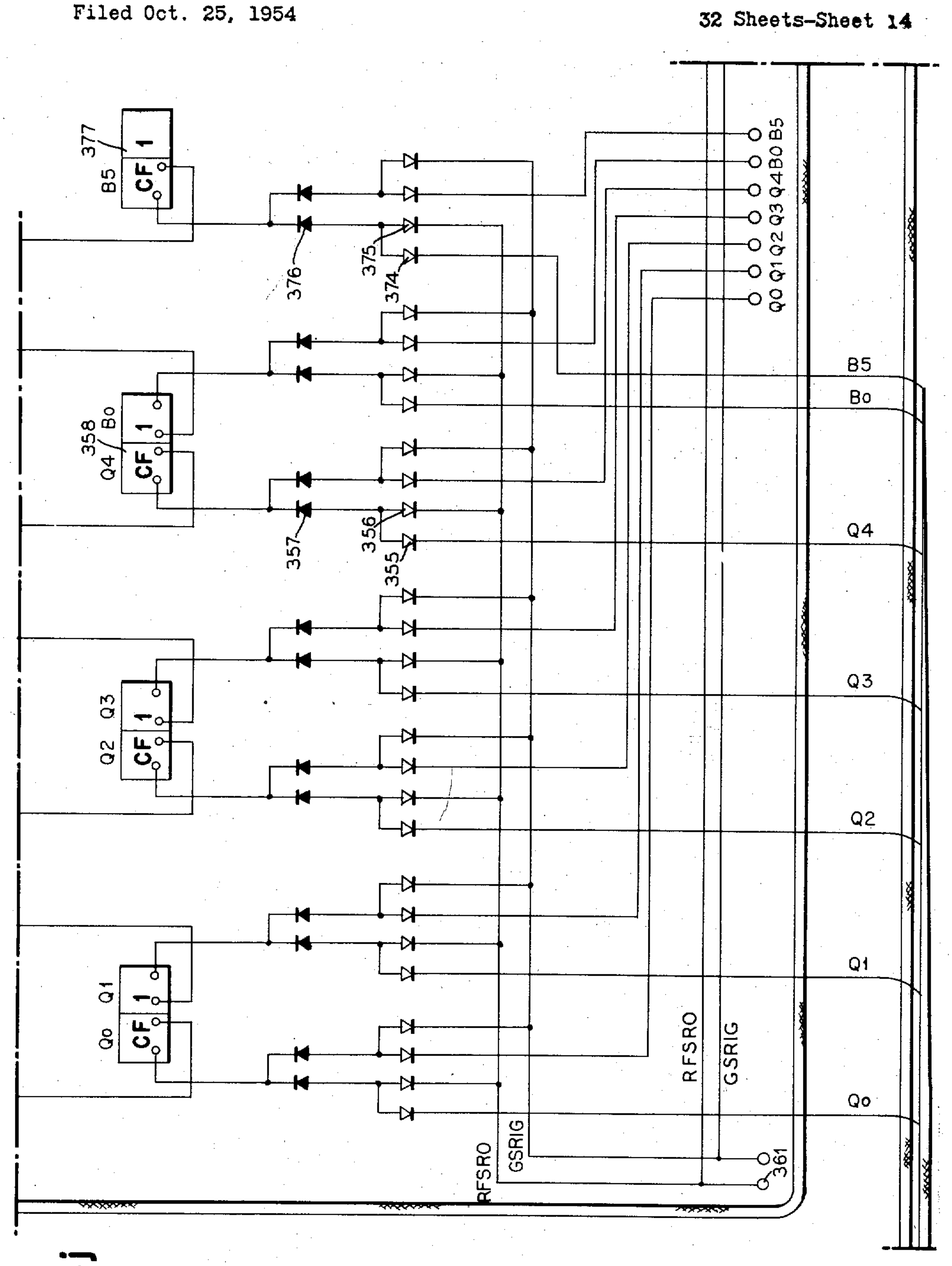

The resultant positive signal output from the cathode output terminal of tube 373–L for the B–5 read latch is applied via cable 360 to the switching diode 374 (Fig. 8*j*) wherein it is coincident with the "RFSRO" gate pulse applied to the switching diode 375. The resultant pulse is passed through the mixing diode 376 and the cathode follower tube 377–L to the translator unit 359 (Fig. 8*i*).

*Data translation (biquinary to two out of five)*

The translator 359 (Fig. 8*i*) comprises a plurality of coincidence switching diodes, mixing diodes and cathode follower tube stages for converting pulses representative of digital information according to the biquinary code into pulses representing the digital information according to a "two out of five" code. For example, the "9" digit from the D–10 position of the first word in read factor storage is represented by two coincidently occurring seven microsecond output pulses, one from the Q–4 cathode follower tube 358–L and one from the B–5 cathode follower tube 377–L, as described above. The output from the B–5 tube 377–L is applied to the switching diode 378. The output from the Q–4 tube 358–L is passed through the mixing diode 379 to the switching diode 380. These coincident pulses produce a resultant pulse which is applied to the input grid of the "6" bit cathode follower tube 381–L. The output from the Q–4 tube 358–L is also passed through the mixing diode 382 and applied to the input grid of the "3" bit cathode follower tube 381–R. The resultant coincident seven microsecond pulse outputs from the "6" bit and "3" bit cathode follower tubes 381–L and 381–R, respectively, which represent the digit "9" according to the "two out of five" code system as shown by the chart of Fig. 4, are coupled via cable 383 to the input of the "read-record matrix" shown in Figs. 8*k* and 8*l*.

*Read-record matrix*

The read-record matrix is a device used herein for the purpose of selectively controlling the read-record-erase circuitry associated with the general storage section of the magnetic storage drum. The read-record matrix includes means for selecting one of a plurality of groups of combinational heads for recording into or reading from a particular band of tracks in the general storage section of the storage drum. The matrix also incorporates the amplification means for the read signals, as will appear subsequently.

A band in general storage is statically selected under control of the quinary portion of the thousandths order, the binary and quinary portions of the hundredths order, and the binary portion of the tens order of a four digit address located in an address register of the program control unit 15 of Fig. 1. During data processing operations, a particular word address within a band is dynamically selected under control of the quinary portion of the tens order and the binary and quinary portion of the units order of the four digit address. However, during the transfer of a group of words from read factor storage to general storage or during the transfer of a group of words from general storage to punch factor storage, the dynamic selection for the group of word positions within a band in general storage is controlled by gate pulses. For example, the dynamic selection for the transfer of a group of words from read factor storage to general storage is under control of the "RFSRO" gate pulse, previously described.

In order to simplify the circuitry of the master circuit diagrams of Figs. 8*a* through 8*o* and due to the similarity of the circuits in the read-record matrix, it was deemed sufficient to show only the circuitry accommodating two of the five bits for the "two out of five" code system. The operation for the transfer of a single digit should enable an understanding of the operation of the read-record matrix as a whole, it being apparent that other bits of digital information would be transmitted through parallel circuits which operate in the same manner.

Figure 8K:
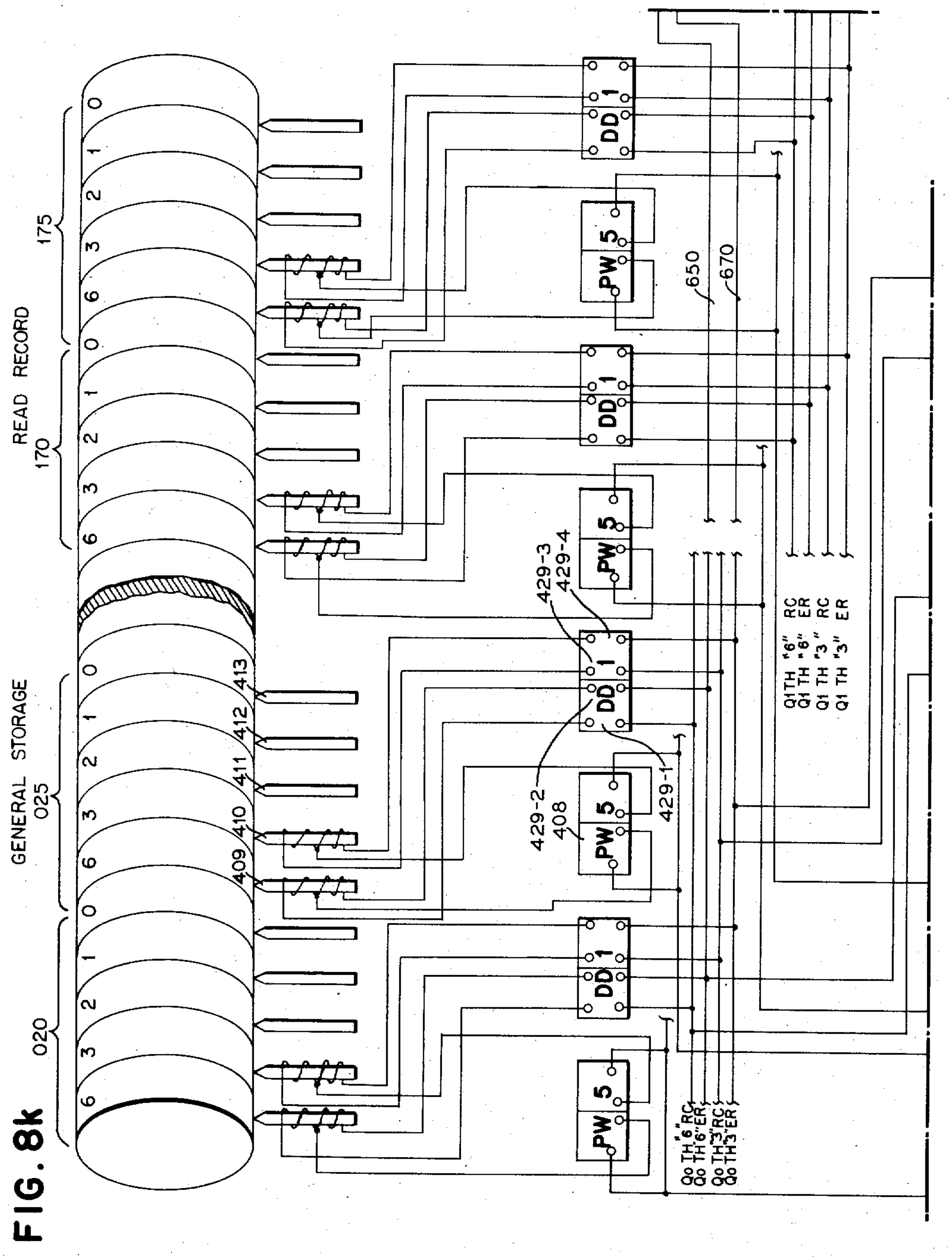
Figure 8L:
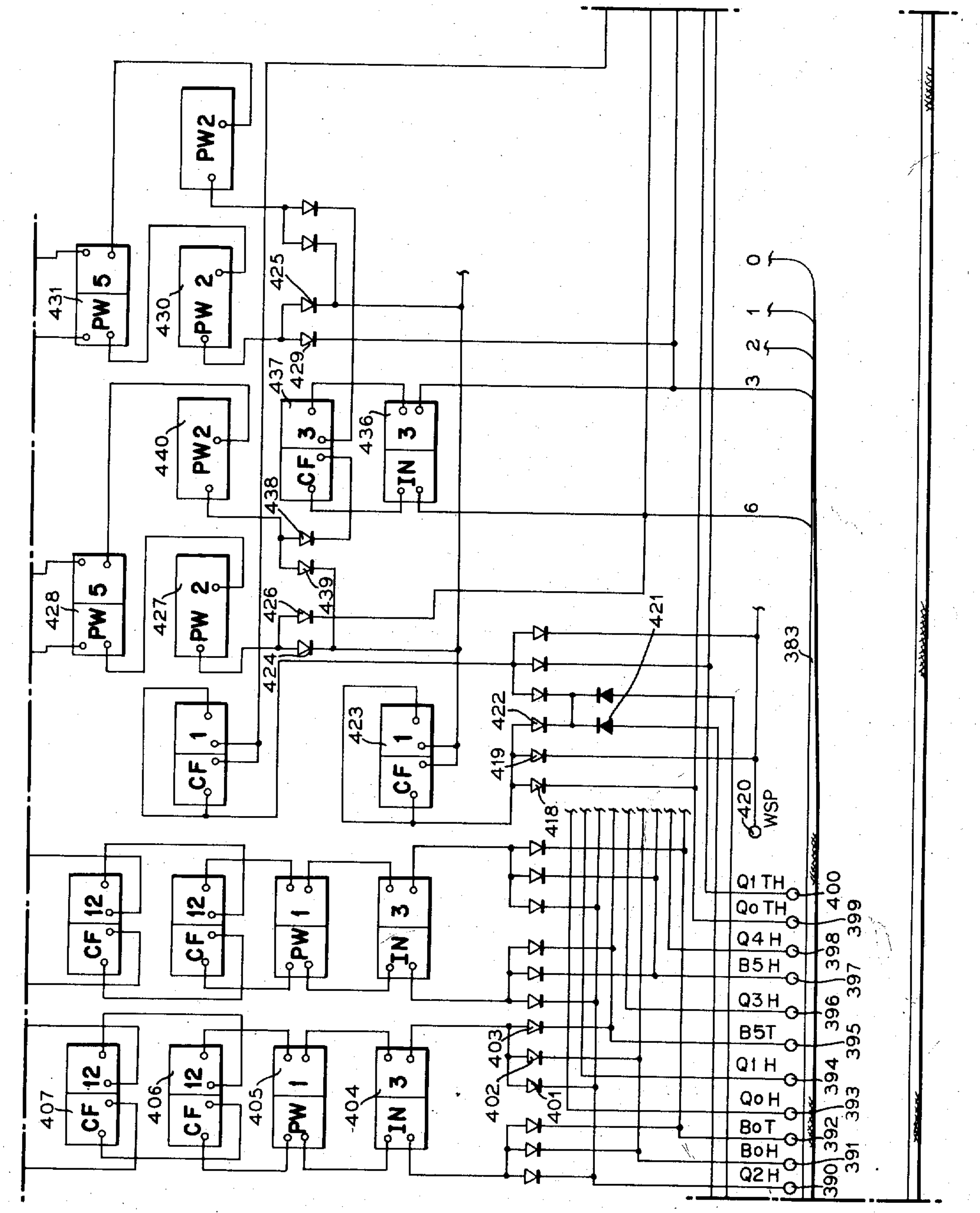

The quinary portion of the thousandths order, the binary and quinary portions of the hundredths order, and the binary portion of the tens order of a four digit address located in the address register of the program control unit 15 (Fig. 1) controlling static band selection causes positive potential conditions to exist on a combination of the address terminals 390 through 400 of Fig. 8*l*. For an illustrative example, we may arbitrarily assume that the group of words stored in the read factor storage section are being transferred to the band in general storage addressed as "025–*x*" (Fig. 8*k*). Then under control of the address stored in the address register of the program control 15 (Fig. 1), a positive potential condition will exist on the Q0TH terminal 399, the B0H terminal 391, the Q2H terminal 390 and the B5T terminal 395 (Fig. 8*l*) which represents the band "025–*x*." The positive potentials on the terminals 390, 391 and 395 are connected to the switching diodes 401, 402 and 403, respectively. Since the potentials are coincident there will be a resultant potential output coupled to the input grid of tube 404–R. This renders tube 404–R conductive. The resultant potential drop at the plate output of tube 404–R is coupled to the input of the "PW–1" tube 405–R making this normally conductive tube now non-conductive. The increase in potential at the plate output terminal of tube 405–R is passed through the serially connected cathode follower tubes 406–R and 407–R and the "PW–5" tube 408–L connected in a cathode follower arrangement. The resultant potential condition at the cathode output terminal of tube 408–L raises the center tap connection of the coil on the read-record head 409 for the "6" bit track from approximately −10 volts to approximately +110 volts. In a similar manner the output from the cathode output terminal of tube 407–R is passed through the "PW–5" tube 408–R and raises the center tap connection of the coil on the read-record head 410 for the "3" bit track from approximately −10 volts to +110 volts. Similarly and simultaneously, the center tap connections for the heads 411, 412 and 413 for the "2," "1" and "0" bit tracks, respectively, are raised to approximately +110 volts.

The positive potential at the Q0TH terminal 399 is connected to the switching diode 418. Write sample pulses WSP are connected to the switching diode 419 via terminal 420. In this particular instance, a "RFSRO" gate pulse is passed through the mixing diode 421 and applied to the switching diode 422. The switching diodes 418, 419 and 422 form a coincidence switch for the Q0TH potential, a WSP, and a "RFSRO" gate pulse. The coincidence of these pulses produces a resultant WSP output which is passed through the parallel connected cathode follower tube 423. The output at the cathode output terminals of tube 423 is applied to the switching diodes 424 and 425. The WSP applied to the switching diode 424 is switched with a "6" bit information output pulse from the biquinary to "two out of five" translator, as previously described, applied to the switching diode 426 via cable 383. The coincidence switching produces a positive WSP pulse output that is applied to the input grid of the "PW–2" tube 427–L. This renders tube 427–L conductive during "C" cell time. The trailing edge of the WSP pulse renders tube 427–L non-conductive, which causes an inductively produced positive record pulse output from the cathode output terminal of tube 427–R starting at the beginning of "D" cell time. This output pulse otherwise referred to as a record pulse, is applied to the grid input of the "PW–5" tube 428–L. In this instance the "PW–5" tube 428–L is connected as an inverter-amplifier. The resultant drop in potential at the plate output terminal of tubes 428–L is coupled to the cathode of the diode tube 429–1. This drops the cathode of the diode tube 429–1 from approximately +110 volts to approximately +10 volts. The plate of the diode tube 429–1 is connected to the record coil of the combination head 409. The potential of approximately +110 volts at the center tap connection of the coil on head 409 and the potential of approximately +10 volts at the cathode of the diode tube 429–1 causes the diode tube 429–1 to conduct. The current flow through the record half of the coil on head 409 causes a magnetic spot to be recorded on the surface of the drum in the "6" bit track for the "025–*x*" band. This magnetic spot will be recorded as a "+" spot in the D–X digital position, as shown by Fig. 60. By an examination of the timing chart of Fig. 59 it may be noted how the digit "9" in the first D–10 position in read factor storage has been delayed to the D–X position for recording in general storage.

In a similar manner, the WSP applied to the switching diode 425 is switched with a "3" bit information pulse from the biquinary to "two out of five" translator applied to the switching diode 429 via cable 383. The coincidence switching in the diodes 425 and 429 produces a positive WSP pulse output that is applied to the input grid of the "PW–2" tube 430–L. The trailing edge of the WSP pulse causes an inductively produced positive record pulse output at the cathode output terminal of tube 430–R. This record pulse is passed through the inverter-amplifier tube 431–L and the diode 429–3 and causes a magnetic spot to be in the "3" bit track for the "025–*x*" band. This spot will be recorded as a "+" spot in the D–X digital position, as shown by Fig. 60.

It will now be shown how the erasing operation occurs concurrently with a recording operation. For example, we may assume that the "6" bit information pulse output from the biquinary to "two out of five" translator did not occur on the "6" bit line of cable 383. The "6" bit line from cable 383 is connected with the input grid of the inverter-amplifier tube 436–L. Tube 436–L is normally non-conductive and remains in this condition. The more positive potential at the plate output terminal of tube 436–L causes tube 437–L to be conductive. The positive potential output from the cathode output terminal 437–L is applied to the switching diode 438. Herein a coincident WSP pulse output from tube 423 applied to the switching diode 439 causes a resultant positive potential output which renders the "PW–2" tube 440–L conductive. The trailing edge of the WSP renders tube 440–L non-conductive, which causes an inductively produced positive record pulse output at the cathode output terminal of tube 440–R. This record pulse is passed through the inverter-amplifier tube 428–R. The resultant output at the plate output terminal of tube 428–R causes the cathode potential of the diode 429–2 to drop from approximately +110 volts to approximately +10 volts. The plate of the diode tube 429–2 is connected to the erase coil of the combinational head 409. The +110 volt potential at the center tap connection of the coil on head 409 and the +10 volt potential at the cathode of the diode tube 429–2 causes the tube 429–2 to conduct. The current flow through the erase half of the coil on head 409 causes a magnetic spot to be recorded on the surface of the drum. This magnetic spot will have a polarity opposite to that representing an information signal and is therefore represented by a "—" sign.

It should be apparent that an information signal for the "6" bit will render the tube 436–L conductive thereby causing a drop in the potential applied to the switching diode 438. When this condition exists a WSP is prevented from being switched in the coincidence switch consisting of the diodes 439 and 438 and consequently no erase record pulse is generated.

According to the above-described recording operations, the "9" digit of the illustrative example is recorded and represented by "+" signs on the "6" and "3" bit tracks in the D–X position, as shown by Fig. 60. Concurrently the D–X position in the "0," "1" and "2" tracks are erased as indicated by the "—" signs, as shown in Fig. 60.

Summarizing the data transfer from read factor storage to general storage thus far, it has been shown and described how the read factor storage read-out "RFSRO" gate was initiated. A digit "9" value in the first D–10 position in read factor storage produced read signals during "D" cell time which were amplified and shaped and switched with "read sample" pulses during the ensuing "A" cell time to produce information pulses. The information pulses in accordance with the biquinary code were then translated into information pulses according to the "two out of five" code which were then switched with write sample pulses WSP to produce record pulses. The record pulses produced magnetic spots during the succeeding "D" cell time on the surface of the drum in the D–X positions of a selected band representing the digit "9" value in accordance with the "two out of five" code. Concurrently with the recording of the "9" value, the "0," "1" and "2" bit tracks are erased. It may be noted that there is a shift of one digital position during the transfer operation. This should be apparent from an examination of the timing chart of Fig. 59 and the storage representations shown by Fig. 60.

After the "9" value has been recorded during "D" cell time and at the beginning of the ensuing "A" cell time, the Q–4 read latch (Fig. 8*d*) comprising tubes 326 and 327–R and the B–5 read latch comprising tubes 372 and 373–L are reset by means of a "negative latch reset pulse" NLRP, shown in line F of Fig. 59, applied to the switching diodes 352 and 384, respectively, via the NLRP terminal 354.

*Negative latch reset pulse*

The negative latch reset pulse NLRP, as the name implies, is used as a resetting means for turning various latches within the data processing machine to an "off" condition. The negative latch reset pulse NLRP, as shown by line F of Fig. 59, is a negative pulse initiated by an "A" pulse from the timing circuits and timed by a one-shot multivibrator so as to have a duration of approximately one microsecond, as will now be described.

"A" pulses, as shown by Fig. 7 and which are emitted from the timing circuits, are coupled to terminal 450, Fig. 8*g*. Positive "A" pulses occurring at terminal 450 are coupled through a condenser 451 and a mixing diode 452 to the input grid for the PW–4 tube 453–L and to both input grids of the PW–4 tube 454. Diode 452 is clip-clamped between minus 30 volts and ground by the diodes 455 and 456. This serves to limit the operation of the input grid of tube 453–L and the input grids to tube 454 to a potential range of from minus 30 volts to ground. A positive "A" pulse coupled to the input grids of tube 454, which serves as an inverter-amplifier, raises the input grids to ground potential and renders both halves of tube 454 conductive. The resulting negative pulse output from the plate output terminal of tube 454–R is coupled to the input grids for both halves of the normally conducting "CF–1" tube 457. The input grids of tube 457 are clip-clamped to operate in a potential range from plus 10 volts to a minus 50 volts by means of the diodes 458 and 459. The negative pulse applied to the input grids of tube 457 renders both halves non-conductive for a duration determined by the circuitry associated with tube 453, now to be described.

The "A" pulse applied to the input grid of tube 453–L, which is connected in a conventional one-shot multivibrator arrangement, renders this section conductive. The resultant negative pulse output occurring at the plate output terminal of tube 453–L is capacitively coupled to the input grid of tube 453–R through condenser 460. This causes tube 453–R to be made non-conductive. As condenser 460 charges, the input grid of tube 453–R will be raised to its cut off potential in approximately one microsecond, which causes it to be made conductive. The resultant drop in potential at the plate output terminal of tube 453–R is effective in making tube 453–L and both halves of tube 454 non-conductive. The positive potential excursion occurring at the plate output terminal of tube 453–L is coupled through condenser 460 to the grid input terminal of tube 453–R causing the right-half to conduct more heavily. The input grid of tube 453–R is prevented from raising above ground by its connection to ground through the diode 461. The cutting off of conduction in tube 454 causes both halves of tube 457 to become conductive. The resultant output from the parallel connected cathode follower tube 457 is a negative pulse occurring at terminal 462 and having a duration of approximately one microsecond. The "negative latch reset pulse" NLRP outputs at terminal 462 is connected to various latch stages in the data transfer system and is used for resetting purposes.

Returning now to the data transfer from read factor storage to general storage, in a similar manner to that described above for a digit "9," the remaining digital values of the first word in the read factor storage section of the drum, as shown in Fig. 60 will be successively transferred to the band in general storage identified as "025–*x*." Additionally the remaining nine words of digital information in the read factor storage section will be transferred to the successive word positions of the selected band in general storage identified as "025–*x*." The complete transfer of digital information from the read factor storage section to the general storage section of the drum requires one-fifth of a drum revolution and is under control of the read factor storage read-out "RFSRO" gate.

The "RFS timer" latch (Fig. 8*f*) is turned "off" at SG–1, W–0, D–9 time, as shown by line K, Figs. 61*a* and 61*b*. The turning "off" of the "RFS timer" latch destroys the coincidence at the coincidence switching diodes 305 and 306 (Fig. 8*f*), and consequently the "read factor storage read-out" "RFSRO" signal is terminated.

*Read factor storage erase operation*

As previously stated, the transfer of data from read factor storage to general storage is followed by an operation wherein the read factor storage section of the drum 10 is erased of all previously stored data. The manner in which the read factor storage erase operation is accomplished will now be described.

At the start of the succeeding SG–3 time, an SG–3 sector gate timing pulse is applied to the grid input terminal of tube 470–L (Fig. 8*h*) via terminal 471. This positive sector gate timing pulse renders tube 470–L conductive. The resultant drop in potential at the plate output terminal of tube 470–L is coupled to the "8" plate terminal of tube 298–R and turns the "RFS scoot" latch "off." The drop in potential at the plate terminal "7" of tube 298–R is applied to the "6" grid input terminal of tube 472–R. This causes the "RFS erase" latch comprising tubes 472 and 473–L to be turned "on." With the "RFS erase" latch in an "on" condition, tube 473–L is made conductive. The positive potential output from the cathode output terminal of tube 473–L is applied to the grid input terminal of tube 472–L to keep the latch in the "on" state. The positive potential output is also applied to the switching diode 474.

At the succeeding SG–0, W–0, D–9 time, the "RFS timer" latch comprising tubes 311 and 312 is again turned "on." The "RFS timer" latch positive output from the cathode output terminal of tube 312–R is applied to the switching diode 475 wherein it is switched with the "RFS erase" latch output pulse. The resultant pulse is passed through the mixing diode 476 and renders the parallel connected cathode follower tube 477 conductive. The resultant positive "RFS erase" gate pulse output from the cathode output terminals of tube 477 is connected to terminal 478.

The "RFS erase" gate pulse occurring at terminal 478 is applied at terminal 479 (Fig. 8*b*) from which it is connected to the switching diodes 480 through 486 (Fig. 8*a*) wherein it is switched with write sample pulses WSP. For example, the "RFS erase" gate pulse applied to switching diode 481 is switched with a WSP applied to the switching diode 487. The resultant WSP output from the coincident switching diodes 481 and 487 causes the "PW–2" tube 488–L to be made conductive. The trailing edge of the WSP pulse renders tube 488–L nonconductive. The resultant inductively produced positive pulse output from the cathode output terminal of tube 488–R is passed through tube 277–R and applied to the erase coil of the combinational head 278. This produces a magnetic spot on the "B–0" track of a polarity represented by a "—" sign. In a similar manner, the "Q–0," "Q–1," "Q–2," "Q–3," "Q–4" and "B–5" tracks are simultaneously erased.

The erasing operation occurs repeatedly so that every digital position for each of the seven tracks in the read factor storage section is recorded with a magnetic spot representative of an erased condition. The "RFS erase" gate pulse has a duration equal to one-fifth of a drum revolution which is the interval that the read factor storage section is passing under the combinational read-record heads associated with the factor storage band of the drum storage device.

The "RFS erase" gate is turned "off" when the "RFS timer" latch comprising tubes 311 and 312 (Fig. 8*f*) is turned "off" at SG–1, W–0, D–9 time. At the start of the succeeding SG–2 timing gate, the "read factor storage erase" latch, comprising tubes 472 and 473–L is turned "off" by the SG–2 timing gate which is applied to the "4" grid input terminal for tube 472–R.

It may be pointed out that a read factor storage readout "RFSRO" gate pulse and an "RFS erase" gate can occur only once for each "code 70" signal. This is because both gate pulses are partially controlled by the "RFS scoot" latch, comprising tubes 298 and 299–L (Fig. 8*f*), which in turn is controlled by the "factor storage interlock" latch comprising tubes 295 and 296 (Fig. 8*h*). When the "code 70" signal terminates the "factor storage interlock" restores to its normal "on" condition wherein there is a positive potential output from the cathode output terminal of tube 296–L. Consequently the circuitry is conditioned for subsequent read or punch signals.

To briefly recapitulate, it has been described and shown how a data transfer from read factor storage section on the drum to the general storage section is effected. The transfer signal initiates a card feed cycle for the read-in of new digital information. The data stored in read factor storage is transferred to general storage followed by an erase operation of the read factor storage section. All of the above data transfer and erase operations occurs within two drum revolutions or cycles.

*Data read-in*

The erase operation is followed by the read-in of new digital data into the read factor storage section of the drum from a record card. Once a reader-converter unit 250 (Fig. 8*b*) has been signalled to initiate a card feed cycle, the card feeding proceeds to a logical conclusion wherein the complete record card is sensed and digital information is transferred to the read factor storage. Since a card feeding operation operates at a relatively slow rate of speed compared to a drum revolution, the "zero" index position on the record card will subsequently be advanced towards the sensing brushes. During ensuing drum revolutions, the digital information will be sensed and recorded in read factor storage under control of cyclically occuring "RFS timer" gate pulses connected from terminal 490 (Fig. 8*f*) to terminal 267 (Fig. 8*b*) and in the manner previously described.

Once data stored in read factor storage has been transferred to general storage and the read factor storage has been erased, the data processing machine is free to continue with other data processing operations without interfering with the data read-in operation from the record card.

DATA PROCESSING

During digital processing operations any of the two thousand word storage positions in general storage may be selectively utilized. However, the results of data processing which are to be transferred to punch factor storage for punching into a record card must be stored within a limited group of word positions of any one of the forty bands in general storage. In the preferred embodiment the limited group of word positions consists of the word positions 27 through 36 in each of the forty bands.

GENERAL STORAGE TO PUNCH FACTOR STORAGE TRANSFER

Attention will be given now to the manner in which data is transferred from general storage to punch factor storage. For example, we may arbitrarily assume a word value such as +0,000,017,315, which may be the result of some data processing operation, as being stored in the twenty-seventh word position of band "025–*x*" in general storage, as shown in Fig. 60. This word value may be followed by nine other successively stored word values since the transfer apparatus has the capabilities of transferring ten words during a single transfer operation. It is apparent that the word values might equally as well have been stored in any one of the other thirty-nine bands starting at the twenty-seventh word position. The twenty-seventh word position is the starting position for the group of word values stored in general storage and destined for transfer to punch factor storage. This is due to the circumferential positioning of the punch factor storage section and the fact that the data transfer occurs substantially instantaneously. The punch factor storage section likewise begins with the twenty-seventh word position and continues through ten word positions.

The transfer of data from general storage to punch factor storage is directed by a six digit instruction located in the program control 15 of Fig. 1. Two digits of the instruction designated as the "operation code" direct the transfer operation. The band in general storage is statically selected under control of the quinary portion of the thousandths order, the binary and quinary portions of the hundreths order, and the binary portion of the tens order of a four digit address located in the address register of the program control unit 15 of Fig. 1. The dynamic selection of the word positions within the band is controlled by coincident "PFS scoot" and "PFS timer" pulses, as will be described hereinafter. The transfer operation is effected by a two digit operation code, which in the preferred embodiment is designated as a "code 71." This operation code directs three operations, which are, the erasing of the punch factor storage section, the transfer of data from general storage to the punch factor storage section, and the punching of data stored in punch factor storage into record cards.

The "code 71" provides a signal to the punch unit 23 (Fig. 1) and causes the punch feed to initiate a card feed cycle. The description of a card punching operation will be deferred until later.

*Punch factor storage erase*

The "code 71" signal is also supplied to terminal 600, Fig. 8*h*. This is a positive pulse as represented by line A of Figs. 62*a* and 62*b* and may commence at any point with respect to a cycle of drum rotation. The pulse at terminal 600 is connected to the coincidence switching diode 601. Herein the positive signal pulse is switched with a succeeding SG–1 sector gate timing pulse (line B, Figs. 62*a* and 62*b*) applied to the switching diode 602 from terminal 603 and a positive potential applied to the switching diode 604 from the "factor storage interlock" latch, comprising tubes 295 and 296, in a normally "on" condition. The coincidence of positive pulses at diodes 601, 602 and 604, as indicated by the lines A, B and C, respectively, in Figs. 62*a* and 62*b*, produces a positive potential which is passed through the mixing diode 605 to the input grid of tube 606–L. This turns "on" the "PFS erase" latch comprising tubes 606 and 607–L. The resultant positive "PFS erase" pulse output from the cathode output terminal of tube 607–L (line D, Figs. 62*a* and 62*b*) is passed through the mixing diode 608 to maintain the "PFS erase" latch in an "on" condition.

The "PFS erase" pulse is also passed through the mixing diode 609 and turns "off" the "factor storage interlock" latch comprising tubes 295 and 296. With the "factor storage interlock" latch in the "off" condition, the drop in potential at the cathode output terminal of tube 296–L is applied to the switching diode 604, thereby preventing the "PFS erase" latch from being turned "on" more than once for a single "code 71" signal.

The "PFS erase" pulse is also applied to the switching diode 624 (Fig. 8*f*) wherein it is switched with a "PFS timer" pulse. The "PFS timer" pulse, as shown by line K, Figs. 62*a* and 62*b*, is a cyclically occurring pulse initiated once during each drum revolution as the result of the coincidence switching of a SG–2 sector gate timing pulse, a W–7 timing pulse and a D–X digit timing pulse. These timing pulses as shown in lines F, G and H of Figs. 62*a* and 62*b* are applied to the switching diodes 610, 611 and 612 (Fig. 8*h*), respectively. The coincidence of these timing pulses causes a resultant pulse output from the coincidence switch which is passed through the mixing diode 613 and turns "on" the "PFS timer" latch comprising tubes 614 and 615. The "PFS timer" latch is turned "off" by a succeeding SG–3 sector gate timing pulse, a W–7 word timing pulse and a D–X digit timing pulse. These timing pulses as shown by lines J, F and G of Figs. 62*a* and 62*b* are applied to the switching diodes 616, 617 and 618, respectively. The coincidence of these timing pulses causes a resultant pulse output which is passed through the mixing diode 619 and turns "off" the "PFS timer" latch. Consequently, the "PFS timer" pulse output from the cathode output terminal of tube 615–R, as shown by line K, Figs. 62*a* and 62*b*, has a duration equivalent to one sector position or ten word positions.

The "PFS timer" pulse is applied to the switching diode 625. The coincidence of "PFS erase" and "PFS timer" pulses applied to the switching diodes 624 and 625 respectively produces a resultant potential that is passed through the mixing diode 626 and renders both halves of tube 477 conductive. The resultant pulse output occurring at terminal 478 is designated the "PFS erase gate" pulse, as shown by line L of Figs. 62*a* and 62*b*. The "PFS erase gate" pulse present at terminal 478 is applied to terminal 479 (Fig. 8*b*) from which it is connected with the switching diodes 480 through 486. Herein the "PFS erase gate" pulse is repeatedly switched with write sample pulses WSP in order to produce erase record pulses in the same manner as previously described for the read factor storage section of the drum. The erasing operation occurs repeatedly so that every digital position for each of the seven tracks in the punch factor storage PFS section is recorded with a magnetic spot representative of an erased condition. The "PFS erase gate" pulse has a duration equal to one-fifth of a drum revolution, which is the interval that the punch factor storage PFS section is passing under the combinational read-record heads associated with the factor storage band of the drum storage device. The erasing operation clears the punch factor storage section of all digital information previously stored therein.

The "PFS erase gate" pulse is terminated by the turning "off" of the "PFS timer" latch (Fig. 8*h*) at SG–3, W–7, D–X time. At the start of the succeeding SG–0 sector gate timing pulse, the "PFS erase" latch comprising tubes 606 and 607–L is turned "off." The SG–0 sector gate timing pulse at terminal 627 (Fig. 8*f*) is applied to the grid input terminal of tube 470–R (Fig. 8*h*). The resultant drop in potential at the plate output terminal of tube 470–R is connected to plate terminal "8" of tube 606–R causing the "PFS erase" latch to be turned "off." The resulting drop in potential at plate terminal "7" of tube 606–R is coupled to the "6" grid input terminal of tube 628–R and thereby turns "on" the "PFS scoot" latch comprising tubes 628 and 629–L.

*Data transfer control*

The "PFS scoot" pulse output from tube 629–L is supplied from terminal 630 (Fig. 8*h*) to terminal 631 (Fig. 8*b*) from which it is applied to the switching diode 632. Herein, the "PFS scoot" pulse, as shown by line M, Figs. 62*a* and 62*b*, is switched with the "PFS timer" pulse, as shown by line K, Figs. 62*a* and 62*b*, supplied from terminal 633 (Fig. 8*h*) through terminal 634 (Fig. 8*b*) to the switching diode 635. The coincidence of these pulses at the switching diodes 632 and 635 causes a resultant "PFS record gate" pulse output that is passed through the cathode follower 636–R (shown by line O, Figs. 62*a* and 62*b*) and applied to the switching diodes 637 through 643. In the switching diodes 637 through 643, the "PFS timer" pulse is switched with digital information pulses from the general storage read-record matrix, as will hereinafter be described.

The band in general storage from which information is to be read out is controlled by the quinary portion of the thousands digit, the binary and quinary portions of the hundreds digit, and the binary portion of the tens digit of a four digit address located in the address registers of the program control unit 15 (Fig. 1). The above-mentioned portions of the four digit address cause positive potential conditions to exist on a combination of the address terminals 390 through 400 of Fig. 8*l*. In accordance with the illustrative example, we have assumed the word values that are to be transferred to punch factor storage as being located in the band in general storage identified as "025–*x*." Then under control of the address stored in the address register of the program control 15 (Fig. 1), a positive potential condition will exist on the Q0TH terminal 399, the B0H terminal 391, the Q2H terminal 390 and the B5T terminal 395 (Fig. 8*l*). In the same manner as previously described, these coincident pulses will cause the center tap connections for the coil on each of the combinational read-record heads 409 through 413 (Fig. 8*k*) to be raised from approximately −10 volts to approximately +110 volts.

*Data Reading*

Figure 8M:
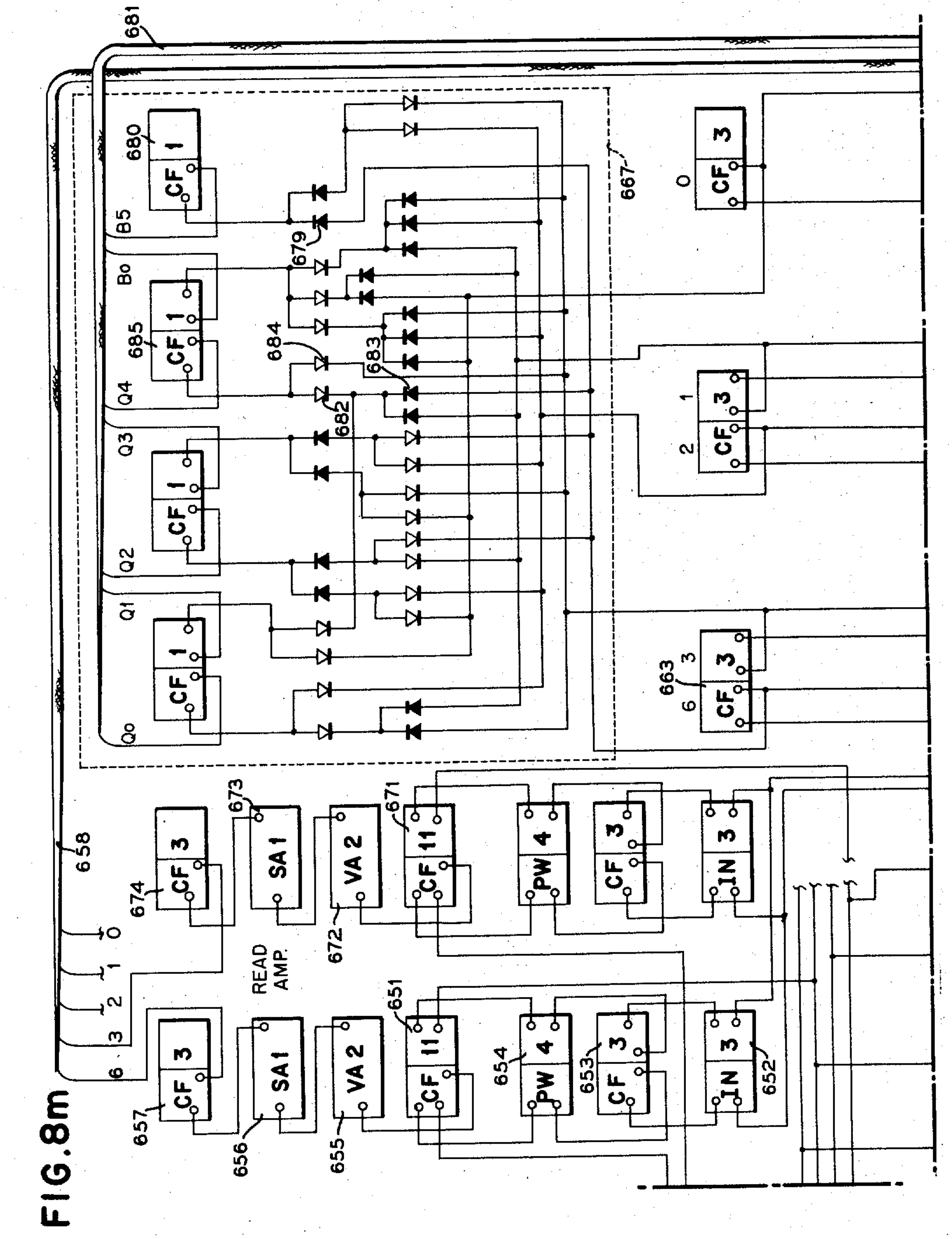

Referring now to Fig. 60, the leading edge of the D–X position for the twenty-seventh word will start to pass under the combination read-record heads 409 through 413 (Fig. 8*k*) at the instant the "PFS scoot" and "PFS timer" gate pulses become coincident. The digit "9" recorded in the "6" and "3" bit tracks, as indicated by the "+" signs and digitally representing a plus condition for the word value stored in the twenty-seventh word position, will be read by the combinational heads 409 and 410. The magnetic spot in the D–X position of the "6" track will cause an inductively produced bi-polar signal of the down-up type shown in line D, Fig. 59, in the erase coil of head 409. The erase coil has a two-fold function, being used to record erase signals on the drum and to read information signals from the drum surface. The bi-polar signal produced in the erase coil of head 409 is passed through the diode 429–2 to the "Q0TH–6–ER" line 650. Line 650 is connected to the grid input terminal of the "CF–11" type tube 651–L (Fig. 8*m*).

The plate potential for tube 651–L is furnished under control of the positive potential applied to the Q0TH terminal 339 (Fig. 8*l*). Terminal 399 is connected to the grid input terminal of "IN–3" tube 652–L (Fig. 8*m*). This causes tube 652–L to be conductive. The resultant drop in potential at the plate output terminal renders the "CF–3" tube 653–L non-conductive. The resultant drop in potential at the cathode output terminal of tube 653–L renders the "PW–4" tube 654–L non-conductive causing a more positive potential to occur at the plate output terminal of tube 654–L. This more positive potential is applied to the plate terminal of tube 651–L.

Figure 8N:
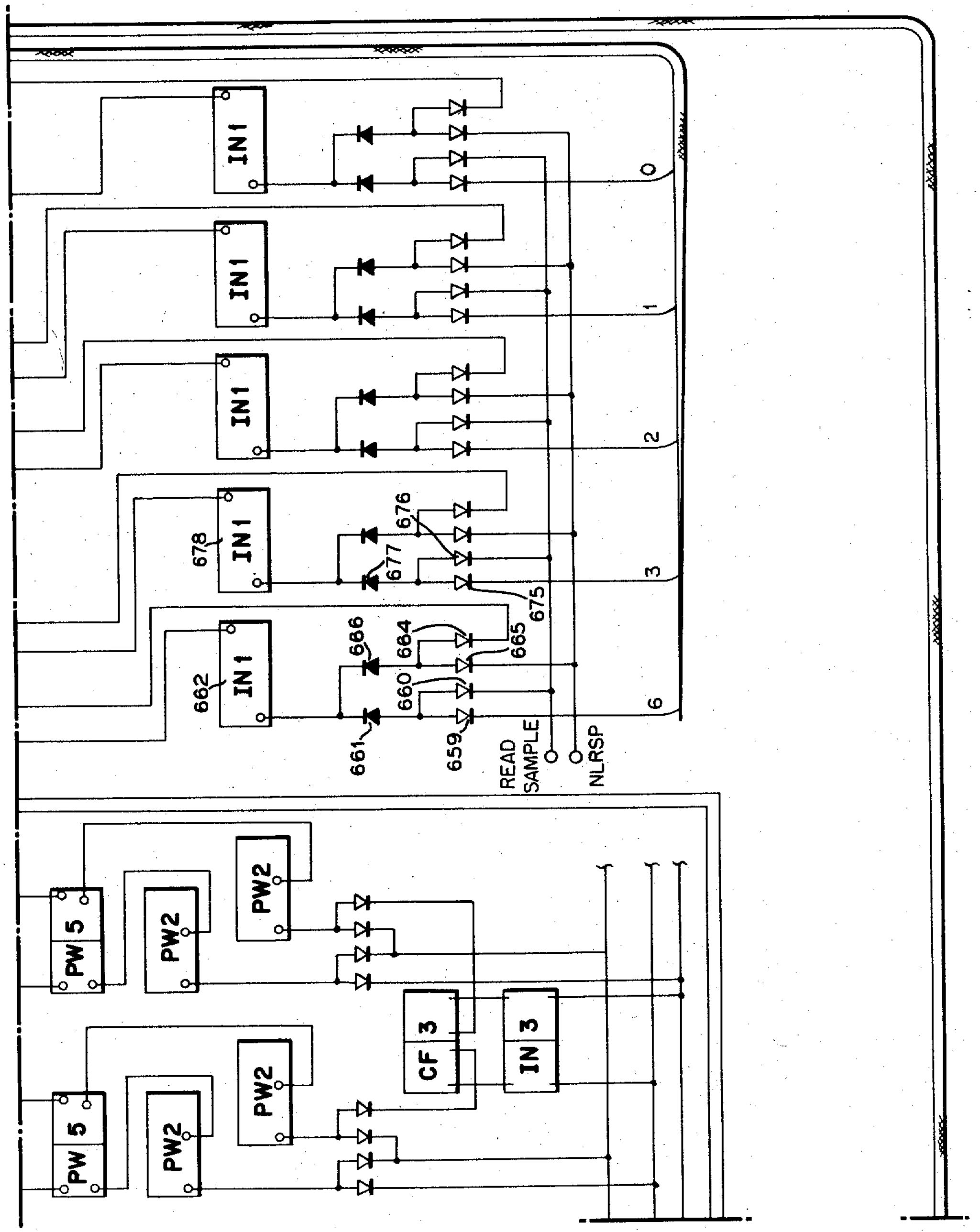
Figure 80:
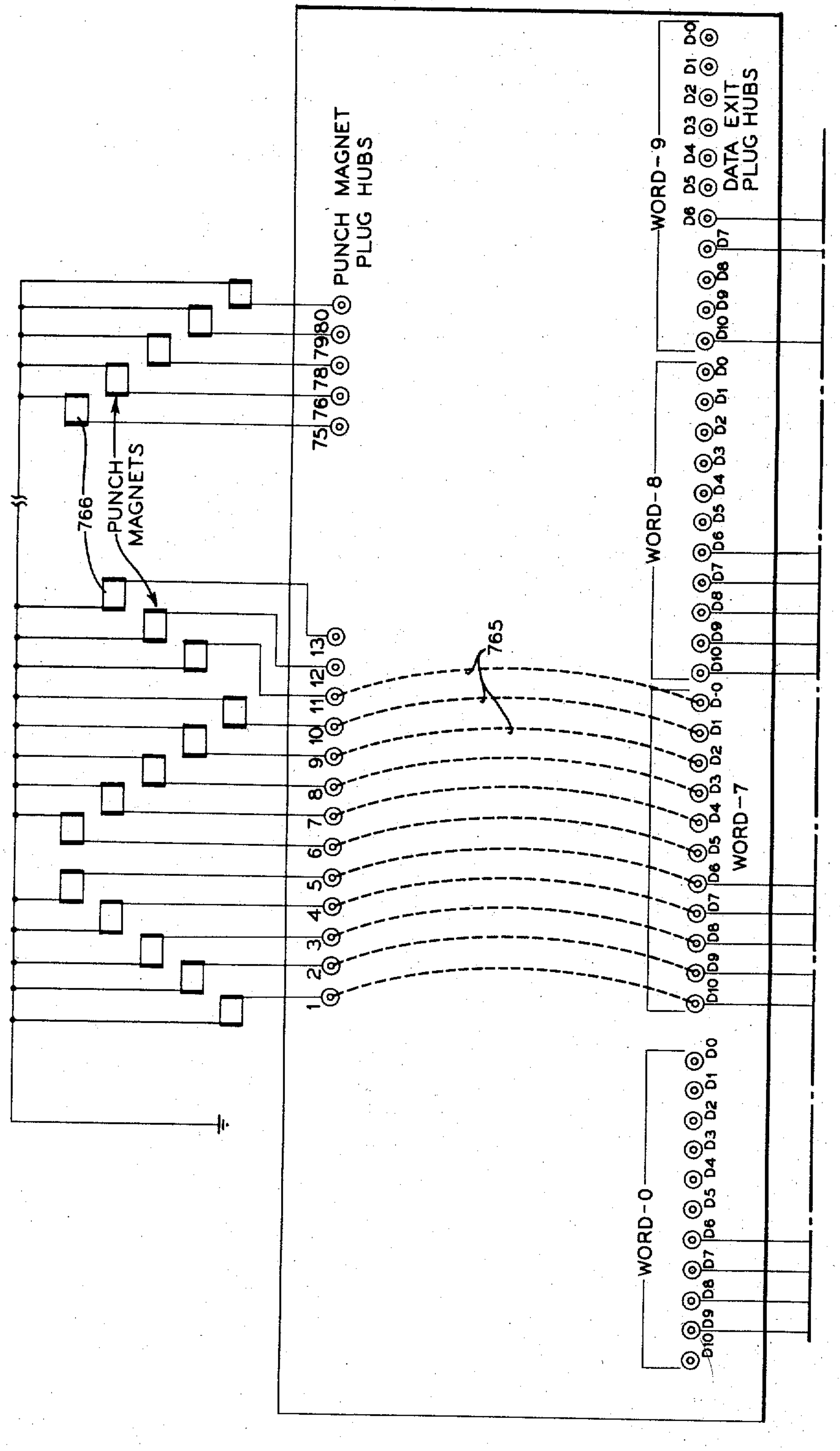

Thus, when the bi-polar signal is applied to the grid input of tube 651–L, there will be a resultant bi-polar signal output from tube 651–L which is passed through the "VA–2" amplifier tube 655 and the "SA–1" shaper-amplifier tube 656. Herein the low level read signal for the "6" bit of the digit "9" value is amplified and shaped. The output from the plate output terminal of the shaper-amplifier tube 656–R is passed through the cathode follower tube 657–L. This positive pulse output, of the type shown by line E of Fig. 59, from the cathode output terminal of tube 657–L is connected via the "6" line in cable 658 to the switching diode 659 (Fig. 8*n*). Herein the signal is switched with a "read sample pulse," of the type shown by line G of Fig. 59, applied to the switching diode 660. The coincident positive pulses produce a resultant positive potential output that is passed through the mixing diode 661 to turn "on" the "6" bit read latch, comprising tubes 662 and 663–L. The resultant "6" bit read latch output signal from the cathode output terminal of tube 663–L, as shown by line H of Fig. 59, is applied to the switching diode 664, wherein it is switched with a normally positive potential applied to the switching diode 665 and passed through the mixing diode 666 to maintain the "6" bit read latch "on." The "6" bit read latch output is also coupled as an input to the "two out of five to biquinary" code translator 667.

In a similar manner the magnetic spot in the D–X position of the "3" track will simultaneously cause an inductively produced bi-polar signal in the erase coil of head 410 (Fig. 8*k*) of the down-up type, which is passed through the diode 429–4 to the "Q0TH–3–ER" line 670. Line 670 is connected to the grid input terminal of the cathode follower tube 671–L (Fig. 8*m*). The plate potential for tube 671–L is furnished under control of the positive potential applied to the Q0TH terminal 399, in the same manner as previously described for the "6" bit.

The application of the bi-polar down-up signal to the grid input terminal of tube 671–L concurrent with the application of the plate potential will cause a resultant bi-polar output signal, which is passed through the amplifier tube 672, the shaper-amplifier tube 673 and the cathode follower tube 674–L. The positive read signal output from the cathode output terminal of tube 674–L is connected via the "3" line in cable 658 to the switching diode 675 (Fig. 8*n*). At this point the signal is switched with a "read sample pulse" applied to the switching diode 676. The resultant potential output from the coincident switching diodes 675 and 676 is passed through the mixing diode 677 and turns "on" the "3" bit read latch comprising tubes 678 and 663–R. The "3" bit read latch output pulse from tube 663–R is coupled to the "two-out-of-five to biquinary" code translator 667.

*Data translation (two-out-of-five to biquinary)*

The translator 667 (Fig. 8*m*) comprises a plurality of coincidence switching diodes, mixing diodes and cathode follower tube stages for converting pulses representative of digital information according to the "two-out-of-five" code into pulses representing the digital information according to the biquinary code. For example, the "9" digit from the D–X position of the twenty-seventh word in band "025–*x*" of general storage is represented by two coincident seven microsecond output pulses, one from the "6" bit read latch tube 663–L and one from the "3" bit read latch tube 663–R, as described above. The "6" bit pulse from tube 663–L is passed through the mixing diode 679 and cathode follower tube 680–L. The resultant pulse output from tube 680–L is applied to the B–5 line of cable 681. The "6" bit pulse from tube 663–L is also applied to the switching diode 682 through mixing diode 683. Herein the "6" bit pulse is switched with a "3" bit pulse from tube 663–R applied to the switching diode 684. The resultant pulse output from the coincidence switching diodes 682 and 684 is passed through the cathode follower tube 685–L and occurs on the Q–4 line of cable 681.

The coincident information signal pulses occurring on the Q–4 and B–5 lines and representing a "9" digit according to the biquinary code system are connected via cable 681 to the switching diodes 690 and 691, respectively (Fig. 8*b*). The Q–4 seven microsecond signal pulse applied to switching diode 690 is switched with the "PFS record gate" pulse applied to switching diode 639. The resulting Q–4 pulse is passed through the mixing diode 692 and cathode follower tube 273–L and applied to the switching diode 693. At this point the Q–4 pulse is switched with a write sample pulse WSP applied to switching diode 694. The resultant WSP turns the "PW–2" tube 695 "on." The trailing edge of the WSP turns tube 695 "off." The turning "off" of tube 695 causes an inductively produced positive pulse output at the cathode output terminal of tube 695–R, of the type shown by line C of Fig. 59. This is a record pulse that is passed through the cathode follower tube 696–L and applied to the record coil of the combinational read-record head 320. This record pulse causes a magnetic spot of "+" polarity to be recorded on the Q–4 track in the D–0 digit position of the first word in the punch factor storage section, as indicated in Fig. 60. This spot recording occurs at "D" cell time of D–0 digit position.

Simultaneously with the above-described Q–4 record operation, the B–5 seven microsecond signal pulse applied to the switching diode 691 is switched with the "PFS record gate" pulse applied to the switching diode 637. The resultant B–5 pulse is passed through a mixing diode 697 and cathode follower tube 636–L and applied to the switching diode 698. At this point the B–5 pulse is switched with a write sample pulse WSP, which turns "on" the "PW–2" tube 700. The trailing edge of the WSP causes tube 700 to be turned "off." The resultant positive record pulse output is passed through the cathode follower tube 701–L and applied to the record coil of head 365. This record pulse causes a magnetic spot of "+" polarity to be recorded on the B–5 track in the D–0 digit position of the first word in the punch factor storage section, as indicated in Fig. 60. This spot recording occurs at "D" cell time of the D–0 digit position.

At the start of the ensuing "A" cell time, the Q–4 and B–5 read latches comprising tubes 662 and 663–L and tubes 678 and 663–R, respectively (Figs. 8*m* and 8*n*), are reset by a "negative latch reset pulse" NLRP, which was previously described.

Summarizing the above-described digital data transfer, it has been shown how a digit "9" value has been read from a digital position in general storage, translated to the biquinary system of notation and recorded in the punch factor storage section of the drum storage device.

Referring to Fig. 60, it should be pointed out that the succeeding digital values for the word value shown in the twenty-seventh word position of general storage band "025–*x*" will be successively transferred to the punch factor storage section of the drum. This is immediately followed by the transfer of the succeeding nine word values recorded in the general storage band "025–*x*." It may be noted by observation of Fig. 60 that the digital values are shifted one digital position during the transfer operation. This shift is apparent in an examination of the various signals as shown by Fig. 59. The data transfer of the ten words from general storage to punch factor storage occurs in one-fifth of a drum revolution under control of the coincident "PFS timer gate" pulse and "PFS scoot gate" pulse.

The "PFS timer" latch (Fig. 8*h*) is turned "off" at SG–3, W–7, D–X time. The "PFS scoot" latch is turned "off" by the succeeding SG–4 sector gate timing pulse applied to the "4" grid input terminal of tube 628–R. The "PFS scoot" latch can be turned "on" only once for each "code 71" signal. This is due to the control of the "factor storage interlock" latch which prevents the "PFS erase" latch and the "PFS scoot" latch from being turned "on" more than once for each "code 71" signal.

To recapitulate, it has been described and shown how a data transfer from a selected band in general storage to punch factor storage is effected. The transfer signal initiates a punch feed cycle. The punch factor storage section of the drum is erased. This is followed by the data transfer from general storage to punch factor storage. The erase and data transfer operations occur within two drum cycles or revolutions.

Once data has been transferred from general storage to punch factor storage, the data processing machine is free to continue with other data processing operations without interfering with a card punching operation. The "code 71" signal is no longer necessary. A card feed cycle when initiated will proceed to its logical conclusion wherein all data in the punch factor storage will be punched in the record card.

DATA TRANSFER FROM PFS TO A RECORD CARD

The operation of transferring data from punch factor storage to a record card will now be described. This is the third phase of operation controlled by the "code 71" signal.

*Punch unit*

The illustrative embodiment of the present invention includes a record punching unit indicated in Fig. 1 by the block 23 labeled "Punch." The punch unit is similar in construction to the record card perforating machine disclosed in Reissue Patent No. 21,133 to C. D. Lake, issued June 27, 1939. For details of construction reference may be had to Reissue Patent No. 21,133.

The punch unit has the function of selectively perforating cards, which may be of the IBM type shown in Fig. 58, in response to electrical signals representative of digital data which is to be recorded in the record card.

The punch unit comprises a card hopper for holding a quantity of blank record cards, a plurality of punching devices one for each column of the record card arranged in a single line, a punch control magnet for each of the punching devices, and card feeding mechanism for causing the cards to be moved past the line of punching devices. When a card feed cycle is initiated, a blank card is withdrawn from the card hopper and advanced "12" edge first towards the line of punching devices. The cards are intermittently moved past the line of punching devices. At the time the blank card is intermittently moved under the line of punching devices, data representing signals selectively energize the punch control magnets for controlling a related punch. The blank cards pause momentarily at each index point position so that if a perforation is to be made, the punching device has time to penetrate and withdraw from the punched card.

The punch unit includes a plugboard which is similar in construction to the plugboard shown in U.S. Patent No. 2,111,118 to C. D. Lake, granted March 15, 1938. The plugboard provides a selective means for electrically connecting the data representing signals to the punch control magnets. A schematic representation of a plugboard adapted for use in the preferred system is shown in Fig. 8*o*. The plugboard comprises eighty punch magnet plughubs, one for each of the eighty card columns of the record card and one hundred ten data exit plughubs corresponding to the one hundred ten digital storage positions in the punch factor storage section of the drum. The inter plughub wiring as shown is to accommodate an illustrative problem wherein a word value stored in the first word position of punch factor storage is to be recorded in the first eleven columns of a record card. This will become more fully apparent as the description proceeds.

As previously shown, the data designations in punch factor storage are sequentially recorded according to their digital position within a word value. In the punch unit, blank cards are moved past the line of punching devices so that the horizontal rows of index positions "0" through "9" are successively aligned with the single row of punching devices. In other words all zeroes are simultaneously punched in the card and then all ones are simultaneously punched in the card, and so on through the "9" index position. This punching operation involves the interspersion of columnar perforations. In order to satisfy the operating conditions of the punch unit, it is necessary to read out all zeroes in the ten words stored in punch factor storage and punch them in the card. This is followed by the read out and punching of all "ones" and so on through the "nines." This type of operation requires a different revolution of the drum storage device for each different kind of character. The operation will be elaborated in the following description.

*Data reading*

Referring now to Fig. 60, wherein there is shown a representative word value of +0,000,017,315 as being stored in the first word position of punch factor storage, it will now be described how this value is read-out of punch factor storage for transfer to the punch unit and recording in the first eleven columns of a record card. In accordance with the illustrative example, we may assume that the blank card being moved in the card feed of the punch unit has now advanced to a point where the "0" index position is aligned with the single row of punching devices. As the factor storage band of the drum storage device is rotating past the associated combinational heads, the first zero to be read will be the one shown in the D–6 position of the first word of punch factor storage. The magnetic spots recorded in the D–6 position of the Q–0 and B–0 tracks, and represented by a "+" sign, on passing the associated combinational heads 705 and 278, respectively Fig. 8*a*) will produce bi-polar signals of the down-up type in the read coils as shown by line D of Fig. 59. The bi-polar signal produced in the read coil of the Q–0 head 705 at "D" cell time of the D–6 position is passed through the amplifier tube 706, the shaper-amplifier tube 707, and the cathode follower 708–R. The resultant output pulse from the cathode output terminal of tube 708–R, of the type shown by line E of Fig. 59, is applied to the switching diode 709. This pulse is switched with the read sample pulse occurring at "A" cell D–7 time and applied to the switching diode 710. The resultant pulse output turns "on" the Q–0 read latch comprising tubes 711 and 712–R. The resulting seven microsecond output pulses, of the type shown by line H of Fig. 59, starting at the midpoint of "A" cell D–7 time is applied to the grid input terminal of the Q–0 cathode follower tube 713–L (Fig. 8*e*) of a converter.

Simultaneously, the bi-polar signal produced in the read coil of the B–0 head 278 is passed through the amplifier tube 714, the shaper-amplifier tube 715, and the cathode follower tube 323–L. The resultant output pulse from the cathode output terminal of tube 323–L is applied to the switching diode 716. This pulse is switched with the read sample pulse applied to the switching diode 717 to turn "on" the B–0 read latch comprising tubes 718 and 327–L. The resulting seven microsecond pulse output from the cathode output terminal of tube 327–L is applied to the grid input terminal of the B–0 tube 719–L (Fig. 8*e*) of a converter.

*Data converter*

The data converter, as shown by the schematic wiring of Fig. 8*e*, comprises seven cathode follower type tube stages utilizing the tubes 713, 719, 720 and 721. The purpose of the data converter is to translate the digit representing pulses according to the biquinary system of notation into a single electrical pulse representative of the digital information for transfer to a read-out matrix. The plate potentials for the above-mentioned cathode follower tube stages are furnished from two emitter devices schematically shown at 722 and 723 of Fig. 8*e*. The emitter devices are mechanically driven commutating devices, which, in the subject system, is a part of the card punch unit. Emitters of this type are frequently used in the well-known IBM accounting machines. The emitters are similar in construction to the ones shown by Fig. 48*a* and described in Patent No. 2,615,569 to C. D. Lake et al., issued October 28, 1952. The emitter is capable of creating transient representations in the form of differentially timed pulses, which by their timing with reference to the cycle of operation of the punch unit, are representative of digits corresponding to the index positions as indicated by the record card shown in Fig. 58. Under control of the emitters, the plate potentials are applied from the emitter segments to the tube stages of tubes 713, 719, 720 and 721 in predetermined combinations which are in accordance with the preferred system of digital representations.

Since the "0" index position of the blank record card in the punch unit is positioned in alignment with the row of punching devices, the emitters 722 and 723 (Fig. 8*e*) will cause positive potentials to be applied from the "0" segments to the plate terminals of tubes 713–L and 719–L. The concurrent application of a positive potential to the plate terminal of the Q–0 tube 713–L and the positive seven microsecond Q–0 read latch output pulse to the grid input terminal of tube 713–L causes a resultant positive seven microsecond pulse which is applied to the switching diode 724. Similarly, the concurrent application of a positive potential to the plate terminal of the B–0 tube 719–L and the positive seven microsecond B–0 read latch output pulse to the grid input terminal of tube 719–L causes a resultant positive seven microsecond pulse output which is applied to the switching diode 725. The coincidentally occurring pulse inputs to the switching diodes 724 and 725 during D–7 time are switched with a "punch timer" gate pulse applied to the switching diode 726 from a "punch timer" latch comprising the tubes 727 and 728 (Fig. 8*g*).

The "punch timer" latch is controlled by timing pulses from the timing circuits which are controlled by the timing tracks on the magnetic drum storage device. The purpose of the "punch timer" gate pulse is to permit the passage of data representing signals by the coincidence switching diodes 724, 725 and 726 only during the interval that the punch factor storage section of the drum is passing by the associated combinational read-record heads. The "punch timer" latch comprising tubes 727 and 728 is turned "on" by the coincidence switching of SG–2 sector gate pulses, W–7 word pulses and D–1 digit pulses applied to the switching diodes 729, 730 and 731, respectively. The "punch timer" latch is turned "off" by the coincidence switching of SG–3 sector gate pulses, W–7 word pulses and D–1 digit pulses applied to the switching diodes 732, 733 and 734, respectively.

The concurrent seven microsecond pulses applied to the switching diodes 724 and 725 in coincidence with the "punch timer" gate pulse applied to the switching diode 726 produces a resultant seven microsecond pulse which is passed through the double inverter amplifier tube 735 and applied to the grid input terminals of the parallel connected cathode follower tubes 736–L and 736–R. The resultant seven microsecond positive pulse output from the common connected cathode output terminals of tubes 736–L and 736–R are connected via line 737 to the data output matrix shown in Fig. 8*c*.

*Data output matrix*

The purpose of the data output matrix is to switch data representing signals with digit and word timing pulses in synchronism with potential furnished under control of the punch unit in order to provide the selective energization of punch control magnets for effecting selected punching of the record card.

The wiring for the data output matrix is partially shown in a schematic manner by Fig. 8*c*. Actually the matrix comprises ten horizontal rows of Thyratron tube stages, each row having eleven Thyratron tube stages, there being 110 Thyratron tube stages in all. Consequently there is one Thyratron tube stage for each digital value of the ten words in punch factor storage. The details of a Thyratron tube stage of the "TH–1" type being presented earlier, in the description relating to Figs. 38 and 39. The No. 1 control grids of the Thyratron tubes in each vertical row are commonly connected and are pulsed by resultant signals produced from the coincidence switching of digital representing pulses and digital timing pulses. The No. 2 control grids in each of the horizontal rows are commonly connected and are pulsed cyclically and successively from the bottom row to the top row with word timing pulses. The plate potentials for all Thyratron tube stages are intermittently supplied through the CB (circuit breaker) contacts 750 (Fig. 8*c*) which are mechanically actuated by a cam 751 that is driven by the punch unit. The plate potentials are connected to the Thyratron tube stages during each of the "0" through "9" index times of the card in the punch unit, as indicated by line B of the timing chart shown in Fig. 57. The cathode output terminals for each of the Thyratron tube stages are directly and individually connected with data output terminals in the plugboard (Fig. 8*o*), which is a part of the punch unit. When a coincidence condition of positive plate potential and positive signals at both the No. 1 and No. 2 control grids of any particular Thyratron tube in the matrix exists, that tube is rendered conductive. Once fired the Thyratron tube remains conductive until such time as the plate supply potential is interrupted by the CB contacts 750 (Fig. 8*c*). A Thyratron tube in the conductive state causes a positive potential signal to occur at the data output terminal in the plugboard to which the cathode output terminal of the Thyratron tube is connected. The plugboard provides a flexible connecting means for manually and selectively connecting the data output terminals with punch control magnet terminals also located in the plugboard.

According to the illustrative example, we have shown and described how a seven microsecond positive pulse is produced and caused to occur on line 737 at W–7 D–7 time and representing the zero value in the D–6 position of the first word in punch factor storage. As shown by Fig. 8*c*, line 737 is connected to a plurality of switching diodes. The positive pulse occurring on line 737 is applied to the switching diode 752 and is switched with a D–7 timing pulse applied to the switching diode 753. The resultant pulse output from the switching diodes 752 and 753 is applied to the commonly connected No. 1 control grids of the Thyratron tubes in the second vertical row from the left. Since the blank card in the punch unit is at the "0" index position, the plate potential is supplied to all Thyratron tubes in the matrix. Since the read-out of data from punch factor storage begins at a W–7 time, a W–7 timing pulse existing at terminal 754 is applied to the grid input terminals for the parallel connected cathode follower stages of tube 755. The resultant W–7 timing pulse output from the cathode output terminals of tube 755 is applied to the commonly connected No. 2 control grids for the horizontal row of Thyratron tube stages second from the bottom. Accordingly there will be a coincident condition of positive potentials at the plate terminal and the No. 1 and No. 2 control grid input terminals of the Thyratron tube 756 only. This causes the Thyratron tube 756 to be made conductive with a resultant output potential being supplied to the terminal in the plugboard for the D–7 digit of word 7.

Summarizing the above, it has been shown how the "0" recorded in the D–6 position of the first word value in the punch factor storage section of the storage drum was read-out, converted to a signal according to the decimal system for recording in the punch unit, and selectively switched to provide a signal representing the digital value and the particular positioning in punch factor storage.

As the drum continues to move, the "0" in the D–7 position of the first word in punch factor storage, as shown in Fig. 60, will be read-out, amplified, shaped and converted to produce a zero representing pulse on line 737 (Fig. 8*c*) in the same manner as described above. This signal occurs on line 737 at D–8 time of word 7. This signal is applied to the switching diode 757 and switched with the D–8 timing pulse applied to switching diode 758. The resultant output is applied to the commonly connected No. 1 control grids of the Thyratron tubes in the third row from the left (Fig. 8*c*). The W–7 timing pulse is still applied at terminal 754. A coincident condition of positive potentials will occur at the plate terminal and the No. 1 and No. 2 control grid terminals for the Thyratron tube 759 only causing this tube to be made conductive.

In a similar manner, the zeroes in the D–8 and D–9 positions of the first word in punch factor storage will be successively read-out and render Thyratron tubes 760 and 761 conductive. Due to the shift of one digital position caused by the delay during read-out from general storage to punch factor storage and switching operations, the zero in the D–10 position of the first word will cause a data representing signal to occur on line 737 at W–8 D–X time. This signal applied to the switching diode 762 is switched with a D–X timing pulse applied to the switching diode 763. The resultant pulse output from the switching diodes 762 and 763 is applied to the No. 1 control grid of tube 764. At this instant a W–8 timing pulse is applied to the No. 2 control grid of tube 764. Accordingly tube 764 is made conductive.

Similarly, all the zeroes in the succeeding word values in punch factor storage will be successively read-out and render the appropriate Thyratron tube stages conductive. During one revolution of the drum storage device all zeroes in punch factor storage will be read-out and make the appropriate Thyratron tube stages conductive.

Due to the rapid rate of rotation of the drum storage device as compared to the speed of operation of the punch unit, the drum may make several rotations for each index point positioning of a card in the punch unit. This will cause zeroes to again be read out and produce signals on line 737 of Fig. 8*c*. This multiple read-out for each index position does not complicate the transfer operation but merely serves to insure that the appropriate Thyratron tube stages representative of the digital positioning for the zeroes in punch factor storage are rendered conductive.

Particularly shown and described above is the manner in which tubes 756, 759, 760, 761 and 764 (Fig. 8*c*) were rendered conductive. Referring to Figs. 8*c* and 8*o*, it may be noted that the cathode output terminal of tubes 756, 759, 760, 761 and 764 are respectively connected to the D–6 through D–10 data exit plughubs for word W–7. This arrangement in coupling the cathode output terminals of the Thyratron tubes to the data exit plughubs overcomes the digit shift caused by the delay in read-out and switching operations. The D–6 through D–10 data exit plughubs for word W–7 are coupled by means of the flexible wires 765 to the punch magnet plughubs for record card columns 5 through 1, respectively. With tubes 756, 759, 760, 761 and 764 in a conductive state, the punch magnets 766 for columns 1 through 5 of the record card will be energized.

*Record card punching*

Under control of the punch unit a punching operation is effected whereby all the punching devices, which are controlled by the selectively energized punch control magnets, are moved so as to cause perforations to be made in the "0" index position for the appropriate columnar positions. After the "0" punching operation, the record card in the punch unit is advanced to the "1" index position. Now all ones in the punch factor storage are read-out and fire the particular Thyratron tube stages according to their digital positioning in punch factor storage after which the "1" index point perforations are made according to the required columnar positioning. This process of operations is carried out for each index point position in the record card through "9" index point. Consequently, after the punching of "9's" the record card will be perforated with all digital values stored in punch factor storage.

Recapitulating, there has been shown and described a novel system for introducing data into a high speed data processing machine from a relatively slowly operating data reading apparatus, and conversely the transfer of processed data from a high speed data processing machine for recording on a record by a relatively slowly operating recording mechanism. The novel system of data transfer described herein provides a high speed data processing machine with data read-in and read-out means neither of which in its operative cycle interferes with nor retards the other high speed data processing operations performed by the data processing machine.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data transfer system comprising a cyclically movable storage member having a magnetizable surface, a plurality of tracks defined on the surface of said member extending in the direction of movement of said member, magnetic recording and reading means associated with each of said tracks; data storage means, first data transfer means coupling said data storage means with the reading and recording means for a first one of said plurality of tracks, selecting means for selecting a recording and reading means for one of the other of said plurality of tracks, second data transfer means coupling the selected one of said recording and reading means to said recording and reading means for said first one of said plurality of tracks, control means for generating a signal preparatory to the transfer of data, and means associated with said first and said second data transfer means and responsive to said signal for permitting the transfer of data between said data storage means and said first track and the selected one of the other of said plurality of tracks.

2. In a data processing machine the combination of a rotating magnetic drum having a plurality of tracks defined thereon, a source of data, a first means for transferring data from said source to a first of said plurality of tracks, means for generating a signal preparatory to the transfer of data from said source to said first of said plurality of tracks, switching means for selecting one of the other of said plurality of tracks, and a second means responsive to said signal generated for transferring data from said first of said plurality of tracks to the selected one of said other of said plurality of tracks followed by the transfer of data from said source over said first means to said first of said plurality of tracks.

3. In a data processing machine the combination of a rotating magnetic drum having a plurality of tracks defined thereon, data utilization storage means, a first means for transferring data from a first of said plurality of tracks to said data utilization means, a second means for transferring data from one of said plurality of tracks to said first of the plurality of tracks, means for generating a signal preparatory to the transfer of data from said first of said plurality of tracks to said utilization means, and means responsive to the signal generated preparatory to the transfer of data from said first of said plurality of tracks to said utilization means for transferring data from one of the other of said plurality of tracks over said first means to said first of said plurality of tracks followed by a transfer of data from said first track over said second means to said utilization storage means.

4. A data transfer system comprising a cyclically movable member capable of storing data as magnetic phenomena, a plurality of bands on said member extending in the direction of movement of said member, each of said bands containing a series of consecutive character positions, a first one of said bands adapted to store data according to a first code configuration, the remaining ones of said plurality of bands adapted for storing data according to a second code configuration, magnetic recording and reading means associated with each of said bands, a data source, means for transferring data from said data source to said first band and recording the data in the character positions of said first band according to said first code configuration, selecting means for selecting the recording means for one of the remaining ones of said plurality of bands, a second data transfer means connecting the reading means for said first band with the selected recording means, said second data transfer means including conversion means controlled by character representing signals according to said first code configuration and operative to emit character representing signals according to said second code configuration for recording in the character positions of the selected band, and signal control means operatively connected with said second data transfer means for controllably effecting a data transfer from said first band to the selected band.

5. A data transfer system comprising a cyclically movable member capable of storing data as magnetic phenomena, a plurality of bands on said member extending in the direction of movement of said member, each of said bands containing a series of consecutive character positions, a first one of said bands adapted to store data according to a first code configuration, the remaining bands of said plurality of bands forming a group adapted to store data according to a second code configuration, magnetic recording and reading means associated with each of said bands, selecting means for selecting the reading means for a particular one of the bands in said group, data transfer means connecting the reading means of the selected band with the recording means for said first band, said data transfer means including conversion means controlled by character representing signals according to said second code configuration and operative to emit character representing signals according to said first code configuration, and signal control means operatively connected with said data transfer means for controllably effecting a sequential data transfer from the consecutive character positions in the selected band to consecutive character positions in said first band.

6. A data transfer system comprising a cyclically movable member capable of storing data as magnetic phenomena, a plurality of bands on said member extending in the direction of movement of said member, each of said bands containing a series of consecutive character positions, magnetic recording and reading means associated with each of said bands, a data source, means for transferring data from said data source to a first one of said bands, a first signal control means operatively connected with said data transfer means for limiting the storage of data to a sector of said first band having a predetermined number of character positions, the data being stored asynchronously in the character positions of the sector and the timed sequence of recording being a function of the character significance, selecting means for selecting the recording means for one of the other of said plurality of bands, a second data transfer means connecting the reading means for said first band to the selected recording means for said plurality of bands, and a second signal control means operatively connected with said second data transfer means for effecting a data transfer from said sector of said first band to a limited portion of the selected band of the remaining bands wherein the data is sequentially recorded in the selected band as it is read out of said first band.

7. A data transfer system comprising a cyclically movable member having a magnetizable surface; a plurality of bands on said member extending in the direction of movement of said member; each of said bands containing a series of consecutive character positions; magnetic recording and reading means associated with each of said bands; a first one of said bands capable of storing character representations according to a first code system; the remaining ones of said plurality of bands forming a group on said member, each band of said group capable of storing character representations according to a second code system; selecting means for selecting the reading means for one of the bands in said groups of bands; timing means controlled by said cyclically movable member serving to produce a cyclically occurring pattern of timing signals; a first switching means controlled conjointly by the character representing signals produced in said selected reading means and said timing signals and operative to emit character representing control signals according to said second code system; conversion means controlled by the character representing control signals from said first switching means according to said second code system and operative to emit character representing signals according to said first code system; signal generating means capable of producing a data transfer signal; and a second switching means controlled conjointly by the data transfer signal, the character representing signals from said conversion means and timing signals from said timing means and operative to emit recording signals according to said first code system; said second switching means being coupled with the recording means of said first band for recording character designations in said first band as they are read out of the selected band of said group of bands.

8. A data transfer system as in claim 7 including a third switching means connected with the recording means for said first band and controlled conjointly by a signal from said signal generating means and signals from said timing means and operative to emit signals for clearing said first band of previously stored data prior to the transfer of data from the selected band of said group to said first band.

9. A data transfer system as in claim 8 including utilization means; and a second conversion means connected with the reading means for said first band and controlled conjointly by signals reproduced in the reading means for said first band, signals from the timing means, a control signal from the signal generating means, and signals from said utilization means and operative to emit character representing signals according to a third code system for use by said utilization means.

10. A data transfer system comprising a cyclically movable member having a magnetizable surface, a plurality of bands on said member extending in the direction of movement of said member, each of said bands containing a series of consecutive character positions, magnetic recording and reading means associated with each of said bands, a first one of said bands on said member capable of storing character representations according to a first code system, a first switching means, a first data transfer means coupling the reading means for said first band with said first switching means, signal generating means connected to said first switching means and capable of producing a signal for permitting the transfer of character signals through said first switching means, conversion means controlled by character representing signals from said first switching means according to the first code system and operative to emit signals according to a second code system, selecting means for selecting the recording and reading means for one of the other of said plurality of bands, timing means controlled by said cyclically movable member serving to produce a cyclically occuring pattern of timing signals, a second switching means controlled conjointly by the character representing signals from said conversion means and said timing signals and operative to emit character recording signals according to said second code system, and a second data transfer means operatively connecting said second switching means to the recording means selected by said selecting means to record character designations in the character positions of the selected band as they are read out of said first band.

11. A data transfer system as in claim 10 including a third switching means connected with the recording means for said first band and controlled conjointly by a signal from said signal generating means and signals from said timing means and operative to emit signals for clearing said first band after the transfer of characters from said first band to the selected one of the plurality of other bands.

12. A data transfer system as in claim 11 including a data source, and a fourth switching means connected with the recording means for said first band and controlled conjointly by character representing signals from said data source, a signal from said signal generating means and said timing signals and operative to emit signals for introducing new character representing designations on said first band according to said first code system after said first band has been cleared of previously stored data.

References Cited in the file of this patent

UNITED STATES PATENTS

| | | |
|---|---|---|
| 2,518,022 | Keister | Aug. 8, 1950 |
| 2,576,099 | Bray | Nov. 27, 1951 |
| 2,617,704 | Mallina | Nov. 11, 1952 |
| 2,685,084 | Lippel | July 27, 1954 |
| 2,693,593 | Crosman | Nov. 2, 1954 |
| 2,702,380 | Brustman | Feb. 15, 1955 |
| 2,708,267 | Weidenhammer | May 10, 1955 |
| 2,739,299 | Burkhart | Mar. 20, 1956 |
| 2,767,908 | Thomas | Oct. 23, 1956 |

FOREIGN PATENTS

| | | |
|---|---|---|
| 167,102 | Australia | Feb. 11, 1954 |